(12) United States Patent
Carney et al.

(10) Patent No.: US 11,070,890 B2
(45) Date of Patent: Jul. 20, 2021

(54) USER CUSTOMIZATION OF USER INTERFACES FOR INTERACTIVE TELEVISION

(75) Inventors: John Carney, Corte Madera, CA (US); David de Andrade, San Anselmo, CA (US); Viva Chu, San Leandro, CA (US); Samuel Moreau, Mill Valley, CA (US)

(73) Assignee: Comcast Cable Communications Management, LLC, Philadelphia, PA (US)

( * ) Notice: Subject to any disclaimer, the term of this patent is extended or adjusted under 35 U.S.C. 154(b) by 1555 days.

(21) Appl. No.: 10/635,799

(22) Filed: Aug. 5, 2003

(65) Prior Publication Data

US 2021/0136458 A1     May 6, 2021

Related U.S. Application Data

(63) Continuation-in-part of application No. 10/390,064, filed on Mar. 14, 2003, now Pat. No. 8,042,132.

(60) Provisional application No. 60/401,523, filed on Aug. 6, 2002.

(51) Int. Cl.
| | |
|---|---|
| *H04N 21/485* | (2011.01) |
| *H04N 21/472* | (2011.01) |
| *H04N 21/482* | (2011.01) |

(52) U.S. Cl.
CPC ... *H04N 21/4858* (2013.01); *H04N 21/47202* (2013.01); *H04N 21/482* (2013.01)

(58) Field of Classification Search
CPC ............... H04N 21/4312; H04N 21/45; H04N 21/4532; H04N 21/485; H04N 21/4858; H04N 21/4755; H04N 5/44543; H04N 21/44222; H04N 7/163; H04N 21/482
USPC ............. 725/2, 4, 39–40, 50, 53, 56, 61, 87, 725/91–92, 100, 103–104, 111, 114, 121, 725/131, 138–139, 144–145, 44–47; 715/788

See application file for complete search history.

(56) References Cited

U.S. PATENT DOCUMENTS

| | | | |
|---|---|---|---|
| 5,287,489 A | | 2/1994 | Nimmo et al. |
| 5,321,750 A | | 6/1994 | Nadan |
| 5,353,121 A | * | 10/1994 | Young et al. .................. 725/52 |

(Continued)

FOREIGN PATENT DOCUMENTS

| | | |
|---|---|---|
| EP | 0624039 A2 | 11/1994 |
| EP | 0624039 A3 | 11/1994 |

(Continued)

OTHER PUBLICATIONS

Office Action in U.S. Appl. No. 10/618,210, dated Jan. 25, 2011.

(Continued)

*Primary Examiner* — Anthony Bantamoi
(74) *Attorney, Agent, or Firm* — Banner & Witcoff, Ltd.

(57) ABSTRACT

A user interface by which network operators, programmers, broadcasters and advertisers can deploy and make accessible libraries of available content and allow viewers of iTV services to customize the presentation and content of the information being presented thereto includes one or more screens each having one or more navigable and selectable elements through which the viewers are permitted to customize presentation and content of iTV application environments other than those associated with the user interface.

23 Claims, 36 Drawing Sheets

(56) References Cited

U.S. PATENT DOCUMENTS

| | | | |
|---|---|---|---|
| 5,485,221 A | 1/1996 | Banker |
| 5,530,939 A | 6/1996 | Mansfield, Jr. et al. |
| 5,583,563 A | 12/1996 | Wanderscheid et al. |
| 5,589,892 A | 12/1996 | Knee et al. |
| 5,592,551 A | 1/1997 | Lett et al. |
| 5,594,509 A | 1/1997 | Florin et al. |
| 5,613,057 A | 3/1997 | Caravel |
| 5,621,456 A | 4/1997 | Florin et al. |
| 5,657,072 A | 8/1997 | Aristides et al. |
| 5,659,793 A | 8/1997 | Escobar et al. |
| 5,666,645 A | 9/1997 | Thomas |
| 5,675,752 A | 10/1997 | Scott et al. |
| 5,694,176 A * | 12/1997 | Bruette et al. .................. 725/43 |
| 5,802,284 A | 9/1998 | Karlton et al. |
| 5,826,102 A | 10/1998 | Escobar |
| 5,844,620 A | 12/1998 | Coleman |
| 5,850,218 A | 12/1998 | Lajoie et al. |
| 5,852,435 A | 12/1998 | Vigneaux |
| 5,860,073 A | 1/1999 | Ferrel et al. |
| 5,883,677 A | 3/1999 | Hofmann |
| 5,892,902 A | 4/1999 | Clark |
| 5,892,905 A | 4/1999 | Brandt |
| 5,905,492 A | 5/1999 | Straub et al. |
| 5,929,849 A | 7/1999 | Kikinis |
| 5,945,987 A | 8/1999 | Dunn |
| 5,960,194 A | 9/1999 | Choy et al. |
| 5,990,890 A * | 11/1999 | Etheredge ..................... 715/808 |
| 5,996,025 A | 11/1999 | Day et al. |
| 6,002,394 A | 12/1999 | Schein |
| 6,005,561 A | 12/1999 | Hawkins et al. |
| 6,008,083 A | 12/1999 | Brabazon et al. |
| 6,008,803 A | 12/1999 | Rowe |
| 6,008,836 A | 12/1999 | Bruck et al. |
| 6,016,144 A | 1/2000 | Blonstein et al. |
| 6,025,837 A | 2/2000 | Matthews, III et al. |
| 6,049,823 A | 4/2000 | Hwang |
| 6,061,695 A | 5/2000 | Slivka et al. |
| 6,067,108 A | 5/2000 | Yokote |
| 6,088,722 A | 7/2000 | Herz et al. |
| 6,091,411 A | 7/2000 | Straub et al. |
| 6,094,237 A | 7/2000 | Hashimoto |
| 6,141,003 A * | 10/2000 | Chor et al. ..................... 715/719 |
| 6,148,081 A | 11/2000 | Szymanski et al. |
| 6,162,697 A | 12/2000 | Singh et al. |
| 6,169,543 B1 | 1/2001 | Wehmeyer |
| 6,172,677 B1 | 1/2001 | Stautner |
| 6,177,931 B1 | 1/2001 | Alexander et al. |
| 6,191,781 B1 | 2/2001 | Chaney et al. |
| 6,195,692 B1 | 2/2001 | Hsu |
| 6,205,582 B1 | 3/2001 | Hoarty |
| 6,219,839 B1 | 4/2001 | Sampsell |
| 6,239,795 B1 | 5/2001 | Ulrich et al. |
| 6,240,555 B1 | 5/2001 | Shoff et al. |
| 6,281,940 B1 | 8/2001 | Sciammarella |
| 6,292,187 B1 | 9/2001 | Gibbs et al. |
| 6,292,827 B1 | 9/2001 | Raz |
| 6,295,057 B1 | 9/2001 | Rosin et al. |
| 6,314,569 B1 | 11/2001 | Chernock et al. |
| 6,317,885 B1 | 11/2001 | Fries |
| 6,345,305 B1 | 2/2002 | Beck et al. |
| 6,405,239 B1 | 6/2002 | Addington et al. |
| 6,415,438 B1 | 7/2002 | Blackketter et al. |
| 6,421,067 B1 | 7/2002 | Kamen et al. |
| 6,426,779 B1 | 7/2002 | Noguchi et al. |
| 6,442,755 B1 | 8/2002 | Lemmons |
| 6,477,705 B1 | 11/2002 | Yuen et al. |
| 6,486,920 B2 | 11/2002 | Arai et al. |
| 6,522,342 B1 | 2/2003 | Gagnon |
| 6,529,950 B1 | 3/2003 | Lumelsky et al. |
| 6,530,082 B1 | 3/2003 | Del Sesto et al. |
| 6,532,589 B1 | 3/2003 | Proehl et al. |
| 6,564,263 B1 | 5/2003 | Bergman et al. |
| 6,567,104 B1 | 5/2003 | Andrew et al. |
| 6,571,392 B1 | 5/2003 | Zigmond et al. |
| 6,591,292 B1 | 7/2003 | Morrison et al. |
| 6,621,509 B1 | 9/2003 | Eiref et al. |
| 6,636,887 B1 | 10/2003 | Augeri |
| 6,658,661 B1 | 12/2003 | Arsenault et al. |
| 6,678,891 B1 | 1/2004 | Wilcox et al. |
| 6,684,400 B1 | 1/2004 | Goode et al. |
| 6,704,359 B1 | 3/2004 | Bayrakeri et al. |
| 6,731,310 B2 | 5/2004 | Craycroft et al. |
| 6,745,367 B1 | 6/2004 | Bates et al. |
| 6,760,043 B2 | 7/2004 | Markel |
| 6,763,522 B1 | 7/2004 | Kondo |
| 6,766,526 B1 | 7/2004 | Ellis |
| 6,806,887 B2 * | 10/2004 | Chernock et al. ............. 345/629 |
| 6,857,128 B1 | 2/2005 | Borden, IV et al. |
| 6,886,029 B1 | 4/2005 | Pecus et al. |
| 6,904,610 B1 * | 6/2005 | Bayrakeri .............. H04N 5/445 |
| 6,910,191 B2 | 6/2005 | Segerberg et al. |
| 6,918,131 B1 | 7/2005 | Rautila et al. |
| 7,028,327 B1 | 4/2006 | Dougherty et al. |
| 7,065,785 B1 | 6/2006 | Shaffer et al. |
| 7,080,400 B1 | 7/2006 | Navar |
| 7,103,904 B1 | 9/2006 | Blackketter et al. |
| 7,114,170 B2 | 9/2006 | Harris |
| 7,134,072 B1 | 11/2006 | Lovett et al. |
| 7,152,236 B1 | 12/2006 | Wugofski et al. |
| 7,162,694 B2 | 1/2007 | Venolia |
| 7,162,697 B2 | 1/2007 | Markel |
| 7,174,512 B2 | 2/2007 | Martin et al. |
| 7,197,715 B1 * | 3/2007 | Valeria ................. H04N 5/4401 |
| | | 348/E5.099 |
| 7,207,057 B1 | 4/2007 | Rowe |
| 7,213,005 B2 | 5/2007 | Mourad et al. |
| 7,221,801 B2 | 5/2007 | Jang et al. |
| 7,237,252 B2 | 6/2007 | Billmaier |
| 7,293,275 B1 | 11/2007 | Krieger et al. |
| 7,305,696 B2 | 12/2007 | Thomas et al. |
| 7,313,806 B1 | 12/2007 | Williams et al. |
| 7,337,457 B2 | 2/2008 | Pack |
| 7,360,232 B2 | 4/2008 | Mitchell |
| 7,363,612 B2 | 4/2008 | Satuloori |
| 7,406,705 B2 | 7/2008 | Crinon et al. |
| 7,440,967 B2 | 10/2008 | Chidlovskii |
| 7,464,344 B1 * | 12/2008 | Carmichael et al. ......... 715/854 |
| 7,516,468 B1 | 4/2009 | Deller |
| 7,523,180 B1 | 4/2009 | DeLuca et al. |
| 7,587,415 B2 | 9/2009 | Gaurav et al. |
| 7,624,416 B1 | 11/2009 | Vandermolen et al. |
| 7,640,487 B2 | 12/2009 | Amielh-Caprioglio et al. |
| 7,702,315 B2 | 4/2010 | Engstrom et al. |
| 7,703,116 B1 | 4/2010 | Moreau et al. |
| 7,721,307 B2 | 5/2010 | Hendricks et al. |
| 7,743,330 B1 | 6/2010 | Hendricks et al. |
| 7,752,258 B2 | 7/2010 | Lewin et al. |
| 7,861,259 B2 | 12/2010 | Barone, Jr. |
| 7,913,286 B2 | 3/2011 | Sarachik et al. |
| 7,958,528 B2 | 6/2011 | Moreau et al. |
| 7,975,277 B1 | 7/2011 | Jerding et al. |
| 8,006,262 B2 | 8/2011 | Rodriguez et al. |
| 8,032,914 B2 | 10/2011 | Rodriguez |
| 8,156,533 B2 | 4/2012 | Crichton |
| 8,220,018 B2 | 7/2012 | de Andrade et al. |
| 8,266,652 B2 | 9/2012 | Roberts et al. |
| 8,296,805 B2 | 10/2012 | Tabatabai et al. |
| 8,365,230 B2 | 1/2013 | Chane et al. |
| 8,381,259 B1 | 2/2013 | Khosla |
| 8,434,109 B2 | 4/2013 | Kamimaeda et al. |
| 8,448,208 B2 | 5/2013 | Moreau et al. |
| 8,660,545 B1 | 2/2014 | Redford et al. |
| 8,699,862 B1 | 4/2014 | Sharifi et al. |
| 8,793,256 B2 | 7/2014 | McIntire et al. |
| 8,850,495 B2 | 9/2014 | Pan |
| 8,863,196 B2 | 10/2014 | Patil et al. |
| 8,938,675 B2 | 1/2015 | Holladay et al. |
| 8,943,533 B2 | 1/2015 | de Andrade et al. |
| 8,973,063 B2 | 3/2015 | Spilo et al. |
| 9,021,528 B2 | 4/2015 | Moreau et al. |
| 9,363,560 B2 | 6/2016 | Moreau et al. |
| 9,473,548 B1 | 10/2016 | Chakrovorthy et al. |
| 9,516,253 B2 | 12/2016 | de Andrade et al. |
| 2001/0014206 A1 | 8/2001 | Artgalas et al. |

(56) References Cited

U.S. PATENT DOCUMENTS

| | | |
|---|---|---|
| 2001/0027563 A1 | 10/2001 | White et al. |
| 2001/0049823 A1 | 12/2001 | Matey |
| 2001/0056573 A1 | 12/2001 | Kovac |
| 2001/0056577 A1 | 12/2001 | Gordon et al. |
| 2002/0010928 A1 | 1/2002 | Sahota |
| 2002/0016969 A1 | 2/2002 | Kimble |
| 2002/0023270 A1 | 2/2002 | Thomas |
| 2002/0026642 A1 | 2/2002 | Augenbraun et al. |
| 2002/0032905 A1 | 3/2002 | Sherr et al. |
| 2002/0041104 A1 | 4/2002 | Graf et al. |
| 2002/0042915 A1* | 4/2002 | Kubischta et al. ............. 725/38 |
| 2002/0042920 A1 | 4/2002 | Thomas et al. |
| 2002/0046099 A1 | 4/2002 | Frengut et al. |
| 2002/0059094 A1 | 5/2002 | Hosea et al. |
| 2002/0059586 A1 | 5/2002 | Carney et al. |
| 2002/0059629 A1 | 5/2002 | Markel |
| 2002/0067376 A1 | 6/2002 | Martin et al. |
| 2002/0069407 A1 | 6/2002 | Fagnani et al. |
| 2002/0070978 A1 | 6/2002 | Wishoff et al. |
| 2002/0078444 A1 | 6/2002 | Krewin |
| 2002/0078449 A1 | 6/2002 | Gordon et al. |
| 2002/0083450 A1 | 6/2002 | Kamen et al. |
| 2002/0100041 A1 | 7/2002 | Rosenberg |
| 2002/0107973 A1 | 8/2002 | Lennon et al. |
| 2002/0108121 A1 | 8/2002 | Alao et al. |
| 2002/0108122 A1 | 8/2002 | Alao et al. |
| 2002/0120609 A1 | 8/2002 | Lang et al. |
| 2002/0124254 A1 | 9/2002 | Kikinis |
| 2002/0144269 A1 | 10/2002 | Connelly |
| 2002/0144273 A1 | 10/2002 | Reto |
| 2002/0147645 A1 | 10/2002 | Alao et al. |
| 2002/0152477 A1 | 10/2002 | Goodman et al. |
| 2002/0156839 A1 | 10/2002 | Peterson et al. |
| 2002/0156890 A1 | 10/2002 | Carlyle et al. |
| 2002/0162120 A1 | 10/2002 | Mitchell |
| 2002/0169885 A1 | 11/2002 | Alao et al. |
| 2002/0170059 A1 | 11/2002 | Hoang |
| 2002/0171691 A1 | 11/2002 | Currans et al. |
| 2002/0171940 A1 | 11/2002 | He et al. |
| 2002/0184629 A1 | 12/2002 | Sie et al. |
| 2002/0188944 A1 | 12/2002 | Noble |
| 2002/0196268 A1 | 12/2002 | Wolff et al. |
| 2002/0199187 A1 | 12/2002 | Gissin et al. |
| 2002/0199190 A1 | 12/2002 | Su |
| 2003/0001880 A1 | 1/2003 | Holtz et al. |
| 2003/0005444 A1 | 1/2003 | Crinon et al. |
| 2003/0005453 A1 | 1/2003 | Rodriguez et al. |
| 2003/0014752 A1 | 1/2003 | Zaslavsky et al. |
| 2003/0014753 A1 | 1/2003 | Beach et al. |
| 2003/0018755 A1 | 1/2003 | Masterson et al. |
| 2003/0023970 A1 | 1/2003 | Panabaker |
| 2003/0025832 A1 | 2/2003 | Swart |
| 2003/0028871 A1 | 2/2003 | Wang et al. |
| 2003/0028873 A1 | 2/2003 | Lemmons |
| 2003/0041104 A1 | 2/2003 | Wingard et al. |
| 2003/0051246 A1 | 3/2003 | Wilder et al. |
| 2003/0056216 A1 | 3/2003 | Wugofski et al. |
| 2003/0056218 A1 | 3/2003 | Wingard |
| 2003/0058948 A1 | 3/2003 | Kelly et al. |
| 2003/0066081 A1 | 4/2003 | Barone, Jr. et al. |
| 2003/0067554 A1 | 4/2003 | Klarfeld |
| 2003/0068046 A1 | 4/2003 | Lindqvist et al. |
| 2003/0070170 A1 | 4/2003 | Lennon |
| 2003/0079226 A1 | 4/2003 | Barrett |
| 2003/0084443 A1 | 5/2003 | Laughlin et al. |
| 2003/0084444 A1 | 5/2003 | Ullman |
| 2003/0084449 A1 | 5/2003 | Chane |
| 2003/0086694 A1 | 5/2003 | Davidsson |
| 2003/0093790 A1 | 5/2003 | Logan |
| 2003/0093792 A1 | 5/2003 | Labeeb |
| 2003/0097657 A1 | 5/2003 | Zhou et al. |
| 2003/0110500 A1* | 6/2003 | Rodriguez ............. H04H 60/46 725/46 |
| 2003/0110503 A1 | 6/2003 | Perkes |
| 2003/0115219 A1 | 6/2003 | Chadwick |
| 2003/0115612 A1 | 6/2003 | Mao et al. |
| 2003/0126601 A1 | 7/2003 | Roberts |
| 2003/0132971 A1 | 7/2003 | Billmaier et al. |
| 2003/0135464 A1 | 7/2003 | Mourad et al. |
| 2003/0140097 A1 | 7/2003 | Schloer |
| 2003/0151621 A1 | 8/2003 | McEvilly et al. |
| 2003/0158777 A1 | 8/2003 | Schiff et al. |
| 2003/0172370 A1 | 9/2003 | Satuloori et al. |
| 2003/0177501 A1* | 9/2003 | Takahashi ................ G06F 3/00 |
| 2003/0182663 A1 | 9/2003 | Gudorf et al. |
| 2003/0189668 A1 | 10/2003 | Newnam et al. |
| 2003/0204814 A1 | 10/2003 | Elo et al. |
| 2003/0204846 A1 | 10/2003 | Breen |
| 2003/0204854 A1 | 10/2003 | Blackketter et al. |
| 2003/0207696 A1 | 11/2003 | Willenegger et al. |
| 2003/0226141 A1 | 12/2003 | Krasnow et al. |
| 2003/0229899 A1 | 12/2003 | Thompson et al. |
| 2004/0003402 A1 | 1/2004 | McKenna |
| 2004/0003404 A1 | 1/2004 | Boston et al. |
| 2004/0019900 A1 | 1/2004 | Knightbridge |
| 2004/0019908 A1 | 1/2004 | Williams et al. |
| 2004/0022271 A1 | 2/2004 | Fichet et al. |
| 2004/0024753 A1 | 2/2004 | Chane et al. |
| 2004/0025180 A1 | 2/2004 | Begeja et al. |
| 2004/0031015 A1 | 2/2004 | Ben-Romdhane et al. |
| 2004/0031058 A1 | 2/2004 | Reisman |
| 2004/0031062 A1 | 2/2004 | Lemmons |
| 2004/0039754 A1 | 2/2004 | Harple |
| 2004/0073915 A1 | 4/2004 | Dureau |
| 2004/0078814 A1* | 4/2004 | Allen ................... H04N 5/4401 725/135 |
| 2004/0107437 A1 | 6/2004 | Reichardt et al. |
| 2004/0107439 A1 | 6/2004 | Hassell et al. |
| 2004/0128699 A1 | 7/2004 | Delpuch et al. |
| 2004/0133923 A1 | 7/2004 | Watson |
| 2004/0136698 A1 | 7/2004 | Mock |
| 2004/0168186 A1 | 8/2004 | Rector et al. |
| 2004/0172648 A1 | 9/2004 | Xu et al. |
| 2004/0189658 A1 | 9/2004 | Dowdy |
| 2004/0194136 A1 | 9/2004 | Finseth et al. |
| 2004/0199578 A1 | 10/2004 | Kapczynski et al. |
| 2004/0221306 A1 | 11/2004 | Noh |
| 2004/0224723 A1 | 11/2004 | Farcasiu |
| 2004/0226051 A1 | 11/2004 | Carney et al. |
| 2005/0005288 A1* | 1/2005 | Novak ............................. 725/32 |
| 2005/0015796 A1 | 1/2005 | Bruckner et al. |
| 2005/0015804 A1 | 1/2005 | LaJoie et al. |
| 2005/0028208 A1 | 2/2005 | Ellis et al. |
| 2005/0086172 A1 | 4/2005 | Stefik |
| 2005/0125835 A1 | 6/2005 | Wei |
| 2005/0149972 A1 | 7/2005 | Knudson |
| 2005/0155063 A1* | 7/2005 | Bayrakeri et al. ............. 725/47 |
| 2005/0262542 A1 | 11/2005 | DeWeese et al. |
| 2005/0283800 A1 | 12/2005 | Ellis et al. |
| 2005/0287948 A1 | 12/2005 | Hellwagner et al. |
| 2006/0004743 A1 | 1/2006 | Murao et al. |
| 2006/0059525 A1 | 3/2006 | Jerding et al. |
| 2006/0068818 A1 | 3/2006 | Leitersdorf et al. |
| 2006/0080707 A1 | 4/2006 | Laksono |
| 2006/0080716 A1 | 4/2006 | Nishikawa et al. |
| 2006/0104511 A1 | 5/2006 | Guo et al. |
| 2006/0105793 A1 | 5/2006 | Gutowski et al. |
| 2006/0125962 A1 | 6/2006 | Shelton et al. |
| 2006/0156336 A1 | 7/2006 | Knudson et al. |
| 2006/0195865 A1 | 8/2006 | Fablet |
| 2006/0200842 A1 | 9/2006 | Chapman et al. |
| 2006/0206470 A1 | 9/2006 | McIntyre |
| 2006/0206912 A1 | 9/2006 | Klarfeld et al. |
| 2006/0233514 A1 | 10/2006 | Weng et al. |
| 2006/0248572 A1 | 11/2006 | Kitsukama et al. |
| 2007/0019001 A1 | 1/2007 | Ha |
| 2007/0064715 A1 | 3/2007 | Lloyd et al. |
| 2007/0112761 A1 | 5/2007 | Xu et al. |
| 2007/0220016 A1 | 9/2007 | Estrada et al. |
| 2007/0261072 A1 | 11/2007 | Boulet et al. |
| 2007/0271587 A1 | 11/2007 | Rowe |
| 2008/0037722 A1 | 2/2008 | Klassen |
| 2008/0060011 A1 | 3/2008 | Kelts |
| 2008/0071770 A1 | 3/2008 | Schloter et al. |

(56) References Cited

U.S. PATENT DOCUMENTS

| | | |
|---|---|---|
| 2008/0148317 A1 | 6/2008 | Opaluch |
| 2008/0163304 A1 | 7/2008 | Ellis |
| 2008/0189740 A1 | 8/2008 | Carpenter et al. |
| 2008/0196070 A1 | 8/2008 | White et al. |
| 2008/0235725 A1 | 9/2008 | Hendricks |
| 2008/0276278 A1 | 11/2008 | Krieger et al. |
| 2008/0282294 A1 | 11/2008 | Carpenter et al. |
| 2008/0288644 A1 | 11/2008 | Gilfix et al. |
| 2008/0301732 A1 | 12/2008 | Archer et al. |
| 2008/0317233 A1 | 12/2008 | Rey et al. |
| 2009/0019485 A1 | 1/2009 | Ellis et al. |
| 2009/0024629 A1 | 1/2009 | Miyauchi |
| 2009/0094632 A1 | 4/2009 | Newnam et al. |
| 2009/0094651 A1 | 4/2009 | Damm et al. |
| 2009/0133025 A1 | 5/2009 | Malhotra et al. |
| 2009/0164904 A1 | 6/2009 | Horowitz et al. |
| 2009/0183210 A1 | 7/2009 | Andrade |
| 2009/0222872 A1 | 9/2009 | Schlack |
| 2009/0228441 A1 | 9/2009 | Sandvik |
| 2009/0249427 A1 | 10/2009 | Dunnigan et al. |
| 2009/0271829 A1 | 10/2009 | Larsson et al. |
| 2009/0288132 A1 | 11/2009 | Hegde |
| 2009/0292548 A1 | 11/2009 | Van Court |
| 2010/0023966 A1 | 1/2010 | Shahraray et al. |
| 2010/0077057 A1 | 3/2010 | Godin et al. |
| 2010/0079670 A1 | 4/2010 | Frazier et al. |
| 2010/0175084 A1 | 7/2010 | Ellis et al. |
| 2010/0180300 A1 | 7/2010 | Carpenter et al. |
| 2010/0223640 A1 | 9/2010 | Reichardt |
| 2010/0250190 A1 | 9/2010 | Zhang et al. |
| 2010/0251284 A1 | 9/2010 | Ellis |
| 2010/0257548 A1 | 10/2010 | Lee et al. |
| 2011/0055282 A1 | 3/2011 | Hoving |
| 2011/0058101 A1 | 3/2011 | Earley et al. |
| 2011/0087348 A1 | 4/2011 | Wong |
| 2011/0093909 A1 | 4/2011 | Roberts et al. |
| 2011/0131204 A1 | 6/2011 | Bodin et al. |
| 2011/0209180 A1 | 8/2011 | Ellis et al. |
| 2011/0214143 A1 | 9/2011 | Rits et al. |
| 2011/0219419 A1 | 9/2011 | Reisman |
| 2011/0225417 A1 | 9/2011 | Maharajh et al. |
| 2011/0246495 A1 | 10/2011 | Mallinson |
| 2011/0247042 A1 | 10/2011 | Mallinson |
| 2012/0002111 A1 | 1/2012 | Sandoval et al. |
| 2012/0011550 A1 | 1/2012 | Holland |
| 2012/0054811 A1 | 3/2012 | Spears |
| 2012/0117151 A1 | 5/2012 | Bill |
| 2012/0192226 A1 | 7/2012 | Zimmerman et al. |
| 2012/0227073 A1 | 9/2012 | Hosein et al. |
| 2012/0233646 A1 | 9/2012 | Coniglio et al. |
| 2012/0295686 A1 | 11/2012 | Lockton |
| 2012/0324002 A1 | 12/2012 | Chen |
| 2012/0324494 A1 | 12/2012 | Burger et al. |
| 2012/0324495 A1 | 12/2012 | Matthews, III et al. |
| 2012/0324518 A1 | 12/2012 | Thomas et al. |
| 2013/0040623 A1 | 2/2013 | Chun et al. |
| 2013/0103446 A1 | 4/2013 | Bragdon et al. |
| 2013/0110769 A1 | 5/2013 | Ito |
| 2013/0111514 A1 | 5/2013 | Slavin et al. |
| 2013/0176493 A1 | 7/2013 | Khosla |
| 2013/0262997 A1 | 10/2013 | Markworth et al. |
| 2013/0298038 A1 | 11/2013 | Spivack et al. |
| 2013/0316716 A1 | 11/2013 | Tapia et al. |
| 2013/0326570 A1 | 12/2013 | Cowper et al. |
| 2013/0332839 A1 | 12/2013 | Frazier et al. |
| 2013/0332852 A1 | 12/2013 | Castanho et al. |
| 2013/0347018 A1 | 12/2013 | Limp et al. |
| 2013/0347030 A1 | 12/2013 | Oh et al. |
| 2014/0006951 A1 | 1/2014 | Hunter |
| 2014/0009680 A1 | 1/2014 | Moon et al. |
| 2014/0032473 A1 | 1/2014 | Enoki et al. |
| 2014/0089423 A1 | 3/2014 | Jackels |
| 2014/0089967 A1 | 3/2014 | Mandalia et al. |
| 2014/0149918 A1 | 5/2014 | Asokan et al. |
| 2014/0150022 A1 | 5/2014 | Oh et al. |
| 2014/0325359 A1 | 10/2014 | Vehovsky et al. |
| 2014/0327677 A1 | 11/2014 | Walker |
| 2014/0359662 A1 | 12/2014 | Packard et al. |
| 2014/0365302 A1 | 12/2014 | Walker |
| 2014/0373032 A1 | 12/2014 | Merry et al. |
| 2015/0026743 A1 | 1/2015 | Kim et al. |
| 2015/0263923 A1 | 9/2015 | Kruglick |

FOREIGN PATENT DOCUMENTS

| | | |
|---|---|---|
| EP | 0963115 | 12/1999 |
| EP | 0963115 A1 | 12/1999 |
| EP | 1058999 A1 | 12/2000 |
| EP | 1080582 A1 | 3/2001 |
| EP | 1080582 | 3/2003 |
| EP | 1058999 | 4/2003 |
| GB | 2323489 A | 9/1998 |
| WO | 99/63757 | 12/1999 |
| WO | 9963757 A1 | 12/1999 |
| WO | 0011869 | 3/2000 |
| WO | 0011869 A1 | 3/2000 |
| WO | 00/33576 | 6/2000 |
| WO | 0033576 | 6/2000 |
| WO | 0033576 A1 | 6/2000 |
| WO | 0110115 A1 | 2/2001 |
| WO | 0182613 | 11/2001 |
| WO | 0182613 A1 | 11/2001 |
| WO | 02063426 | 8/2002 |
| WO | 02063426 A2 | 8/2002 |
| WO | 02063471 | 8/2002 |
| WO | 02063471 A2 | 8/2002 |
| WO | 02063851 | 8/2002 |
| WO | 02063851 A2 | 8/2002 |
| WO | 02063878 | 8/2002 |
| WO | 02063878 A2 | 8/2002 |
| WO | 03/009126 | 1/2003 |
| WO | 03009126 A1 | 1/2003 |
| WO | 2003/026275 A2 | 3/2003 |
| WO | 2011/053271 A1 | 5/2011 |
| WO | 2012/094105 A1 | 7/2012 |
| WO | 2012/154541 A1 | 11/2012 |

OTHER PUBLICATIONS

Office Action in U.S. Appl. No. 10/894,740, dated Mar. 10, 2011.
Office Action in U.S. Appl. No. 10/672,983, dated Mar. 30, 2011.
Sylvain Devillers, "Bitstream Syntax Definition Language: an Input to MPEG-21 Content Representation," Mar. 2001, ISO, ISO/IEC JTC1/SC29/WG11 MPEG01/M7053.
Fernando Periera, "The MPEG-4 Book," Prentice Hall, Jul. 10, 2002.
Michael Adams, "Open Cable Architecture," Cisco Press, Dec. 3, 1999.
Mark Riehl, "XML and Perl," Sams, Oct. 16, 2002.
Office Action in U.S. Appl. No. 11/381,508, dated Mar. 16, 2010.
Office Action in U.S. Appl. No. 10/247,901, dated Apr. 9, 2010.
Office Action in U.S. Appl. No. 10/390,064, dated Apr. 12, 2010.
Office Action in U.S. Appl. No. 10/630,815, dated Apr. 13, 2010.
Office Action in U.S. Appl. No. 10/618,210, dated Jun. 28, 2010.
Office Action in U.S. Appl. No. 10/247,901, dated Aug. 11, 2011.
Office Action in U.S. Appl. No. 10/933,845, dated Oct. 19, 2011.
Office Action in U.S. Appl. No. 10/672,983, dated Oct. 25, 2011.
MetaTV, Inc., PCT/US02/29917 filed Sep. 19, 2002, International Search Report dated Apr. 14, 2003; ISA/US; 6 pages.
Andreas Kraft and Klaus Hofrichter, "An Approach for Script-Based Broadcast Application Production", Springer-Verlag Brling Heidelberg, pp. 74-82, 1999.
Office Action in U.S. Appl. No. 10/672,983 dated Jul. 20, 2010.
Office Action in U.S. Appl. No. 10/618,210 dated Jan. 21, 2010.
Office Action in U.S. Appl. No. 10/630,815 dated Jul. 9, 2008.
Office Action in U.S. Appl. No. 10/390,064 dated Jan. 25, 2008.
Shim, et al., "A SMIL Based Graphical Interface for Interactive TV", Internet Tech. Laboratory Dept. of Comp. Engineering, San Jose State University, pp. 257-266.
Office Action in U.S. Appl. No. 10/390,064 dated Sep. 4, 2008.

(56) References Cited

OTHER PUBLICATIONS

Office Action in U.S. Appl. No. 10/390,064 dated Oct. 27, 2009.
Office Action in U.S. Appl. No. 10/390,064 dated May 13, 2009.
Office Action in U.S. Appl. No. 10/618,210 dated Nov. 21, 2008.
Office Action in U.S. Appl. No. 10/618,210 dated Jun. 8, 2009.
Office Action in U.S. Appl. No. 10/618,210 dated Jun. 6, 2008.
Office Action in U.S. Appl. No. 10/672,983 dated Dec. 8, 2009.
Office Action in U.S. Appl. No. 10/672,983 dated Jan. 13, 2009.
Office Action in U.S. Appl. No. 10/672,983 dated Jun. 12, 2008.
Office Action in U.S. Appl. No. 10/672,983 dated Jun. 29, 2009.
Office Action in U.S. Appl. No. 10/630,815 dated Oct. 5, 2009.
Office Action in U.S. Appl. No. 10/630,815 dated Dec. 24, 2008.
Office Action in U.S. Appl. No. 10/630,815 dated Nov. 28, 2007.
Office Action in U.S. Appl. No. 10/933,845 dated Jun. 23, 2010.
Office Action in U.S. Appl. No. 10/933,845 dated Nov. 24, 2009.
Office Action in U.S. Appl. No. 10/933,845 dated Dec. 13, 2007.
Office Action in U.S. Appl. No. 10/933,845 dated Jul. 9, 2008.
Office Action in U.S. Appl. No. 10/630,815 dated Apr. 21, 2011.
Office Action in U.S. Appl. No. 10/618,210, dated Oct. 4, 2007.
Office Action in U.S. Appl. No. 12/730,771 dated Oct. 5, 2010.
Yoon, et al., "Video Gadget: MPET-7 Based Audio-Visual Content Indexing and Browsing Engine", LG Electronics Institute of Technology, pp. 59-68.
U.S. Appl. No. 10/460,950, filed Jun. 12, 2003.
Office Action in U.S. Appl. No. 10/925,737 dated Feb. 9, 2011.
Office Action in U.S. Appl. No. 09/841,149 dated Nov. 8, 2010.
Office Action in U.S. Appl. No. 10/933,845, dated Jul. 6, 2011.
Office Action in U.S. Appl. No. 10/894,740, dated Jul. 7, 2011.
Office Action in U.S. Appl. No. 10/618,210, dated Jul. 11, 2011.
Fernando Pereira, "The MPEG-4 Book", Prentice Hall, Jul. 10, 2002.
Shim, et al., "A SMIL Based Graphical Interface for Interactive TV", Internet Tech. Laboratory Dept. of Comp. Engineering, San Jose State University, pp. 257-266, 2003.
Watchwith webpage; http://www.watchwith.com/content_owners/watchwith_plalform_components.jsp (last visited Mar. 12, 2013).
Matt Duffy; TVplus App reveals content click-through rates north of 10% across sync enabled programming; http://www.tvplus.com/blog/TVplus-App-reveals-content-click-through-rates-north-of-10-Percent-across-sync-enabled-programming (retrieved from the Wayback Machine on Mar. 12, 2013).
"In Time for Academy Awards Telecast, Companion TV App Umami Debuts First Real-Time Sharing of a TV Program's Images"; Umami News; http:www.umami.tv/2012-02-23.html (retrieved from the Wayback Machine on Mar. 12, 2013).
Office Action in U.S. Appl. No. 10/894,740, dated Oct. 14, 2010.
Office Action in U.S. Appl. No. 10/247,901, dated Oct. 13, 2010.
Office Action in U.S. Appl. No. 10/390,064, dated Nov. 8, 2010.
Boronat F et al: "Multimedia group and inter-stream synchronization techniques: A comparative study", Information Systems. Pergamon Press. Oxford. GB. vol. 34. No. 1. Mar. 1, 2009 (Mar. 1, 2009). pp. 108-131. XP025644936.
Extended European Search Report—EP14159227.9—dated Sep. 3, 2014.
Canadian Office Action—CA 2,685,833—dated Jan. 22, 2015.
CA Response to Office Action—CA Appl. 2,685,833—Submitted Jul. 17, 2015.
European Extended Search Report—EP 13192112.4—dated May 11, 2015.
Response to European Office Action—European Appl. 13192112.4—submitted Dec. 9, 2015.
CA Office Action—CA App 2,685,833—dated Jan. 27, 2016.
CA Office Action—CA Application 2685833—dated Feb. 8, 2017.
European Office Action—EP App 14159227.9—dated Jul. 12, 2016.
Agnieszka Zagozdzinnska et al. "TRIDAQ Systems in HEP Experiments at LHC Accelerator" Kwartalnik Elektroniki I Telekomunikacji, vol. 59, No. 4, Jan. 1, 2013.
Feb. 19, 2018—European Summons to Oral Proceedings—EP 14159227.9.
Nov. 29, 2017—Canadian Office Action—CA 2,685,833.
Mar. 9, 2018—European Office Action—EP 13192112.4.
Jul. 31, 2018—European Decision to Refuse—14159227.9.
Nov. 6, 2019—Canadian Office Action—CA 2,832,800.
Apr. 21, 2020—European Summons to Oral Proceedings—EP 09175979.5.
Sep. 5, 2019—Canadian Office Action—CA 2,685,833.

\* cited by examiner

Schema macjc_1_0.xsd

| Elements | Simple types |
|---|---|
| ad | adtype |
| br | align |
| button | channel |
| checkbox | height |
| color | layer |
| datatable | offsetx |
| event | offsety |
| group | plane |
| image | style |
| include | type |
| mac | valign |
| navitem | value |
| navmap | width |
| navtemplate | x |
| p | y |
| page | |
| palette | |
| radio | |
| radiogroup | |
| rect | |
| select | |
| text | |
| timer | |
| var | |
| video | |

Fig. 4A element: checkbox element button element: button (continued)

| attributes | Name | Type | Use | Default | Fixed | Annotation |
|---|---|---|---|---|---|---|
| | disabled | xsd:boolean | | false | | |
| | height | height | required | | | |
| | hidden | xsd:boolean | | false | | |
| | name | xsd:ID | required | | | |
| | width | width | required | | | |
| | x | x | required | | | |
| | y | y | required | | | |
| | onfocus | xsd:string | optional | | | |
| | onblur | xsd:string | optional | | | |
| | onclick | xsd:string | optional | | | |
| | offsetx | offsetx | optional | | | |
| | offsety | offsety | optional | | | |
| | hotspot | xsd:integer | | 0 | | |
| | hotspotfocus | xsd:string | | gold | | |
| | hotspotselected | xsd:string | | grey | | |
| | bgcolor | xsd:string | | transparent | | |
| | align | align | optional | | | |
| | valign | valign | optional | | | |
| | navtemplate | xsd:IDREF | optional | | | |
| | navtemplatefocus | xsd:IDREF | optional | | | |
| | navtemplateselected | xsd:IDREF | optional | | | |
| | navtemplatedisabled | xsd:IDREF | optional | | | |

| source | |
|---|---|
| | ```xml
<xsd:element name="button">
  <xsd:complexType>
    <xsd:simpleContent>
      <xsd:extension base="xsd:string">
        <xsd:attribute name="disabled" type="xsd:boolean" default="false"/>
        <xsd:attribute name="height" type="height" use="required"/>
        <xsd:attribute name="hidden" type="xsd:boolean" default="false"/>
        <xsd:attribute name="name" type="xsd:ID" use="required"/>
        <xsd:attribute name="width" type="width" use="required"/>
        <xsd:attribute name="x" type="x" use="required"/>
        <xsd:attribute name="y" type="y" use="required"/>
        <xsd:attribute name="onfocus" type="xsd:string" use="optional"/>
        <xsd:attribute name="onblur" type="xsd:string" use="optional"/>
        <xsd:attribute name="onclick" type="xsd:string" use="optional"/>
        <xsd:attribute name="offsetx" type="offsetx" use="optional"/>
        <xsd:attribute name="offsety" type="offsety" use="optional"/>
        <xsd:attribute name="hotspot" default="0">
          <xsd:simpleType>
            <xsd:restriction base="xsd:integer">
              <xsd:minInclusive value="0"/>
            </xsd:restriction>
          </xsd:simpleType>
        </xsd:attribute>
        <xsd:attribute name="hotspotfocus" type="xsd:string" default="gold"/>
        <xsd:attribute name="hotspotselected" type="xsd:string" default="grey"/>
        <xsd:attribute name="bgcolor" type="xsd:string" default="transparent"/>
        <xsd:attribute name="align" type="align" use="optional"/>
        <xsd:attribute name="valign" type="valign" use="optional"/>
        <xsd:attribute name="navtemplate" type="xsd:IDREF" use="optional"/>
        <xsd:attribute name="navtemplatefocus" type="xsd:IDREF" use="optional"/>
        <xsd:attribute name="navtemplateselected" type="xsd:IDREF" use="optional"/>
        <xsd:attribute name="navtemplatedisabled" type="xsd:IDREF" use="optional"/>
      </xsd:extension>
    </xsd:simpleContent>
  </xsd:complexType>
</xsd:element>
``` |

Fig. 4E-2 element color element datatable element event

| diagram | event |
|---|---|
| used by | element mac |
| attributes | Name    Type    Use    Default    Fixed    Annotation<br>onkey   xsd:string  optional |
| source | `<xsd:element name="event">`<br>  `<xsd:complexType>`<br>    `<xsd:attribute name="onkey" type="xsd:string" use="optional"/>`<br>  `</xsd:complexType>`<br>`</xsd:element>` |

Fig. 4H element group

| | |
|---|---|
| diagram | group ├─ (0..∞) ─┬─ ad<br>├─ button<br>├─ image<br>├─ select<br>├─ text<br>└─ rect |
| children | ad button image select text rect |
| used by | element page |

| attributes | Name | Type | Use | Default | Fixed | Annotation |
|---|---|---|---|---|---|---|
| | hidden | xsd:boolean | | false | | |
| | name | xsd:NMTOKEN | required | | | |
| | x | x | required | | | |
| | y | y | required | | | |
| | prevbutton | xsd:IDREF | optional | | | |
| | nextbutton | xsd:IDREF | optional | | | |
| | paging | xsd:boolean | | false | | |
| | width | width | required | | | |
| | height | height | required | | | |
| | startindex | xsd:string | | 0 | | | source:
```xml
<xsd:element name="group">
  <xsd:complexType>
    <xsd:choice minOccurs="0" maxOccurs="unbounded">
      <xsd:element ref="ad"/>
      <xsd:element ref="button"/>
      <xsd:element ref="image"/>
      <xsd:element ref="select"/>
      <xsd:element ref="text"/>
      <xsd:element ref="rect"/>
    </xsd:choice>
    <xsd:attribute name="hidden" type="xsd:boolean" default="false"/>
    <xsd:attribute name="name" type="xsd:NMTOKEN" use="required"/>
    <xsd:attribute name="x" type="x" use="required"/>
    <xsd:attribute name="y" type="y" use="required"/>
    <xsd:attribute name="prevbutton" type="xsd:IDREF" use="optional"/>
    <xsd:attribute name="nextbutton" type="xsd:IDREF" use="optional"/>
    <xsd:attribute name="paging" type="xsd:boolean" default="false"/>
    <xsd:attribute name="width" type="width" use="required"/>
    <xsd:attribute name="height" type="height" use="required"/>
    <xsd:attribute name="startindex" default="0">
      <xsd:simpleType>
        <xsd:restriction base="xsd:string"/>
      </xsd:simpleType>
    </xsd:attribute>
  </xsd:complexType>
</xsd:element>
```

Fig. 4I element image element include element mac

| diagram | |
|---|---|
| | (diagram showing mac element with children: datatable, var, navmap, event, timer (0..∞ choice), palette, page) |
| children | datatable var navmap event timer palette page |
| source | `<xsd:element name="mac">`<br>`<xsd:complexType>`<br>`<xsd:sequence>`<br>`<xsd:choice minOccurs="0" maxOccurs="unbounded">`<br>`<xsd:element ref="datatable"/>`<br>`<xsd:element ref="var"/>`<br>`<xsd:element ref="navmap"/>`<br>`<xsd:element ref="event"/>`<br>`<xsd:element ref="timer"/>`<br>`</xsd:choice>`<br>`<xsd:element ref="palette" minOccurs="0"/>`<br>`<xsd:element ref="page" minOccurs="0"/>`<br>`</xsd:sequence>`<br>`</xsd:complexType>`<br>`</xsd:element>` |

Fig. 4L element navitem element navmap element navtemplate element p element radio element select

| diagram | select | | | | | |
|---|---|---|---|---|---|---|
| used by | elements group page | | | | | |
| attributes | Name | Type | Use | Default | Fixed | Annotation |
| | bgcolor | xsd:string | | transparent | | |
| | height | height | required | | | |
| | hidden | xsd:boolean | | false | | |
| | name | xsd:ID | required | | | |
| | plane | plane | | vertical | | |
| | width | width | required | | | |
| | x | x | required | | | |
| | y | y | required | | | |
| | optionpad | xsd:integer | | 0 | | |
| | index | xsd:integer | optional | | | |
| | moreprev | xsd:IDREF | optional | | | |
| | morenext | xsd:IDREF | optional | | | |
| | onfocus | xsd:string | optional | | | |
| | onblur | xsd:string | optional | | | |
| | datasrc | xsd:string | optional | | | |
| | align | align | optional | | | |
| | valign | valign | optional | | | |
| | maxcount | xsd:integer | | 1 | | |
| | startindex | xsd:string | | 0 | | |
| | hlwidth | xsd:integer | required | | | |
| | hlheight | xsd:integer | required | | | |
| | navtemplate | xsd:IDREF | optional | | | |
| | navtemplatefocus | xsd:IDREF | optional | | | |
| | navtemplateselected | xsd:IDREF | optional | | | |
| | navtemplatedisabled | xsd:IDREF | optional | | | |
| | onclick | xsd:string | optional | | | |
| | onfocusoption | xsd:string | optional | | | |
| | displayindex | xsd:integer | | 0 | | |

Fig. 4V-1 element: select (continued)

source:
```xsd
<xsd:element name="select">
<xsd:complexType>
 <xsd:attribute name="bgcolor" type="xsd:string" default="transparent"/>
 <xsd:attribute name="height" type="height" use="required"/>
 <xsd:attribute name="hidden" type="xsd:boolean" default="false"/>
 <xsd:attribute name="name" type="xsd:ID" use="required"/>
 <xsd:attribute name="plane" type="plane" default="vertical"/>
 <xsd:attribute name="width" type="width" use="required"/>
 <xsd:attribute name="x" type="x" use="required"/>
 <xsd:attribute name="y" type="y" use="required"/>
 <xsd:attribute name="optionpad" default="0">
  <xsd:simpleType>
   <xsd:restriction base="xsd:integer">
    <xsd:minInclusive value="0"/>
   </xsd:restriction>
  </xsd:simpleType>
 </xsd:attribute>
 <xsd:attribute name="index" use="optional">
  <xsd:simpleType>
   <xsd:restriction base="xsd:integer">
    <xsd:maxInclusive value="0"/>
   </xsd:restriction>
  </xsd:simpleType>
 </xsd:attribute>
 <xsd:attribute name="moreprev" type="xsd:IDREF" use="optional"/>
 <xsd:attribute name="morenext" type="xsd:IDREF" use="optional"/>
 <xsd:attribute name="onfocus" type="xsd:string" use="optional"/>
 <xsd:attribute name="onblur" type="xsd:string" use="optional"/>
 <xsd:attribute name="datasrc" type="xsd:string" use="optional"/>
 <xsd:attribute name="align" type="align" use="optional"/>
 <xsd:attribute name="valign" type="valign" use="optional"/>
 <xsd:attribute name="maxcount" default="1">
  <xsd:simpleType>
   <xsd:restriction base="xsd:integer">
    <xsd:minInclusive value="1"/>
   </xsd:restriction>
  </xsd:simpleType>
```

Fig. 4V-2 element: select (continued)

```xml
        </xsd:attribute>
        <xsd:attribute name="startindex" default="0">
          <xsd:simpleType>
            <xsd:restriction base="xsd:string"/>
          </xsd:simpleType>
        </xsd:attribute>
        <xsd:attribute name="hlwidth" use="required">
          <xsd:simpleType>
            <xsd:restriction base="xsd:integer">
              <xsd:minInclusive value="0"/>
            </xsd:restriction>
          </xsd:simpleType>
        </xsd:attribute>
        <xsd:attribute name="hlheight" use="required">
          <xsd:simpleType>
            <xsd:restriction base="xsd:integer">
              <xsd:minInclusive value="0"/>
            </xsd:restriction>
          </xsd:simpleType>
        </xsd:attribute>
        <xsd:attribute name="navtemplate" type="xsd:IDREF" use="optional"/>
        <xsd:attribute name="navtemplatefocus" type="xsd:IDREF" use="optional"/>
        <xsd:attribute name="navtemplateselected" type="xsd:IDREF" use="optional"/>
        <xsd:attribute name="navtemplatedisabled" type="xsd:IDREF" use="optional"/>
        <xsd:attribute name="onclick" type="xsd:string" use="optional"/>
        <xsd:attribute name="onfocusoption" type="xsd:string" use="optional"/>
        <xsd:attribute name="displayindex" default="0">
          <xsd:simpleType>
            <xsd:restriction base="xsd:integer">
              <xsd:minInclusive value="0"/>
            </xsd:restriction>
          </xsd:simpleType>
        </xsd:attribute>
      </xsd:complexType>
</xsd:element>
```

Fig. 4V-3 element: text (continued)

| source | ```xml
<xsd:element name="text">
  <xsd:complexType mixed="true">
    <xsd:choice minOccurs="0" maxOccurs="unbounded">
      <xsd:element ref="br"/>
      <xsd:element ref="p"/>
    </xsd:choice>
    <xsd:attribute name="border" default="0">
      <xsd:simpleType>
        <xsd:restriction base="xsd:integer">
          <xsd:minInclusive value="0"/>
        </xsd:restriction>
      </xsd:simpleType>
    </xsd:attribute>
    <xsd:attribute name="bordercolor" type="xsd:string" use="optional"/>
    <xsd:attribute name="height" type="height" use="required"/>
    <xsd:attribute name="hidden" type="xsd:boolean" default="false"/>
    <xsd:attribute name="textcolor" type="xsd:string" default="black"/>
    <xsd:attribute name="name" type="xsd:ID" use="required"/>
    <xsd:attribute name="width" type="width" use="required"/>
    <xsd:attribute name="x" type="x" use="required"/>
    <xsd:attribute name="y" type="y" use="required"/>
    <xsd:attribute name="offsetx" type="offsetx" use="optional"/>
    <xsd:attribute name="offsety" type="offsety" use="optional"/>
    <xsd:attribute name="bgcolor" type="xsd:string" default="transparent"/>
    <xsd:attribute name="prevbutton" type="xsd:IDREF" use="optional"/>
    <xsd:attribute name="nextbutton" type="xsd:IDREF" use="optional"/>
    <xsd:attribute name="style" type="style" default="3"/>
    <xsd:attribute name="paging" type="xsd:boolean" default="false"/>
    <xsd:attribute name="avoid" type="xsd:IDREF" use="optional"/>
    <xsd:attribute name="prevpage" type="xsd:string" use="optional"/>
    <xsd:attribute name="startindex" default="0">
      <xsd:simpleType>
        <xsd:restriction base="xsd:string"/>
      </xsd:simpleType>
    </xsd:attribute>
    <xsd:attribute name="padding" default="0">
      <xsd:simpleType>
        <xsd:restriction base="xsd:integer">
          <xsd:minInclusive value="0"/>
        </xsd:restriction>
      </xsd:simpleType>
    </xsd:attribute>
    <xsd:attribute name="align" type="align" use="optional"/>
    <xsd:attribute name="valign" type="valign" use="optional"/>
    <xsd:attribute name="ellipsis" type="xsd:boolean" default="false"/>
  </xsd:complexType>
</xsd:element>
``` |
|---|---|

Fig. 4W-2 element timer element var element video

| diagram | video | | | | | |
|---|---|---|---|---|---|---|
| used by | element page | | | | | |
| attributes | Name | Type | Use | Default | Fixed | Annotation |
| | x | x | required | | | |
| | y | y | required | | | |
| | width | width | required | | | |
| | height | height | required | | | |
| | channel | channel | optional | | | |
| source | `<xsd:element name="video">`<br>`<xsd:complexType>`<br>`<xsd:attribute name="x" type="x" use="required"/>`<br>`<xsd:attribute name="y" type="y" use="required"/>`<br>`<xsd:attribute name="width" type="width" use="required"/>`<br>`<xsd:attribute name="height" type="height" use="required"/>`<br>`<xsd:attribute name="channel" type="channel" use="optional"/>`<br>`</xsd:complexType>`<br>`</xsd:element>` | | | | | |

Fig. 4Z simpleType adtype

| type | restriction of xsd:string |
|---|---|
| used by | attribute ad/@adtype |
| facets | enumeration image<br>enumeration text<br>enumeration bitmap |
| source | `<xsd:simpleType name="adtype">`<br>`<xsd:restriction base="xsd:string">`<br>`<xsd:enumeration value="image"/>`<br>`<xsd:enumeration value="text"/>`<br>`<xsd:enumeration value="bitmap"/>`<br>`</xsd:restriction>`<br>`</xsd:simpleType>` |

Fig. 4AA simpleType align

| type | restriction of xsd:string |
|---|---|
| used by | attributes button/@align text/@align select/@align |
| facets | enumeration left<br>enumeration center<br>enumeration right |
| source | `<xsd:simpleType name="align">`<br>  `<xsd:restriction base="xsd:string">`<br>    `<xsd:enumeration value="left"/>`<br>    `<xsd:enumeration value="center"/>`<br>    `<xsd:enumeration value="right"/>`<br>  `</xsd:restriction>`<br>`</xsd:simpleType>` |

Fig. 4BB simpleType channel

| type | restriction of xsd:integer |
|---|---|
| used by | attribute video/@channel |
| facets | minInclusive 0<br>maxInclusive 999 |
| source | `<xsd:simpleType name="channel">`<br>  `<xsd:restriction base="xsd:integer">`<br>    `<xsd:maxInclusive value="999"/>`<br>    `<xsd:minInclusive value="0"/>`<br>  `</xsd:restriction>`<br>`</xsd:simpleType>` |

Fig. 4CC simpleType height

| type | restriction of xsd:integer |
|---|---|
| used by | attributes ad/@height group/@height button/@height text/@height image/@height select/@height rect/@height video/@height |
| facets | minInclusive 0<br>maxInclusive 480 |
| source | `<xsd:simpleType name="height">`<br>  `<xsd:restriction base="xsd:integer">`<br>    `<xsd:maxInclusive value="480"/>`<br>    `<xsd:minInclusive value="0"/>`<br>  `</xsd:restriction>`<br>`</xsd:simpleType>` |

Fig. 4DD simpleType layer

| type | restriction of xsd:string |
|---|---|
| used by | attribute image/@layer |
| facets | enumeration foreground<br>enumeration middle<br>enumeration background |
| source | `<xsd:simpleType name="layer">`<br>  `<xsd:restriction base="xsd:string">`<br>    `<xsd:enumeration value="foreground"/>`<br>    `<xsd:enumeration value="middle"/>`<br>    `<xsd:enumeration value="background"/>`<br>  `</xsd:restriction>`<br>`</xsd:simpleType>` |

Fig. 4EE simpleType offsetx

| type | restriction of xsd:integer |
|---|---|
| used by | attributes button/@offsetx text/@offsetx |
| facets | minInclusive 0<br>maxInclusive 480 |
| source | `<xsd:simpleType name="offsetx">`<br>`  <xsd:restriction base="xsd:integer">`<br>`    <xsd:maxInclusive value="480"/>`<br>`    <xsd:minInclusive value="0"/>`<br>`  </xsd:restriction>`<br>`</xsd:simpleType>` |

Fig. 4FF simpleType offsety

| type | restriction of xsd:integer |
|---|---|
| used by | attributes button/@offsety text/@offsety |
| facets | minInclusive 0<br>maxInclusive 704 |
| source | `<xsd:simpleType name="offsety">`<br>`  <xsd:restriction base="xsd:integer">`<br>`    <xsd:maxInclusive value="704"/>`<br>`    <xsd:minInclusive value="0"/>`<br>`  </xsd:restriction>`<br>`</xsd:simpleType>` |

Fig. 4GG simpleType plane

| type | restriction of xsd:string |
|---|---|
| used by | attribute select/@plane |
| facets | enumeration horizontal<br>enumeration vertical |
| source | `<xsd:simpleType name="plane">`<br>  `<xsd:restriction base="xsd:string">`<br>    `<xsd:enumeration value="horizontal"/>`<br>    `<xsd:enumeration value="vertical"/>`<br>  `</xsd:restriction>`<br>`</xsd:simpleType>` |

Fig. 4HH simpleType style

| type | restriction of xsd:integer |
|---|---|
| used by | attributes navtemplate/@style ad/@style text/@style |
| facets | enumeration 1<br>enumeration 2<br>enumeration 3<br>enumeration 4<br>enumeration 5<br>enumeration 6 |
| source | `<xsd:simpleType name="style">`<br>  `<xsd:restriction base="xsd:integer">`<br>    `<xsd:enumeration value="1"/>`<br>    `<xsd:enumeration value="2"/>`<br>    `<xsd:enumeration value="3"/>`<br>    `<xsd:enumeration value="4"/>`<br>    `<xsd:enumeration value="5"/>`<br>    `<xsd:enumeration value="6"/>`<br>  `</xsd:restriction>`<br>`</xsd:simpleType>` |

Fig. 4II simpleType type

| type | restriction of xsd:string |
|---|---|
| used by | attribute var/@type |
| facets | enumeration string<br>enumeration int |
| source | `<xsd:simpleType name="type">`<br>  `<xsd:restriction base="xsd:string">`<br>    `<xsd:enumeration value="string"/>`<br>    `<xsd:enumeration value="int"/>`<br>  `</xsd:restriction>`<br>`</xsd:simpleType>` |

Fig. 4JJ simpleType valign

| type | restriction of xsd:string |
|---|---|
| used by | attributes button/@valign text/@valign select/@valign |
| facets | enumeration top<br>enumeration middle<br>enumeration bottom |
| source | `<xsd:simpleType name="valign">`<br>  `<xsd:restriction base="xsd:string">`<br>    `<xsd:enumeration value="top"/>`<br>    `<xsd:enumeration value="middle"/>`<br>    `<xsd:enumeration value="bottom"/>`<br>  `</xsd:restriction>`<br>`</xsd:simpleType>` |

Fig. 4KK simpleType value

| type | restriction of xsd:string |
|---|---|
| used by | attribute color/@value |
| facets | maxLength 9<br>pattern #?[0-9a-fA-F]{6,8} |
| source | `<xsd:simpleType name="value">`<br>`  <xsd:restriction base="xsd:string">`<br>`    <xsd:maxLength value="9"/>`<br>`    <xsd:pattern value="#?[0-9a-fA-F]{6,8}"/>`<br>`  </xsd:restriction>`<br>`</xsd:simpleType>` |

Fig. 4LL simpleType width

| type | restriction of xsd:integer |
|---|---|
| used by | attributes ad/@width group/@width button/@width text/@width image/@width select/@width rect/@width video/@width |
| facets | minInclusive 0<br>maxInclusive 704 |
| source | `<xsd:simpleType name="width">`<br>`  <xsd:restriction base="xsd:integer">`<br>`    <xsd:maxInclusive value="704"/>`<br>`    <xsd:minInclusive value="0"/>`<br>`  </xsd:restriction>`<br>`</xsd:simpleType>` |

Fig. 4MM simpleType x

| type | restriction of xsd:integer |
|---|---|
| used by | attributes ad/@x group/@x radio/@x checkbox/@x button/@x text/@x image/@x select/@x rect/@x video/@x |
| facets | minInclusive -704<br>maxInclusive 1408 |
| source | `<xsd:simpleType name="x">`<br>  `<xsd:restriction base="xsd:integer">`<br>    `<xsd:maxInclusive value="1408"/>`<br>    `<xsd:minInclusive value="-704"/>`<br>  `</xsd:restriction>`<br>`</xsd:simpleType>` |

Fig. 4NN simpleType y

| type | restriction of xsd:integer |
|---|---|
| used by | attributes ad/@y group/@y radio/@y checkbox/@y button/@y text/@y image/@y select/@y rect/@y video/@y |
| facets | minInclusive -480<br>maxInclusive 960 |
| source | `<xsd:simpleType name="y">`<br>  `<xsd:restriction base="xsd:integer">`<br>    `<xsd:maxInclusive value="960"/>`<br>    `<xsd:minInclusive value="-480"/>`<br>  `</xsd:restriction>`<br>`</xsd:simpleType>` |

Fig. 4OO

USER CUSTOMIZATION OF USER INTERFACES FOR INTERACTIVE TELEVISION

RELATED APPLICATIONS

This application is related to and claims the priority benefit of U.S. Provisional Application 60/401,523, filed Aug. 6, 2002, incorporated herein by reference. In addition, this application is a continuation-in-part of and incorporates by reference co-pending U.S. application Ser. No. 10/390,064, filed Mar. 14, 2003.

COPYRIGHT NOTICE

A portion of the disclosure of this patent document contains material that is subject to copyright protection. The copyright owner has no objection to the facsimile reproduction by any-one of the patent document or the patent disclosure, as it appears in the Patent and Trademark Office patent file or records, but otherwise reserves all copyright or rights whatsoever.

FIELD OF THE INVENTION

The present invention relates to User Interfaces for Interactive Television (ITV), which in one embodiment serves as a set of concepts and information presentation architectures for enabling users of interactive television services to customize other user interfaces that access the entire range of broadcast and on-demand programming content offered through an interactive television network, and made available via applications that may execute on the set-top box.

BACKGROUND

Interactive television (iTV) is currently available in varying forms. The most popular iTV offerings include: TV portals, interactive/electronic program guides, personal video recording and video on demand capabilities, enhanced TV broadcasts and other offerings.

A. TV Portals. Influenced no doubt by the analogy to popular Internet "portals" such as AOL and Yahoo, many think of a television (TV) portal as a non-video, non-broadcast, "Internet-like" page on TV. Contrary to this popular opinion, however, a TV portal is actually an application "window" into the world of interactivity that links various forms of services, including walled gardens (also known as managed content) that may contain video, text and image assets, delivered via both broadcast and narrowcast, virtual channels, interactive program guides (IPGs), enhanced TV broadcasts, video on demand (VOD) content and more. In fact, many interactive experiences can originate from the TV portal or users come into the TV portal for additional content and services. Thus, the portal may be accessed through a navigation overlay on top of regular broadcasts or through an IPG, virtual channel or enhanced programming.

Network operators, programmers and content producers have an opportunity to custom brand the content areas of TV portals, providing them with a foundation for offering interactive services and enabling new revenue streams. A portal can contain a controlled set of valuable, aggregated content and merchant sites accessible by consumers. Portal participants can consist of e-commerce providers, such as home shopping, home banking and brokerage services; various news services; weather and sports information providers; as well as advertisers, TV programmers and other content producers.

Managed content designed for a TV environment can be linked to the TV portal, forming an interactive experience that combines the convenient, audio-visually entertaining medium of TV with the immediate information access and electronic purchasing powers often seen on the Internet. The portal offers a secure environment with a common TV-centric user interface, personalization capabilities and cross-merchant shopping capabilities. Some of the key components of portal content include:

1. Basic Personalized Information—Basic on-demand information services available to end users (subscribers) are based on their preferences and/or profile, including headline news, sports news and scores, local weather, horoscopes, business news and stock quotes.
2. Branded Content—Information services in various categories include branded sources such as television networks, which may provide information and entertainment services in portals to augment their regular TV programming.
3. Shopping—"T-commerce" or "TV Commerce" includes categories such as books, video, music, gifts, electronics, apparel, travel and toys, as well as advanced shopping features such as comparison shopping, cross-merchant shopping carts and auctions.
4. Advertising—Advertising opportunities are widely available throughout the iTV landscape. Unlike Internet portals, which only provide targeted and personalized banner ads, broadband access and the rich medium of TV provide a compelling advertising vehicle, drawing consumers into a TV-centric entertainment experience that drives responses while providing the same targeting and personalization capabilities of the Internet.
5. Self-provisioning—Through a network operator's TV portal, subscribers can manage their own billing information and preferences, and subscribe to new services including premium services, e-mail, games, video on demand and more.
6. Virtual Channels—A virtual channel is a custom-branded TV channel that can be accessed from programming, the main menu or info bar, from a network operator portal, an IPG or by manually selecting a specified channel number (e.g., channel 401). Within such a channel, a TV network, advertiser or content provider can combine a video library with Internet or database content, and on-demand features enable viewers to control their interactions with the information. Thus, virtual channels allow for specific content opportunities for niche audiences, targeted advertising, brand building, and program promotions, as well commerce and subscription revenue streams.

B. Interactive Program Guides (IPGs). The IPG is the navigation tool for TV viewing, allowing viewers to easily search for programming by time, channel, program type, and so on. It is an essential tool for iTV users, especially as the number of channels and other offerings increase. IPGs provide an opportunity for companies to offer an increasingly large amount of data in an easy-to-use interface.

C. Personal Video Recorders CPVRs). PVRs store video programming on an internal hard drive and function like a personalized video server, allowing end-users to "time shift" their TV viewing. While watching live TV, the user can "pause" and "rewind", as well as "fast-forward" to catch up to the live broadcast. PVRs also act as autonomous agents, searching all of the available programming and building a dynamic menu of personalized content choices that the user can access at his/her convenience. Currently most PVRs are stand-alone units, developed and marketed by companies such as TiVo and Replay Networks (now Sonic Blue).

D. Video On Demand N OD) Services. VOD is essentially server-side time shifting (vs. client-side in the case of PVRs). Users are able to play, pause and rewind videos on their TVs via their remote control. Companies such as Concurrent, Diva, SeaChange and nCube provide VOD server technology.

E. Enhanced TV Broadcasts. Enhanced TV broadcasting provides interactive content linked to video programming. A user can request information on products within ads, access additional program information, such as sports statistics, or otherwise interact with a television broadcast such as a game show. This functionality is achieved through the transmission of an interactive trigger and data sent in the broadcast channel or other mechanism along with the video broadcast. For example, ATVEF (the Advanced Television Enhancement Forum) triggers are messages that arrive at a specific point in time during a broadcast (e.g., via text channel 2 of the closed caption channel carried on line 21 of NTSC video), and are intended to activate specific enhanced content.

Enhanced TV broadcasts can be combined with other services within a unified TV portal, integrating with a walled garden or virtual channel content to leverage robust order processing, fulfillment infrastructure and revenue sharing agreements that may already be in place.

F. Other Services. E-mail access, chat functions, music jukeboxes and photo albums are examples of other iTV offerings.

Many of the applications listed above are presented to viewers via a common user interface and order/transaction entry and tracking system. However, the use of such rigid and inflexible interfaces for the deployment of vast libraries of available content often results in a less than satisfactory experience for the viewer. Stated differently, the inability of the viewer to customize the interfaces that provide them with access to iTV content and applications is a limitation in present day iTV systems.

SUMMARY OF THE INVENTION

Described herein are user interfaces by which network operators, programmers, broadcasters and advertisers can deploy and make accessible libraries of available content and allow users of those services to customize the presentation and content of the information being presented to the users. In one embodiment, a user interface includes one or more screens each having one or more navigable and selectable elements through which a viewer is permitted to customize presentation and content of iTV application environments other than those associated with the user interface. Examples of the types of screens that might be included in this user interface are:

1. A screen having selectable elements through which the viewer is permitted to assign combinations of one or more of colors, images, font faces, and font styles to combinations of one or more of iTV application backgrounds, title bars, section borders, caption buttons, icons, inactive selections, active selections, menus, message boxes, scrollbars, tooltips, and windows. The selectable elements may be organized as themes preprogrammed by an iTV service provider. Alternatively, or in addition, the individual parameters of the themes may be programmable by the viewer.

2. A screen having selectable elements through which the viewer is permitted to select iTV content for various iTV application content categories according to the viewer's interests.

3. A screen having selectable elements through which the viewer is permitted to filter an iTV application and iTV application content according to the viewer's interests.

4. A screen having selectable elements through which the viewer is permitted to customize layout and ordering of one or more of menu items, content, advertisements, and video display areas of an iTV application.

5. A screen having selectable elements through which the viewer is permitted to associate iTV application functionalities with one or more of iTV application buttons, remote control buttons, and keyboard keys.

BRIEF DESCRIPTION OF THE DRAWINGS

The present invention is illustrated by way of example, and not limitation, in the figures of the accompanying drawings, in which.

DETAILED DESCRIPTION

Figure 1:
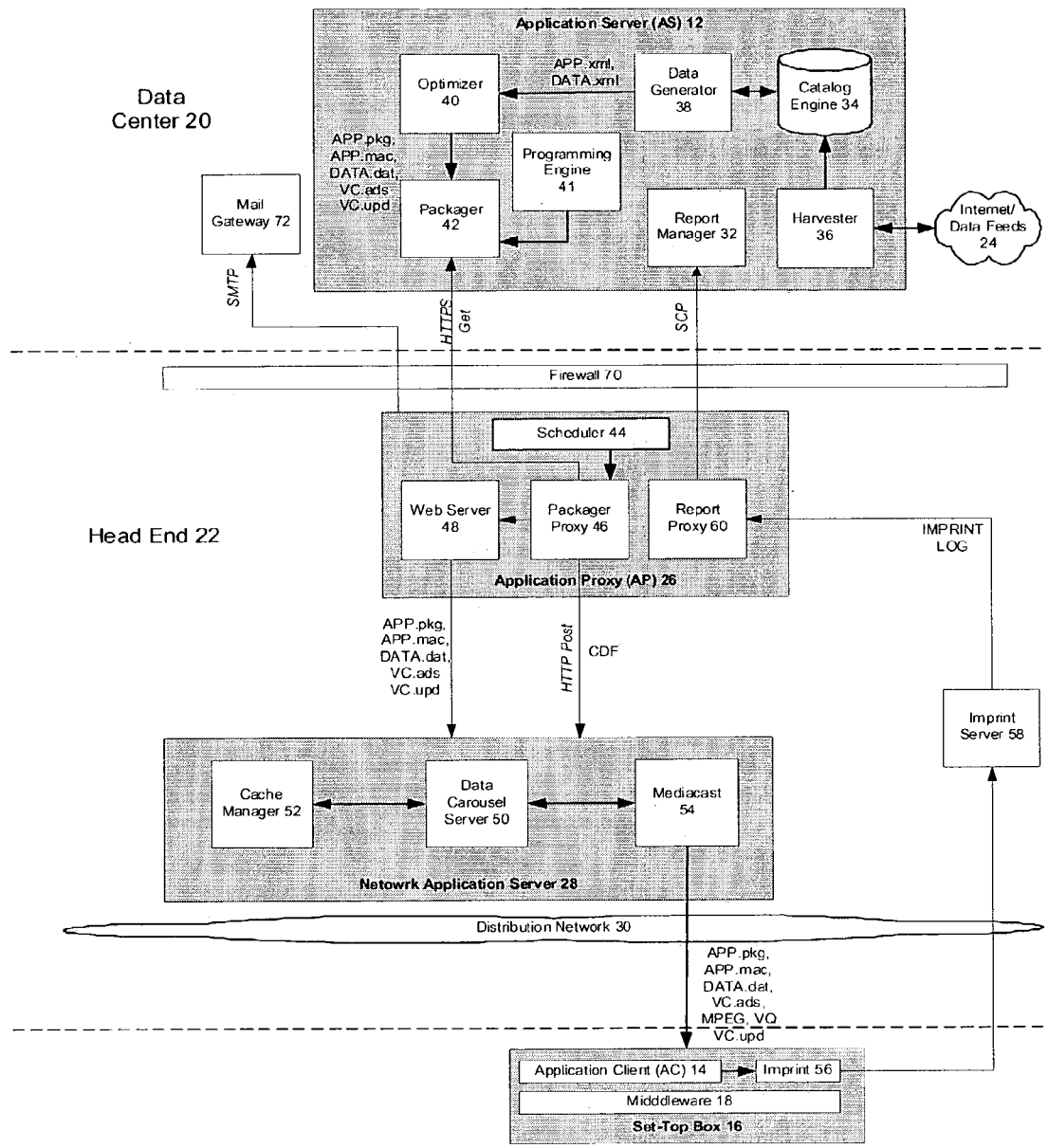
FIG. 1 illustrates one example of a unified application system (UAS).

Described herein are methods and systems to allow television viewers to customize iTV applications (i.e., the user interfaces associated therewith) by/through which network operators, programmers, broadcasters and advertisers can deploy and make accessible to those viewers libraries of available content. Stated differently, the present methods and systems allow users of iTV services to customize the presentation and content of information provided by iTV content providers. In one embodiment, the invention can be regarded as a set of user interfaces that allows users to customize the presentation and content of their individual iTV application environments other than those associated with the user interface.

Some existing iTV applications allow the viewer to customize some elements of the application's user interface. Examples of such applications are embedded client program guides and user settings applications that provide the ability to change colors in the embedded application's interface. However, a key differentiating aspect between these limited customizable applications and the current invention is that the current invention provides the viewer the ability to customize "dynamic" services. That is, the ability for customization supported within the current art does not extend to applications with other types of dynamic data; neither does it extend to new interactive applications that may be added to the interactive services.

The above-cited co-pending application Ser. No. 10/390,064 describes systems and methods for enabling and automating the delivery of iTV content to subscribers, which systems and methods are suitable for the delivery of the user interfaces (which may themselves be regarded as a form of iTV application) described herein. Briefly, the delivery system may include a server component adapted to allow content developers to create iTV applications (such as the present user interfaces that allow for customization of other iTV applications); a transport component configured to optimize the iTV applications and to deliver same to one or more client devices; and a client component resident on one or more client devices (e.g., set-top boxes) and adapted to render the iTV applications through a television so as to permit user interaction therewith. Using the techniques described in this co-pending application, iTV application definition and behavior may remain common across multiple client device types, middleware platforms, and/or iTV operating environments.

As also described in application Ser. No. 10/390,064, described herein are systems and methods by which, in one embodiment, content and application developers are provided a common application framework that enables rapid development and deployment of iTV applications across a broad spectrum of iTV networks made up of differing head end and/or set top box systems, and automates the process of delivering iTV applications across such networks. Described herein is a solution for operating a system of iTV applications that are uniformly programmable and where the system operator is given the control to manage the rights and the programming of that system of iTV applications. Described herein is a solution to the significant problems of deploying compelling, responsive and feature rich TV-centric applications on in-service set-top boxes by introducing a unique client technology that is targeted to the requirements of iTV applications.

The client technology referred to above may be implemented, in part, as a lightweight engine that provides a common execution framework for iTV applications. This allows multiple iTV applications that conform to a common application authoring specification to be deployed. This specification also supports the separation of application templates, which describe application layout and behavior, from dynamic data packages that are used by the application, and from business and programming rules packages that enable the programming of various types of content. This separation of function also significantly reduces the memory and bandwidth requirements otherwise needed for deploying multiple applications on set-top boxes. An example of the authoring specification for application definition is set forth in the form of a User's Guide in Appendix B.

FIG. 1 illustrates one embodiment of an end-to-end environment for developing, delivering and deploying iTV applications. This environment will be termed a unified application system (UAS) 10 and it includes two primary components: a client-side "display engine" that runs on set-top box middleware, and which is driven by a server-side "programming engine" that runs in the network head end and/or data center. The server component features an application server (AS) 12, which is responsible for programming, packaging and optimizing content for different applications and platforms. Such content is composed of the aforementioned templates, data and business rules packages. The application client (AC) 14 is the companion client solution that runs on the set-top box 16. It is responsible for the application rendering and behavior on top of the set-top box middleware 18. Different ACs 14 may be targeted for different set-top boxes 16. As will become apparent from a review of this disclosure, the UAS 10 combines the AS 12 and AC 14 (along with other servers and components described below) to enable network operators to deploy a robust system for iTV applications and to allow application developers to populate those applications with dynamic data from various content sources. These applications can be authored once and run compatibly on multiple different types of set-top boxes 16.

In the example shown in FIG. 1, the data center 20 is where the AC applications are created, optimized and validated by the AS 12, before being delivered to the network (e.g., cable and/or satellite) head end 22 for insertion into the network distribution system. In other embodiments, these functions may be performed in the head end or a regional distribution center. Applications may be authored using an authoring language designed for building applications targeted at a suite of ACs 14. One example of this authoring language is the XML authoring language set forth in detail in Appendix B. Application data is generated from dynamic data feeds 24 that are delivered to the AS 12 from various content providers (e.g., via the Internet). Application packages, including layouts, data, ad campaigns, programming rules and directives files specific to different middleware systems (such as carousel definition format (CDF) files for Liberate systems), are periodically updated and then delivered to an application proxy (AP) server 26 that may be located at the data center 20 or (as shown in the diagram) in the network head end 22.

The network head end (or network operator regional distribution center) 22 is where the AC applications are delivered and integrated with various network components so that they can be broadcast to subscribers. As used herein, the term head end also refers to a network operator regional distribution center, which may be used in some embodiments. Once an updated AC application package is delivered to the AP 26 in the head end 22, it is ready to be inserted into the network. This process is initiated by the AP server 26, which posts a CDF (or other information set, optimized for the given middleware system), to the network middleware application server 28. The CDF contains instructions and locations for all of the files that are part of the new application package. The network application server 28 then fetches the AC package assets from the AP 26 and performs any necessary modifications to the files so the set-top boxes 16 can access them. For example, depending on the set-top platform in use, dynamic image files may need to be converted to MPEG files and so on. Upon completion of these processes, the various AC application files are broadcast through the distribution network 30 via in-band and/or out-of-band carousels.

The AC 14 may, in one embodiment, reside as an applet in flash memory of the set-top box 16. In other cases, the AC 14 may be downloaded from the carousel as needed. In either case, when a user makes a selection to use an AC application, the set-top box 16 will invoke the AC and tune to the proper in-band carousel and/or fetch from an out-of-band carousel to retrieve the necessary AC application files. The AC 14 may also load files directly from a local client database. Once these files are loaded into the set-top box memory, the user can begin interacting with the application.

Application usage statistics may be collected at the set-top box 12 and periodically sent back through the distribution network 30 to the AP server 26. The AP server 26 then delivers these logs to a report manager 32 (often located at the data center 20) where usage reports are generated.

Using the unified application system 10 in conjunction with the common application profile defined by the authoring specification, many aspects of iTV applications can be automated. For example, in various embodiments, the automation of applications for a network operator's specific digital television and iTV platforms may be permitted by providing content receipt, validation, distribution, services, management and reports optimized for the target environment. In addition, the automation of secure transactions to merchants may enable network operators to integrate product purchasing and requests for information features into their on-demand services. That is, commerce features may be integrated with other content assets in a unified manner. Similarly, iTV advertising campaign management, insertion and targeting may be automated, allowing network operators and advertisers to incorporate text, graphics and video-based advertising campaigns into on-demand services. Proceeding further, elements of the service content, such as promotions, requests for information, placement opportunities and other elements can be programmed and scheduled across various services. This mechanism of dynamically placing elements of content in a unified manner across the multiple applications of the iTV service by specifying a set of rules and conditions for determining and placing the content is termed "programming".

Turning now to the application server 12 in more detail, in one embodiment the AS 12 includes a catalog engine 34, a harvester 36, a data generator 38, an optimizer 40 and a packager 42 and a programming rules engine 41. Report manager 32 may also be included in the AS 12 or may be a stand-alone server. Each of these functional units will now be discussed.

Catalog engine 34 allows iTV developers and system administrators to aggregate and categorize (via a common API and capture template schema mechanism) content from various data sources into a centralized, and also potentially distributed, database. The catalog engine 34 thus provides a single container from which data can be accessed, regardless of its source. The catalog engine 34 is integrated with the harvester 36, such that it may be populated with harvested content in the form of XML and expose content via the harvesting interfaces, but its primary objective is to provide a mechanism to store and serve data that is not captured via the harvester 36. As such, the catalog engine 34 provides a repository for storage and management of advertising campaigns, product and promotional categories, and business rules. Catalog engine 34 may be implemented, in part, as a relational database and thus may be equipped with features common to such databases. In one embodiment, catalog engine 34 may include a catalog manager, which provides a user interface (e.g., a web-based interface) for iTV developers and system administrators to specify the content they wish to harvest, define the mapping rules for catalog engine elements and categories, and schedule times at which harvesting should occur.

Harvester 36 enables new iTV services to be rapidly deployed by leveraging existing Internet and broadcast content. It is designed to extract, collect, integrate, and deploy content and commerce from a variety of sources 24 (e.g., Internet sources, news sources, VOD pitcher/catcher systems, and other data feeds including text and xml feeds) into new, rich, television-centric services. In one embodiment, the harvester 36 delivers content in the form of XML schemas. In one embodiment, the harvester 36 delivers content to the catalog engine 34. The content is thus dynamically harvested, re-purposed and enhanced for the television without affecting the technology resources or publishing costs of the content provider.

In order to re-purpose the content for a television experience, harvester 36 incorporates a transformation engine that converts a variety of data sources into television centric formats. This is distinguished from current transformation engines for iTV, which focus on transforming the set of both layout and data. In one embodiment, the harvester 36 delivers content in the form of XML schemas. That is, using the XML authoring specification described in Appendix B, application designers can map existing data sources to content areas and page layouts within an application template. Once the mapping of a data source is complete, no new versions of the content need to be maintained; the harvesting process is automated and dynamic. For example, if content from an Internet site is being harvested, changes in content posted on the site will be dynamically reflected through the TV centric design.

For video related content, harvester 36 conducts a dialogue with an asset distribution system (ADS) responsible for delivering such video assets and metadata. The harvester 36 acts as an asset management system (AMS) to such ADS for the purpose of retrieving and storing video asset metadata in the catalog engine 34. This process may conform to existing standards such as the TimeWarner Asset Distribution Interface (ADI) or the CableLabs VOD Content Specification 1.1 and 2.0.

When a viewer accesses harvested TV-centric content through a remote control and set-top box, the harvester 36 conducts a multi-step dialogue with the corresponding Internet site. This process simulates a user browsing and interacting directly with the site. Activities such as checking stocks, adding items to a shopping cart, or entering a username and password are mapped through the TV interface to the actual site itself. This means that a two-way dialog can be established without the need for changes or even access to a site's backend publishing systems. All of the site's existing security, information and commerce systems can remain unchanged to support viewers interacting through their televisions.

Packager 42 packages applications, data and assets in an efficient and optimized manner for delivery to the head end 22. In one embodiment, applications can be described in XML (as described in Appendix B), and data may be asset catalog metadata, ad campaign or application configuration information. Optimizations may consist of compression algorithms, such as WBXML or other binary serializable formats. The optimization may be specific to a target platform and network such that the available system resources are maximized. Optimization may include transforming the XML to a byte array where the target platform does not have the memory, or CPU capacity to parse WL. Data may be text or binary data such as numbers, images, ads or databases.

Programming rules engine 41 provides the ability for the network operator, programmer, or content producer to specify rules and conditions to dynamically place and target content to subscribers, and respond to user interaction in different ways. Programmed content consists of any iTV elements including advertising, promotions, requests for information, VOD clips, movies on demand, TV listings, other data including text, images and/or video, and even application links and associated provisioning.

sible, triggering of rules execution is given the following preferential treatment (in order):

1. On AS server 12 during construction of the broadcast content.
2. On AC client 14 for the remaining rules where possible.
3. On AS server 12 using a 2-way return path (back channel) request where required.

By way of illustration only, XML examples for location definition and programming campaign definition are provided below:

```
<?xml version="1.0" encoding="UTF-8"?>
<!--location list identifies the campaign -->
<location-list start="938129" end="948128">
    <location>
        <resource key="2"/>
        <campaign-schedule id="1_176_80">
            <interval start="938129"end="948128"/>
        </campaign-schedule>
    </location>
</location-list>
<?xml version="1.0" encoding="UTF-8"?>
<!--programming campaign resolves the element attributes and data -->
<campaign-list start="938129" end="948128">
    <campaign id="1_176_80" displayrule="2">
        <element id="1_176_81" type="1" displayruledata="1" onclick="vod("10100011")" src="img24135.ast"
        default="true">
            <condition>
                <equal name="package" value="bronze"/>
            </condition>
            <condition>
                <equal name="package" value="silver"/>
                <equal name="hbo" value="no"/>
            </condition>
        </element>
        <element id="1_176_82" type="1" displayruledata="2" onclick="vod("10100012")" src="img24138.ast">
            <condition>
                <equal name="package" value="platinum"/>
            </condition>
            <condition>
                <equal name="package" value="silver"/>
                <equal name="hbo" value="yes"/>
            </condition>
        </element>
    </campaign>
</campaign-list>
```

A programming campaign specifies the programming of a content element and consists of four main components:

1. A campaign key that uniquely identifies the campaign.
2. A list of candidates each providing a set of programmed values for the element attributes.
3. A qualifying predicate for each candidate, that consists of a generalized set of conditions.
4. A display rule, such as sequential, random or weighted, to select one candidate among those that qualify.

A programmable element is identified by the presence of a special resource key attribute that references a programming campaign, via a lookup, using the resource key, into a location list that provides the current campaign ID to use for programming the element. The AC 14 executes the campaign definition. This execution results in the selection of a qualifying candidate (by determining the truth value of the programming conditions). The selected candidate provides a resolution of one or more of the attributes and data of the programmable element, some of which may be newly specified, and some updated (from default values provided by the template and data package).

The above-described concept of "programming" by dynamic execution of rules is available as a mechanism to resolve properties of any content element. Wherever pos- Another aspect of programming is wherein some elements of a specific item of programming are not known ahead of time. Examples include:

1. the VOD identity of a daily network program (e.g., NBC Today) video clip; It is not known ahead of time where this content opportunity (e.g., via a tile image or text link) to play the clip will be placed. In other words, it is programmed into the iTV service.
2. Some network programs (e.g., ESPN SportsCenter) provide encoded video clips a period of time (e.g., 15 minutes) after each show. The VOD ID has to be updated into all areas in the iTV service where the clip is programmed, for example to be delivered in the next half-hourly scheduled package so that the new clip is available approximately one-half hour after the live broadcast.

In this form of programming, the AS 12 resolves the candidate element properties by executing a lookup, such as a catalog lookup, to determine the element data. The candidate is then subject to the normal set of rules that may also condition its placement and response. Table 1 below provides an example of the scenarios presented above:

TABLE 1

Candidate Element Properties

| VOD Asset Id | Channel/Family | Show/Program | Segment/ Genre | Date | Time |
|---|---|---|---|---|---|
| 3409192325 | NBC | NBC Today | News | Mar. 15, 2002 | 10 am |
| 3240925809 | ESPN | ESPN SportsCenter | Sports | Mar. 14, 2002 | 3 pm |
| 5366123412 | . . . | . . . | . . . | . . . | . . . |

In general, this form of programming can be understood as a content area in the iTV Service that has programmable elements, but the programming rules to resolve the content change in ways that cannot be predicted. In other words, for a given week the programming may resolve to a list of current titles along with their poster art, but another week it may be the top rated clips across the whole service, and the following week the list may be required to display other programs and their poster art. Thus, the number and nature of the associative information or keys that determine the content change, and is programmable. The format of the content (the template) does not change.

To summarize the operation of AS 12 then, an application author develops "channel" or application templates using the authoring specification described in Appendix B. These templates are represented in FIG. 1 using the file name APP.xml. Application descriptors are also authored, which allow queries to be made to the catalog engine 34. These queries result in the creation of dynamic data files (DATA.xml), which will ultimately populate the APP.xml layout templates. Stated differently, the App.xml file may refer to the asset catalog queries for specific metadata, metadata categories, ad campaigns, commerce product and/or category of video assets, etc. The data generator 38 inserts the selected references into the application page or into the DATA.xml file to accompany the application, as configured by business rules describing the application.

Although not shown in the diagram, an advertisement server may be invoked by similar queries that create ad campaign files for AC applications to display advertisements. Each time a combination of these processes takes place, a "package" of AC files (App.xml and DATA.xml) is created by data generator 38. The newly generated package is delivered to the optimizer 40. The optimizer is responsible for converting the channel and data files into a highly optimized format readable by the AC 14. As part of this process, the optimizer 40 may parse the application file for sub pages and external asset references. Application definitions may be invoked recursively, as necessary. Part of the optimization process includes separating the user interface (i.e., the layout or presentation) from the actual data assets (e.g., the asset catalog metadata, ad campaigns, application configurations, etc.). Further, the user interface and data elements are converted to a binary format specific to the network topology and set-top platform to produce the optimized set of files (e.g., App.pkg, App.mac, DATA.dat, VC.ads, VC.upd). Within this package, mac files define application layout, logic, and behavior, .dat files define application specific data, .upd files contain list of updated .dat files on a carousel, ads files contain ad campaign/location information, and .pkg files contain mac, vc.dat, and vc.ads file in a single file for initial load of applications.

The optimized package of files is delivered to the packager 42, where it is prepared for delivery to the AP server 26 in the network head end 22. The packager 42 is responsible for creating a CDF or other directives file to define all of the assets in the package. The packager 42 also assigns PID values to each of the images in the package. Upon completion of the package, it is made available to the AP server 26, which includes a packager proxy 46 that periodically (under the control of a scheduler 44) fetches (e.g., using an HTTPS Get) the latest package from the AS 12.

When the AP 26 retrieves a new package, it stores all the associated assets on a conventional web server 48 and posts the CDF for the package to the network application server 28. The data carousel update (DCU) component 50 of the network application server 28 checks its cache manager 52 to compare the new package to the previous package. For any files that have changed, the network application server 28 executes any necessary processes to update the content. For image content, this may involve crawling the HTML/images hosted on the AP web server 48, rendering them to MPEG format, and delivering them back to the DCU server 50. For all other content (.pkg, .dat, mac, ads, .upd files), the network application server 28 makes a direct connection to retrieve those files hosted on the AP's web server 48.

Once all CDF items have been fetched, rendered and assigned MPEG PIDs as specified in the CDF, the Mediacast component 54 of the network application server 28 begins carouseling the files through the distribution network 30. The files may be delivered over an in-band and/or an out-of-band carousel.

Upon selection of an application by a user (e.g., via a remote control associated with set-top box 16), the AC applet 14 loads the necessary files from the in-band and/or out-of-band carousels to display the application. The user is then able to interact with the application running on the set-top box 18. While using an application, it is possible that a new package of data/advertisements/promotions/programming packages is made available for that application. The AC 14 constantly listens for a vc.upd file in carousel. When a new vc.upd file is detected, the AC 14 makes an attempt to retrieve from the carousel any new files and programming associated with the application, and refreshes the current screen.

The AC 14 may record application usage, for example through a Liberate Imprint client 56 running on the set-top box 16. The Imprint client 56 periodically forwards a log file of the recorded usage back through the distribution network 30 to an Imprint server 58. The Imprint server 58 then periodically posts the logs to a report proxy 60 in the AP server 26. On a scheduled basis the AP server 26 may forward the logs back to a report manager 32 in the data center 20, where the data is aggregated and made available in the form of various reports. Of course in other embodiments a different logging client and server combination may be used.

Figure 2:
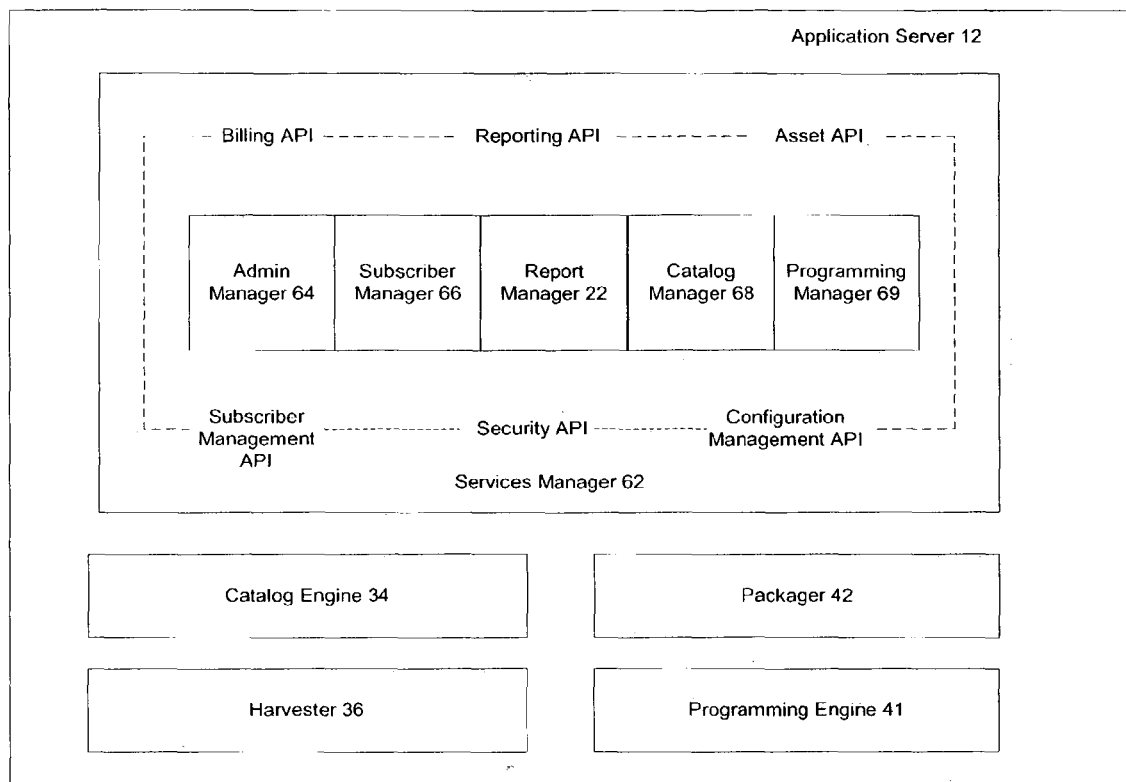
FIG. 2 illustrates one example of an application server.

Turning now to FIG. 2, an overview of a services manager 62 that provides an integrated set of management consoles for AS 12 is presented. The services manager 62 provides an interface (which may be web-based in some embodiments) for administration, service definition, scheduling, notifications, advertising, business rules and programming specification, reporting, and updates to other applications and services of UAS 10. This may include the specification of advertising campaigns, product categorization, commerce targeting rules, promotional opportunities, business rule specification and other application creation activities at AS 12. In one embodiment, the following management consoles are provided:

a Administration Manager 64. This is an application that enables system administrators to manage the configuration and deployment of iTV applications and services across multiple servers and multiple operator systems.

b Report Manager 22. As discussed above, this is an application that allows system administrators and other users to design, run, and publish a selection of reports.

c Subscriber Manager 66. This is an application that allows system administrators to create and edit users and groups, and assign access privileges to specific system components and functions within those components.

d Catalog Manager 68. This is an application that allows developers and system administrators to aggregate and categorize content from various data sources into a centralized database.

e Programming Manager 69. This is an application that allows the network operator, programmer or content producer to specify the elements of advertising, promotional opportunities, VOD placement, image and text placement, subscriber targeting, service and application provisioning, interactive user responses and other programming elements in the service. It allows the administrator to specify the condition predicates and dynamic associative lookups and business rules that constitute service programming.

The various managers may be accessed through one or more APIs for billing, subscriber management, security, content management, asset management, and reporting.

Returning to FIG. 1, the AP 26 is a distributed component of the AS 12 that improves performance and reliability of the service and facilitates secure data exchange between an MSO's private network (i.e., head end 22) and the data center 20. Typically, the head end network is protected by a firewall 70 that does not allow a connection to be initiated from the outside. Installed within the head end 22, the AP 26 initiates a connection with the AS 12 at the data center 20, retrieves application CDF files and assets at scheduled intervals, and transfers these AC applications to the network application server 28. Additionally the AP 26 performs a variety of reporting, notification and other functions as described elsewhere herein.

The AP 26 improves the performance and reliability of iTV services by acting as a remote cache for the AS 12. For example, if the connection between the head end 22 and data center 20 is down, if a data feed is interrupted, or if there are any other problems serving application content, the AP 26 will continue to function in the head end 22, successfully delivering "cached" content to the service. This provides subscribers with no service downtime while operations and support staff resolve the problems.

Like AS 12, the AP 26 may include consoles (which may be web-based) for administration, configuration, scheduling and notifications. It may also issues success and failure e-mail notifications of various operations to the data center 20 via mail gateway 72.

Turning now to the application client 14, it is a lightweight solution running on middleware 18 or set-top box operating systems that enables the automation, distribution and optimization of the iTV applications. Different versions of AC 14 may be provided for different platforms, such as the PowerTV operating system, OpenTV operating system, Microsoft operating system, or Java virtual machines running on a set-top box (MAC-J). In all such cases, the AC 14 provides a common application framework for the iTV applications.

The AC 14 is responsible for reading in optimized files and displaying iTV channels that end-users can interact with. The AC 14 can be best described as containing four modules: 1. a core state machine, 2. a graphical widget layer, 3. a broadcast file system (BFS) layer, and 4. a VOD layer. The core state machine is governed by a central event loop. When new content is required (as a result of the AC 14 being started, a user keypress, or a timer event), the core state machine calls the BFS layer to load any needed files from the carousel (i.e., the broadcast file system). Once the BFS layer reports that the files are ready, the core state machine passes the new content to the graphical widget layer with a command to draw a certain portion of the content on screen. If there is VOD content to be rendered, the core state machine calls the VOD layer to render it.

The graphical widget layer is responsible for rendering content, passed to it by the core state machine, to the screen. Each full screen of content is encapsulated as a new page object. Each page object refers to a section of the layout file, which contains compact binary representations of all the graphical components on the page. The page object steps through the binary description of the content, drawing graphical components as needed (text objects, images, ads, etc.) to render the page.

The BFS Layer is responsible for reading files from the broadcast file system, or carousel. These files typically contain screen layout information or tables of data intended for display within graphical components, and have been generated by the optimizer and placed on the carousel by the packager. The general file format for any BFS file is a byte array, with pointers to individual elements within the byte array. The BFS layer is responsible for interpreting these pointers properly, so that the other code modules can request individual elements within any BFS file by file, table, row, and column without any knowledge of how the BFS files are represented internally. The BFS layer is also responsible for the mechanics of loading these files from the carousel. Thus, the core state machine merely calls the BFS layer, passing in an array of filenames to fetch from the carousel. The BFS layer checks that all the requested files are available, loads them, and issues a callback indicating that the operation has either failed or completely succeeded.

The VOD Layer is responsible for displaying video-on-demand content and allowing the user to control playback. The core state machine determines what VOD content is displayed, and when to display it.

The AC 14 loads several files from the carousel to display a "channel" of iTV content. The files are of several types, each with its own three-letter extension as shown in Table 1. All AC files are generated by the optimizer component 40 that resides on the AS 12.

TABLE 2

Types of files File

| File | File Extension | Input to Optimizer 40 | Purpose |
|---|---|---|---|
| Layout file | .mac | .xml | Contains page layout information |
| Data files | .dat | .xml | Contains data used to populate layout files |
| Ad and Programming files | .ads .pgm | .xml | Contains information about and conditions to determine which ads and other programming elements to display when and where within the channel. |
| Package file | .pkg | .mac, .dat, .ads | Bundle the vc.mac, vc.dat, and vc.ads files to expedite the initial load of a channel. (That is, one carouse) visit to initially load a channel rather than three carousel visits) |
| Update file | .upd | Generated upon other file updates | Informs the MAC-J client of new content in all other files on the carousel. |

In one embodiment of the Optimizer 40, all file types share a common base-level table structure: each file is made up of one or more tables. Each table, in turn, is made up of one or more rows of one or more columns each. Thus, a table with 4 rows and 5 columns will contain 4×5=20 elements. The elements themselves are byte arrays; each element can be any length (including zero bytes); the length of each element is specified within the table header. Because the table header contains pointers to all elements within the table, accessing an element within the table is fast.

Although all file types share this basic table structure, the meaning of each table (or each row or column within a given table) is different for each file type. These meanings are recorded in a file as variables whose names start with "TABLEINDEX_". The following outlines the filetype specific table structures:

a Layout files (.mac):
  1 Each table contains a different page of layout data (except for the first 9 tables in this file; they are handled specially). Each of these tables contain multiple rows, one column across.
  2 Each row contains one separate graphical component of the page.
b Data files (.dat):
  1 Tables are structured as the application author desires.
c Ad files (.ads):
  There are 4 tables.
  1 AdAsset Table: contains all the bitmap, pframe, text assets
  2 AdCampaign Table: grouping of ad asset information and associated conditions along with display rules to select among qualifying candidates
  3 AdSchedule Table: grouping of campaigns per time period
  4 AdLocation Table: grouping of schedules
d Programming campaign files (.pgm):
  There are four tables.
  1 ProgrammingAsset Table: contains all the bitmap, pframe, text assets
  2 ProgrammingCampaign Table: grouping of programming element information and associated conditions along with display rules to select among qualifying candidates
  3 ProgrammingSchedule Table: grouping of campaigns per time period
  4 ProgrammingLocation Table: grouping of schedules e Update files (.upd):
  1 One column table. Each row is a string filename of the file that needs to be updated.

The elements within these tables, as mentioned above, are variable-length byte fields. Each element can be any one of the following types:
  a string: zero or more bytes, one byte per character
  b integer: four bytes
  c short: two bytes
  d byte: one byte The element itself does not contain any indication of its type; the type is implied by the element's position within the table. In other words, the AC 14 knows which type it is looking for when reading an element, so it processes the bytes it finds in the element accordingly. If there is a mismatch between optimizer and client, then the client may try to read part of a text string as an integer vice versa.

Following this same embodiment of the optimizer where a byte array is generated, when the AC 14 reads in a file from the carousel, it keeps it in memory as a monolithic byte array, and indexes into that byte array to read out each element (or update any element in place) as desired. An alternative embodiment would be to parse the file out into an array of Java objects as soon as it is loaded from the carousel, but this would be too much of a load for a low powered set-top box as it would incur additional time and memory usage to create all these objects rather than keep the file as one monolithic array.

In one embodiment, the AC 14 may be regarded a collection of the building blocks for any application that one might conceive for a particular iTV platform. For each platform (e.g., set-top box and middleware/operating system combination) on which the AC 14 is implemented, it may take on different forms. That is, each AC 14 may look the same to the applications that make use of it, but on different platforms the AC 14 may leverage the available platform resources to different extents. Using a sufficiently lightweight Java virtual machine (JVM) platform as an example, the application developer has the facilities of the underlying JVM available, including, potentially, applications that can incorporate video/audio as well as supporting dynamic data updates, video overlay, and synchronization with TV programming. In these instances, the AC 14 uses the JVM to provide applications with a client framework supporting these features. In another embodiment, where the set-top environment, whether Java, C, or other programming context, provides a subset of such features, however limited, the AC 14 will compensate by providing the remaining features as required by the application definition framework, so that a TV-feature rich, common application framework is available to content providers and application developers. Various embodiments of AC 12 can be deployed for broadcast-only environments, while others may be used for 2-way networked application implementations or a combination of two-way and broadcast.

Figure 3:
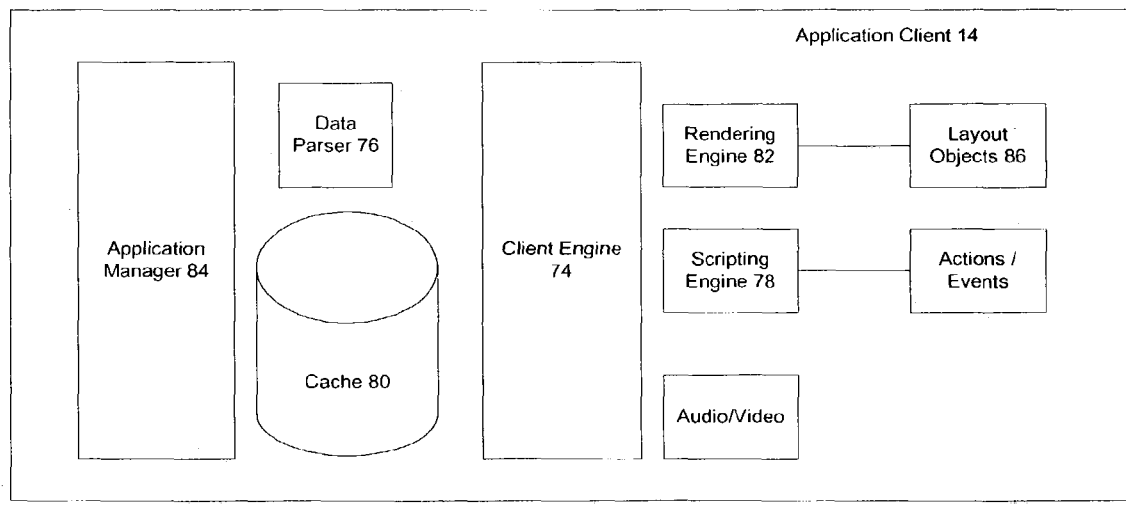
FIG. 3 illustrates one example of an application client.

Referring now to FIG. 3, regardless of the set-top platform on which it executes the AC 14 includes several common components, including client engine 74. This engine is responsible for the overall logic and functionality of any application. It manages applications from framework descriptions where the data, the layout and behavior, and the rules are separately defined. This is distinguished from other client engines where the application has been merged to a single specification before consumption by the client. It includes a data parser 76 to interpret the data format it receives, a scripting event model 78 for performing various actions, a programming rules engine (which may be part of client engine 74) for interpreting the programming elements, and a cache 80 for displaying applications. Data parser 76 reads in the virtual channel application code and processes it into usable directives for the client engine 74 to manage, render and execute event actions within the application. Based on the platform (e.g., the PowerTV operating system), the client engine 74 may provide rendering functions, or simply use the rendering engine 80 provided by the middleware platform.

Application manager 84 is another common component and is responsible for creating a logical navigation structure for each screen, positioning of defined objects on a screen, and communicating information between objects and screen. Some of these objects monitor user activity and the presentation of particular items such as ads.

Application layout objects (widgets) 86 are other common components of AC 14. This is a set of pre-built, tested controls for any TV user interface on a particular iTV middleware platform. Objects that require a standard behavior and appearance are stored here. Some of these widgets are required only for two-way network implementations. The application author can customize certain features of widgets (e.g., background color, font size) but the widgets have a general behavior and form factor which are well tested, built for TV, and completely reusable from application to application.

Form controls, cookies and advanced layout and management objects are some of the application layout objects that may be added to the two-way AC client 14 to provide some or all of the following capabilities:

a Text Input: A field that accepts alphanumeric input from the end-user. The control can be designated as a password input which would mask the entered characters. The maximum number of characters accepted by the control is specified. When the amount of data input is larger than will fit in the field, the visible text will scroll to keep the tail of the entered text visible.

b Check Box: An element that can be either on or off.

c Radio Button: A selectable element that works in conjunction with other radio buttons contained within the same radio group. Only one radio button can be selected at any time within the same group.

d Spinner: A pre-populated list of possible items where only 1 item can be selected. When items exceed the viewable space the list can be scrolled.

e Hidden: Has no interface feature. This is used to handle extra data required by a form element.

f Select: A pre-populated list of possible items where only 1 item can be selected. When items exceed the viewable space the list can be scrolled either horizontally, vertically or both. Vertical scrolling provides similar functionality to the Spinner control. The location of the selected item can always be the same physical position within the control, i.e. the list will move but the selected item will always be displayed in the same position. Alternatively, the selected indicator would move within the control.

In one embodiment, the AC 14 supports cookies. Cookies are a mechanism that provides server-side connections used to both store and retrieve information from the AC connection. A server, when returning an HTTP object to AC 14, may also transfer a piece of state information which the AC 14 will store. Included in that state object is a description of the range of URLs for which that state is valid. Any future HTTP requests made by the AC 14 that fall in that range will include a transmittal of the current value of the state object from the AC 14 back to the server.

In one embodiment, the following advanced objects can be available to support more advanced, TV-centric applications.

a Groups: A group of design controls that can share properties and behaviors. For example, the group can contain the appropriate font properties and all controls within the group will use the same values unless they have their own properties defined.

b Collection: A collection is a special type of group. Only one member of a collection can be displayed on the screen at any one time, like pages in a book c Graphical Transitions: Transitions allow portions of the markup to move along linear paths when triggered by standard user actions such as clicking and navigating or by timed events. Transitions have transparency, customizable accelerations, velocity, and clipping areas. Together with navigation-exclusive groups they make possible true pop-up dialogs, scrollable lists, drop-down menus and other dynamic interface elements. Transitions also honor "z-depth" and are properly obscured by foreground objects that they pass behind. A series of actions may be triggered when a transition completes, allowing a cascade of subsequent transitions and actions. All of this is fully exposed in the XML tag language and does not require custom application recompilation.

d Subroutine tag: An XML construct that allows a series of actions to be defined once and referenced multiple times with different arguments to prevent repetition of action code.

e Clipping widget: A device for clipping a group of visible widgets to a specific screen area. Useful for user defined list boxes and tickers.

f Timer widget: A widget that allows multiple concurrent timers that can trigger one-time or periodic events. The timer events can be started when the page is loaded, when other events such as button clicks and transition finalizations occur, or when chained to other timers.

In another embodiment, two-way virtual channels deployed with AC 14 can easily accommodate the requirements for video integration, providing the viewer with media-rich applications that seamlessly blend text, graphics and branded programming content. Video integration adds the following features to a virtual channel application:

a Session Setup: Session setup will use DSM-CC and SSP.

b Stream Control: AC 14 will communicate directly with the VOD servers, for example using DSM-CC based LSCP protocols for stream control operations over the out-of-band channel.

c Parental Indicator: AC 14 may use the SARA API's for all parental control functionality.

d Trickmode Indicator: Trick mode functionality may be presented in an overlay (e.g., along the bottom portion of the television screen). The following trick mode functions may be supported: fast forward (FF), FF×2, rewind (RW), RW×2, pause, stop, FF-to-end, RW-to-beginning.

e LSCP Protocol: AC 14 may communicate directly with the VOD servers via the LSCP protocol to avoid overhead and will have a high priority thread to handle the requests from the viewer.

Thus, the AC 14 brings considerable value to application developers and network operators by providing a core set of functionality and components to build and deploy an application. Further, the AC 14 provides the TV viewer with a well-defined set of user interface controls and navigation behaviors, such that users become accustomed to general application behavior across all the virtual channels and iTV applications utilizing the AC 14. Some examples of these capabilities will now be presented.

In one embodiment, the AC 14 serves two primary roles in its interaction with a server: it determines the precise ad(s) that will appear within a TV page (based on a broadcast rules package), and it measures campaign effectiveness via logging of impressions and click-throughs. Because data is updated in specified intervals in a broadcast environment, client-side ad selection assures that advertisements can be refreshed more frequently if desired. Client-side logging of impressions and click-throughs is of course dependent on the implementation of the two-way AC 14.

At the outset and using an administrative console, advertising assets and campaigns are assigned to pre-determined locations within the pages of an iTV service. When a page to be optimized (crawled) for AC 14 contains an advertisement, the ad server (or AS 12 if no specific ad server is used) inserts a specific reference to the exact campaign that was assigned to the page during the given time interval. The ad server creates a corresponding global advertisement resource file of all campaigns that occur on pages accessed during the specified time period, and places it onto the broadcast carousel. This file contains campaign description XML files (including display rules and click-through instructions) and advertising assets (or references to them).

Upon executing a page that contains a reference to an ad campaign, AC 14 looks in the global campaign resource file to identify the campaign's display rule and all advertisements associated with the campaign. AC 14 then executes the display rule locally and displays the appropriate advertisement. The data logged by AC 14 includes impressions (i.e., pages that contain a specific campaign) and click-throughs (tracked via the path taken to a campaign "microsite.").

Upon executing a page that contains references to programming elements, AC 14 executes the programming campaigns referenced by the "key" attributes of those elements. AC 14 executes its programming rules engine which identifies the campaign using the key, executes the conditions to determine the qualifying candidates, executes the display rule to select one among the qualifying candidates, and resolves the one or more of the (non-key) attributes and data of the programmable element, some of which may be specified newly, and some updated (from default values provided by the template and data package).

As with all data logged by AC 14, impression and click-through data is uploaded to a reporting sever. The two-way implementation therefore enables campaign reporting and tracking. The AC log file fully integrates with the data-reporting engine to provide impression and click-through statistics.

Another example of specific features and functions in some embodiments of the AC 14 are exemplified when considering data collection and reporting. As described above, the AC 14 allows end users to view specific video, product, and content offerings. As the viewer navigates the iTV applications and selects offerings, AC 14 records the transaction internally and periodically sends back its usage log to a server which then may aggregate the data into a centralized database that is used for reporting.

An example of the data targeted for collection includes:

a Date.

b Event type—TVChannel: this event will report which channel the viewer watched.

c Event type—Impression: This event will report which interactive application screen was viewed and also which advertisement (or other asset) was presented on the screen.

d Set-top ID-—MAC address.

e Duration.

f Additional data—optional.

Where the features of the set-top box permit, in one embodiment, the AC 14 can provide for scaled video and hot key support:

a Scaled Video—It is not possible for set-top boxes having limited memory to process high-resolution graphics and scaled video at the same time. Application designers may instead choose any of the following options:

i Use low-resolution graphics with the scaled video (this requires the creation of a "duplicate set" of assets)

ii Overlay high-resolution graphics over the video and do not scale the video.

iii Use high-resolution graphics and do not have scaled video.

b Hot Key Support—The ability to specify a hot key to launch applications will be available.

In a further embodiment, the AC 14 can cater to large quantities of data being downloaded, by maintaining a "database", or cache, that is used to store the data. Querying capabilities will be available to allow for efficient data retrieval by applications. For example, the videos available on a VOD server can be downloaded to the client. Depending on the application, the database client can select videos that match a viewer's criteria (e.g., action movies) and the application will display the relevant details.

In yet another embodiment, due to the exigencies of various set-top boxes, the blending of usage of in-band data delivery, such as, for example a data carousel, and out-of-band data delivery can be adjusted by configuration. Further, multiple algorithms for optimization may be used for package transfer over the network, such as via the in-band carousel, or out-of-band. Optimizations include XML compression to byte array or other format, WBXML binary compression and decompression, object serialization, and others.

As indicated above, AC 14 is, in one embodiment, a Java applet (jar file) that gets loaded into memory when invoked by the subscriber, or is pre-loaded, or partially loaded, prior to invocation and brought to the foreground upon subscriber invocation. The AC 14 may be downloaded from a carousel as needed or it may reside in the set-top box flash, or DRAM memory. It is suggested, however, that the AC applet reside in memory for several reasons:

a Performance—AC applications will load much faster because the AC applet does not need to be first downloaded from the carousel.

b Stability—There is no risk of the AC applet being corrupted or removed from the carousel if it is flashed to the set-top box, or stored in memory.

c Access—The in memory AC applet can be launched directly from a main menu of the iTV service with a configurable button.

d Memory usage—If the AC is flashed of the box then only a small portion of the AC applet gets copied into the system heap, the rest runs from flash memory.

When deployed to a set-top box 16, an AC 14 is configured to launch a "menu" application. The menu application can be any type of application (an overlay menu, a portal, a virtual channel, etc), and is the initial application that is accessed when entering a service offering of AC applications. The menu application can then contain links to other applications to enable navigation through an entire iTV service of applications.

An AC service is a system of various AC applications. The term "system of applications" is used because the AC applications are uniformly programmable. That is, they are defined with separate layout and data where one design template may take on many different data sets, or one data set may be used by multiple templates. One AC application may also contain multiple services. The packaging of services in to an application is highly dependent on the amount of available memory on the set-top box 16. Where less memory is available the AC application packages will have to smaller and thus contain fewer services. To add an AC application to the service, the author adds a loadapp( ) method somewhere in the menu application (or another application that is accessible from the menu). This effectively tells the AC 14 to switch applications. Because of limited resources at the set-top box 16, it is usually the case that only one AC application (APP.mac) and one data file (DATA.dat) can be loaded into memory at a time. In one embodiment, the optimizer 40 ensures that no single file can exceed 20 kB in size so as to stay within the set-top box memory limitations.

From the above, it should be clear that the described embodiments differ significantly from existing iTV technologies. For example, the described embodiments provide an application system abstraction that describes a common application framework for the definition and behavior of applications across multiple client device types and iTV operating environments. Stated differently, the described embodiments provide a unified TV application system for delivering multiple TV Services, such as IPGs, main or root TV menus, managed content services, virtual channels, VOD services, PVR applications, broadcast on demand services such as news, sports, entertainment, etc., on-demand, enhanced TV applications, as well as other TV applications such as email, chat, personals, and voice services.

The use of XML to describe application templates, dynamic data and business rules is different from approaches used with HTML or XHTML browsers. For example, HTML and XHTML implementations do not provide extensibility hooks. That is, these solutions cannot be adjusted to accommodate specific domain problems, such as those of a set-top box client. The present template syntax is quite different from XHTML because the domain it was designed to accommodate differs greatly from the domain of XHTML. Moreover, the present template syntax can be designed to permit more extensibility than XHTML permits, providing the flexibility to suit evolving requirements.

In addition to these template syntax distinctions, the described embodiments allow for an effective separation of the presentation provided by templates from the data provided by XML data-files. The separation of data from presentation provides efficiencies on several levels, from authoring to performance on set-top boxes. Such a separation is aspired to in many HTML/XHTML paradigms, but not nearly so effectively as is provided in the present invention, where the data that the client consumes is an actual separate file from the template.

The described embodiments thus allow for the automation of many aspects of networked applications such as iTV applications. In various embodiments, some or all of the following can be provided:

a Automation and optimization of content for a network operator's specific set-top box and middleware combination, ensuring that the highest level of performance is achieved within the set-top box environment.

b Automated placement and targeting of offerings, promotions, commerce opportunities and content in a unified manner across all iTV services, according to multiple selection rules such as location, current channel, current channel family, current channel category, time-of-day, offering category, current program, current program genre, current application, current content type, and subscriber profile.

c Automated iTV ad campaign management at the set-top, insertion and targeting, enabling network operators and advertisers to easily incorporate text, graphics and video-based advertising campaigns into on-demand services.

Thus, systems and methods by which content and application developers are provided a common application framework that enables rapid development and deployment of iTV applications across a broad spectrum of iTV networks made up of differing head end and/or set top box systems, and automates the process of delivering iTV applications across such networks have been described. However, although the described embodiments have been discussed with respect to various illustrated embodiments, it should be measured only in terms of the claims, which follow the Appendices set forth below.

In accordance with an embodiment of the present invention, the present user interfaces provide iTV application content placement/presentation opportunities for viewers. These opportunities may be organized in the present user interfaces as one or more programmable options for the viewer to select. In this regard, a programmable opportunity can be any location or set of locations within an iTV application (e.g., a program guide) where content may be placed, said content including advertisements, promotions, data (including text images and/or video), or another iTV application.

Some elements of the present user interfaces include:

1. User interface methods to assign default colors, images, font faces, and font styles to iTV application backgrounds, title bars, section borders, caption buttons, icons, inactive selections, active selections, menus, message boxes, scrollbars, tooltips, and/or windows.

2. User interface methods to save and reuse combinations of the above identified color, font face, and/or font style selections as themes or styles.

3. User interface methods to select and filter new programs and iTV applications and application content according to one's interests.

4. User interface methods to customize the layout and/or ordering of menu items, content, advertisements, and/or video display areas of an iTV application.
5. User interface methods to associate iTV application pages and/or functionalities with application buttons and links, remote control buttons, and/or keyboard keys.
6. User interface methods to save style, layout, filtering, and/or customization options on either the local set-top box or on a remote server using various embodiments of persistent storage such as random access memory, file systems, and relational databases.

Examples of various embodiments of these features are provided in the accompanying figures to demonstrate specific types of user interface treatments configured in accordance with the present invention. These examples, however, are meant only to be illustrative of the types of configurations possible using the methods and systems of the present invention and should not be viewed as restricting the broader scope thereof.

Figure 5:
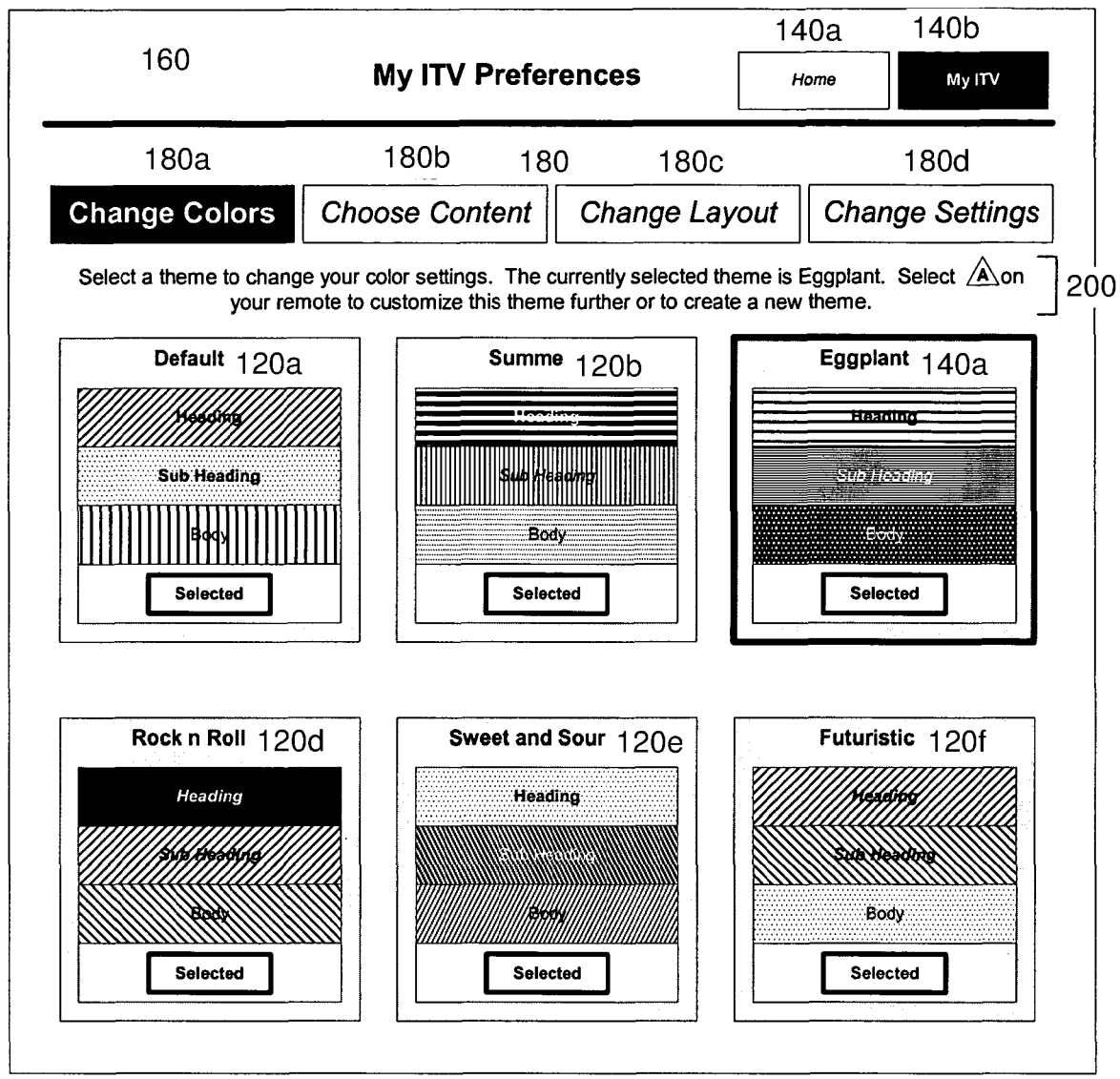
FIG. 5 illustrates an example of a user interface configured adapted to provide viewers with customization screens that allow for the selection of color and font settings and to create new and edit existing iTV user interface themes in accordance with an embodiment of the present invention.

FIG. 5 provides an example of a user interface adapted to provide viewers with customization screens that allow for the selection of color and font settings and to create new and edit existing iTV user interface themes. This portion of user interface 100 (the "Change Colors" portion of the "My ITV Preferences" interface) provides viewers with the opportunity to set the color/font combinations that other iTV applications (e.g., program guides, etc.) will employ. As shown, the viewer may be presented with a variety of preprogrammed themes 120a-120f (in this example, the themes are entitled "Default", "Summer", "Eggplant", "Rock n Roll", "Sweet and sour", and "Futuristic"). Each theme (which may be preprogrammed by the system operator for example, includes a set of color and font combinations for displaying Headings, Sub Headings, Body and Selected (or any other) items within other iTV applications. By choosing a theme, the user sets the color/font combinations for items to be displayed in other iTV applications. This is analogous to setting themes or display properties for various windows and toolbars, etc. within personal computer environments.

In addition to colors and fonts, one or more of the themes may also include images. In fact, the themes may allow users to select combinations of one or more of colors, images, font faces, and font styles to combinations of one or more of iTV application backgrounds, title bars, section borders, caption buttons, icons, inactive selections, active selections, menus, message boxes, scrollbars, tooltips, and windows.

Within user interface 100, selectable elements 140a and 140b within a title bar 160 allow viewers to switch between the "My ITV Preferences" section (selectable through element 140b) and other sections, e.g., a Home page (selectable through element 140a). In this case, element 140b is highlighted, indicating that the viewer is in the "My ITV" section of user interface 100.

Additionally, a tool bar (or a similar type of interface) 180 allows the viewer to select from among the various options within the My ITV section. In this example, options for "Change Color", "Choose Content", "Change Layout" and "Change Settings" are provided through selectable elements 180a-180d, respectively. Element 18a, corresponding to the "Change Color" option is highlighted because the viewer is presently at the portion of user interface 100 that allows the viewer to change the color/font combinations used for displaying content within iTV applications.

The various tool bar options, title bar options and theme options may be selected by manipulating appropriate navigation tools associated with the viewer's remote control and/or set-top box. Such use of navigation tools to select user interface items associated with iTV applications is conventional in nature and need not be discussed in detail. Suffice to state that through the manipulation of navigation buttons/arrows and selection controls (e.g., located on the remote control unit), the viewer may manipulate an on-screen cursor (which may cause the color of an option button rendered on the television screen to change) to make a desired selection. In response to such a selection, the associated action will be taken (e.g., switching to a new page of user interface 100 or selecting the associated theme in the present case. If a new theme 120 is selected, that choice will be either saved at the set-top box or communicated to the application server (or, in some embodiment, both).

Text 200 associated with the present page of user interface 100 may alert the viewer to the presently selected theme and provide instructions for changing to a new theme. In this example, the viewer is also provided with the option of changing parameters of a preprogrammed theme. For example, if the viewer wishes to change a color and/or font characteristic of an existing theme, the viewer may do so and assign a new color/font to any/all portion(s) of the theme parameters.

Figure 6:
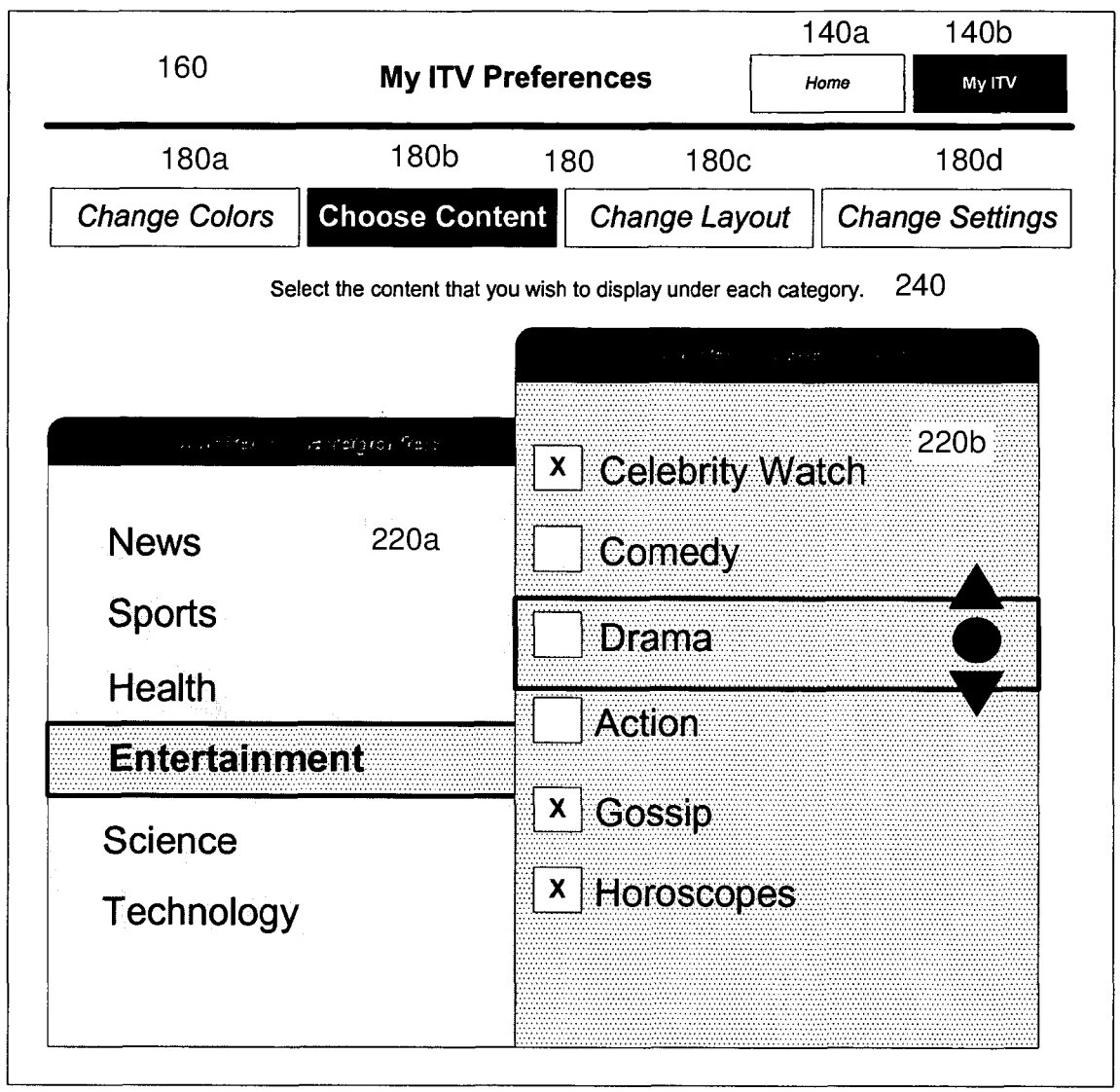
FIG. 6 illustrates an example of a user interface adapted to provide viewers with customization screens that allow for the selection of content and content categories to display in an iTV application in accordance with an embodiment of the present invention.

FIG. 6 provides an example of a user interface adapted to provide viewers with customization screens that allow for the selection of content and content categories to display in an iTV application. This portion of user interface 100 is an example of the "Choose Content" page (selectable through element 180b of tool bar 180), which allows viewers to customize content and content categories to display in an iTV application. In this example, menus 220a and 220b allow the viewer to select for each content category (selectable within menu 220a) the content for that category (selectable in menu 220b). Again, such selections may be made using remote control buttons, etc., as described by help text 240.

Figure 7:
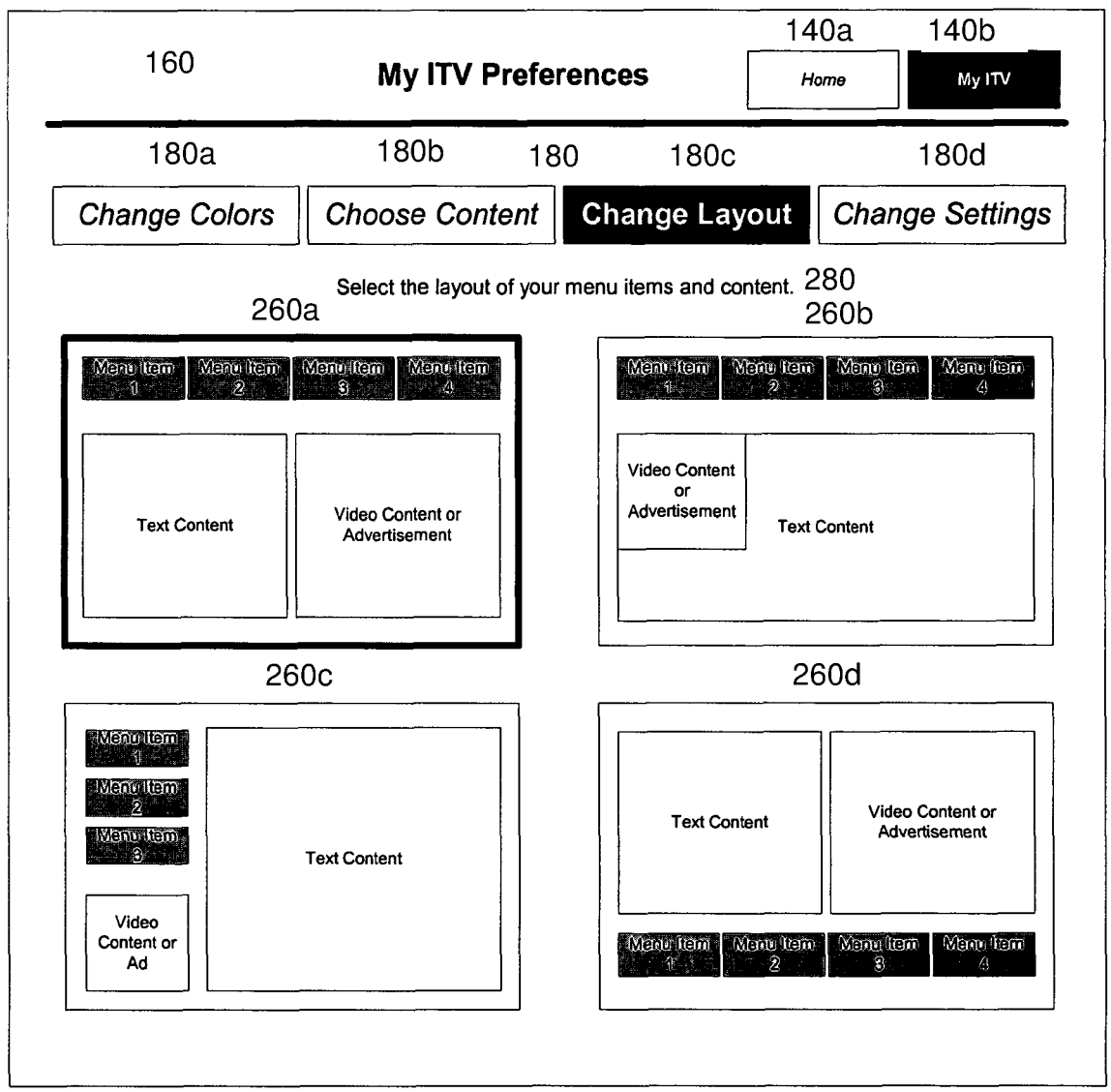
FIG. 7 illustrates an example of a user interface adapted to provide viewers with customization screens that allow for the selection of the layout of menu items and content of an iTV application in accordance with an embodiment of the present invention.

FIG. 7 provides an example of a user interface adapted to provide viewers with customization screens that allow for the selection of the layout of menu items and content of an iTV application. This portion of user interface 100 is an example of the "Change Layout" page (selectable through element 180c of tool bar 180), which allows viewers to select the layout of menu items ad content of an iTV application. In this example, four preprogrammed layout options are available, and are displayed as views 260a-260d. Each view provides for a difference arrangement of content items (including menu buttons, text content and video/advertisement content) within an iTV application. Selecting a view will cause the corresponding content of an iTV application to be presented according to that arrangement. Such selections may be made using remote control buttons, etc., as described by help text 280.

Figure 8:
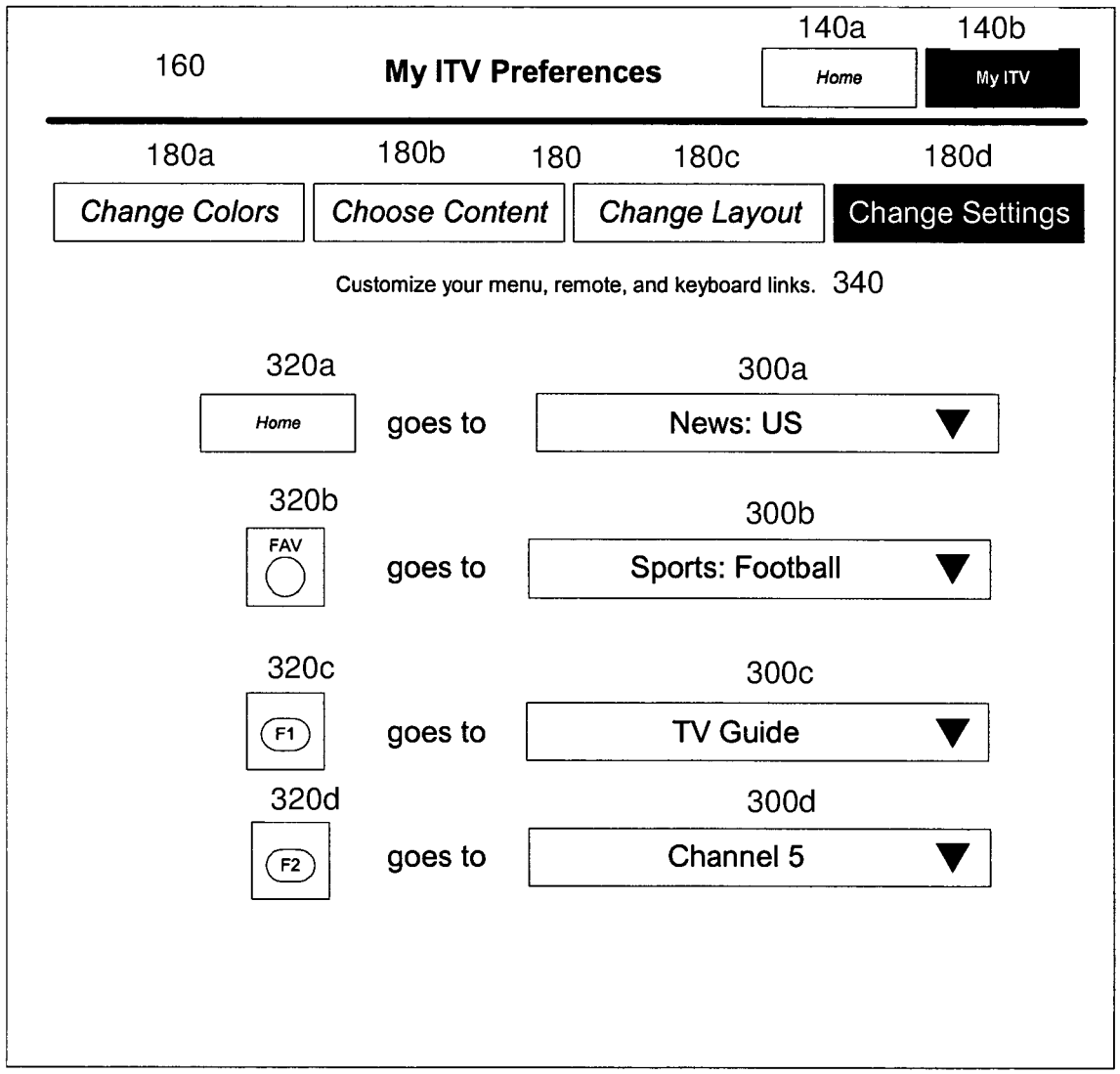
FIG. 8 illustrates an example of a user interface adapted to provide viewers with customization screens that allows for the customization of menus, remote control, and keyboard links of an iTV application in accordance with an embodiment of the present invention.

FIG. 8 provides an example of a user interface adapted to provide viewers with customization screens that allows for the customization of menus, remote control, and keyboard links of an iTV application. This portion of user interface 100 is an example of the "Change Settings" page (selectable through element 180d of tool bar 180), which allows viewers to customize menus, remote control and keyboard links for an iTV application. In this example, customization options (selectable through pull down menus 30a-30d for the home page selection element, a remote control favorite (FAV) button, and two keyboard buttons (F1 and F2) are provided. Icons or images 320a-320d are used to represent these selection elements/buttons and by mapping the icon/image to a selected option via the pull down menus, the viewer can program the respective physical element as explained in help text 340. In this instance, the home page selection element is mapped to a News application. The remote control favorite button has been mapped to a Sports application. The two keyboard buttons have been mapped to an EPG and a television channel. Such mappings may be stored in memory in the set-top box, so that upon receipt of the selection action corresponding to the mapped element, the set-top box operating system or iTV application may take the appropriate action (e.g., displaying the EPG or tuning to the appropriate television station, etc.).

Thus, user interfaces to allow television viewers to customize iTV applications have been described.

APPENDIX A—GLOSSARY OF TERMS

Applet—An applet is a small application. For example, a Java interactive animation applet could be included within a web page or television enhancement if the user platform includes a Java run-time engine. Java is a more powerful language than ECMAscript (JavaScript).

Application Program Interface (API)—An Application Program interface is a set of programming tools that predefine functions and routines affording convenience to developers by grouping common programming material into blocks.

Back Channel—A two-way data connection, typically via the Internet, from the user to the network or broadcaster originating a program. Since many forms of media are distributed using a one-way distribution method, the back channel is necessary to add transactional features or to provide access to interactive content not included in a data broadcast.

Broadband—A class of technologies that offer high-speed Internet access to homes and businesses. Digital subscriber line (DSL) and cable modems are typical broadband technologies.

Broadcasting—Historically, "broadcasting" referred to the activity of radio and television stations. As cable, satellite and the Internet have developed, it is often used to describe the simultaneous real-time distribution of any media from one source to many recipients, using any transport method.

Cache—Storage in memory or disk set aside for temporary storage of data in order to improve access speed. A cache can be used as a store for the most recently accessed data in cases where the user often returns to recently accessed content. A cache can also be used to store new data that the system anticipates the user will be accessing soon. Usually, the oldest content of a cache is deleted without knowledge of the user in order to make room for the new content.

CDN—A Content Delivery Network (CDN) provides fee-for-service delivery of streaming content via the Internet. The network consists of linked "edge" servers throughout the Internet that help reduce network congestion and server overload for content delivered to many users.

Codec—Data compressor-decompressor software that translates data files between compressed and uncompressed states.

Compression—Any technique that reduces the size of a file or the required bandwidth for transport of a signal. Compression can be lossless, whereby the decompressed version is absolutely identical to the original, or lossy, whereby the decompressed version is not identical and is either perceptually identical or impaired.

Conditional Access—Conditional Access systems restrict television program access to certain groups of users either because of concerns for privacy or the desire to collect revenue for the service. Providing conditional access requires secure encryption of the program content, secure decryption in a set-top-box for each viewer, and an embedded serial number that is registered in a central conditional access system database.

Cookie—A cookie is a small, personalized code placed on a computer's hard drive by a particular web site and accessed each time the user visit that site so that the user's (or computer's) identity and preferences can be recognized. This is how web sites welcome user's back by name, create a custom home page just for that user and place subsequent orders without asking for an ID each time.

Datacast—Delivery of program-related or non-program-related data files over a one-way broadcasting medium (like digital television). If communication is required from the viewer back to the broadcaster, an additional back channel is required.

DCT2000, DCT2500, DCT2600, DCT5000, etc.—Digital cable set-top boxes manufactured by Motorola that sometimes include both cable and telephone modems. Later models offer more advanced capabilities.

Deployment—A deployment is the distribution of a common platform and middleware to many users, typically controlled by a cable MSO. In the past, content often had to be re-authored for each deployment as common standards are not yet prevalent. The described embodiments seek to address this problem.

Download—Transmission of a data file from a remote file server to a user.

Enhanced TV (ETV)—Enhanced TV may be regarded as any new service that cannot be delivered with just a regular TV. The industry seems to be using the term "Enhanced TV" to describe interactive content that is provided for specific television programs.

Enhancement—Data sent with the intent of adding value to the user beyond what is possible with the traditional television and channel-changing remote control. Enhancement data can be sent before, during or after the broadcast. Enhancements may enhance user learning or enjoyment, may extend the life of a broadcast or may make the experience more interactive by adding on-demand resources.

Electronic Program Guide (EPG)—An electronic program guide allows the user to scan available channel offerings and tune to current programs by using their remote control to point to specific program listings.

Explorer—The Scientific-Atlanta Explorer series of digital cable set-top boxes offer various levels of ETV functionality.

Head End—The facility in a cable system that aggregates the various signals that will be sent to all viewers in the cable system. As used herein, the term includes regional distribution centers.

HTML—Hypertext Markup Language is the standard page-description language used on the World Wide Web (www).

Input Device—Any piece of hardware used by a viewer to make choices or add content. Remote controls, mice, keyboards and digital cameras are examples of input devices.

Interactive TV (iTV)—A term used to describe ETV (interactive content provided in synchronism with specific television programs), IPGs, PVRs and Walled Gardens.

IPG—The term Interactive Program Guide suggests an EPG with more advanced features such as program searching by genre or title and one click VCR recording.

Java—Java is a platform-independent high-level programming language developed by Sun Microsystems of Mountain View, Calif. It is distinct from JavaScript, a web-browser scripting language.

JavaScript—JavaScript is an interpreted script language developed by Netscape of mountain View, Calif. for enhancing the look and functionality of web pages.

Metadata—A collection of descriptive attributes about an associated data asset. Typical attributes will provide information about the asset label, asset identifier, version number, rights, validation, data type, comments, and other pertinent asset elements.

Middleware—Middleware is a layer of software that runs on top of set-top box operating systems creating a consistent environment to run application software over a wide variety of set top boxes.

MPEG—The Moving Picture Experts Group, a working group of the International Standards Organization, has developed international standards (MPEG-1, MPEG-2, etc.) for compressed digital video and audio.

MSO—A Multiple System Operator is a company that owns multiple cable systems.

Operating System—The layer of software in a computer-based device that directly drives the computing hardware. The operating system manages memory, input and output devices, and computing resources. Middleware requires an underlying operating system in order to run on a set-top box.

Personal Video Recorder (PVR)—Devices that allow TV viewers to time shift, pause and fast forward (until real time) using hard-drive video storage. Some PVRs also provide an EPG to enable additional features tied to keywords and key programs in the TV schedule.

Platform—The term "platform" is used loosely within the industry to describe a particular set-top box including it's internal operating system, a certain kind of middleware, or some combination of the two.

Post Program Enhancements—Enhancements that are transmitted during a television program they are related to, but designed to be used interactively after the broadcast concludes. Also known as "Post-broadcast data" (as opposed to synchronous enhancements and walled garden enhancements).

Set Top Box—Any electronic device designed to be connected to a television receiver to provide additional channels or enhanced capabilities.

Streaming—Streaming involves sending video from a server to a client over a network in packets. At the receiving end, the packets are reassembled to play the video as it arrives. The video file is never actually downloaded since the packets are discarded after they have been decoded and viewed.

Synchronous Enhancements—Enhancements designed to appear at specific points in time during the television program.

Thick Client—The concept of robust computer processing power, storage, and memory within the end users set top box or personal computer client. Software application(s) can and usually reside at the users location.

Thin Client—The concept of minimizing required storage, memory and computing horsepower at the user location by performing computing and storing information in a central location, with connections for user input and display over a medium-speed network.

Transport—A transport is a unique means of media delivery. Each transport has a different combination of ownership and technical capability that determines what types of media are delivered.

Trigger—A message that arrives at a specific point in time during a broadcast, intended to activate specific enhanced content.

Virtual Machine—An operating environment working in conjunction with, yet independent of, a host operating system. Used in such applications as a middleware component of a set-top box, virtual machines accommodate proprietary philosophies of associated software and service vendors. Examples include HTML virtual machines, and the Java Virtual Machine.

VOD—Video On Demand refers to a technology that makes it possible for consumers to control the start of a viewed program. For example, by remote control a consumer might pick from an on-screen list of movies and start and pause the movie at his/her convenience.

Walled Garden—Content that is designed specifically to be available to some subset of users, and (often0 not generally available on the World Wide Web.

Walled Garden Enhancements—Interactive content that is designed without links to the World Wide Web and often optimized for TV viewing with larger fonts, television compliant colors, smaller pages and fewer links.

XML—The eXtensible Markup Language is a recommendation from the World Wide Web Consortium for a powerful language for the description of shared data. Whereas HTML is restricted to describing the format of transmitted data, XML allows transmitting the data in a format-independent manner so that the receiving computer can exert more control over the way in which the data is processed and presented.

APPENDIX B—AUTHORING SPECIFICATION

Part 1: Example of an XML Schema for Application Definition

Part 1: Example of an XML Schema for Application Definition

```xml
<?xml version = "1.0" encoding = "UTF-8"?>
<!--Generated by XML Authority. Conforms to w3c http://www.w3.org/2001/XMLSchema-->
<xsd:schema xmlns:xsd = "http://www.w3.org/2001/XMLSchema">
    <xsd:element name = "mac">
        <xsd:complexType>
            <xsd:sequence>
                <xsd:choice minOccurs = "0" maxOccurs = "unbounded">
                    <xsd:element ref = "audio"/>
                    <xsd:element ref = "event"/>
                    <xsd:element ref = "font"/>
                </xsd:choice>
                <xsd:element ref = "page"/>
            </xsd:sequence>
            <xsd:attribute name = "version" fixed = "1.0" type = "xsd:string"/>
            <xsd:attribute name = "config" use = "optional" type = "xsd:string"/>
        </xsd:complexType>
    </xsd:element>
    <xsd:element name = "page">
        <xsd:complexType>
            <xsd:choice minOccurs = "0" maxOccurs = "unbounded">
                <xsd:element ref = "ad"/>
                <xsd:element ref = "button"/>
                <xsd:element ref = "checkbox"/>
                <xsd:element ref = "form"/>
                <xsd:element ref = "group"/>
                <xsd:element ref = "hidden"/>
                <xsd:element ref = "hotspot"/>
                <xsd:element ref = "image"/>
```

```
            <xsd:element ref = "select"/>
            <xsd:element ref = "text"/>
            <xsd:element ref = "textinput"/>
            <xsd:element ref = "timer"/>
            <xsd:element ref = "transition"/>
            <xsd:element ref = "video"/>
            <xsd:element ref = "arc"/>
            <xsd:element ref = "ellipse"/>
            <xsd:element ref = "line"/>
            <xsd:element ref = "rect"/>
        </xsd:choice>
        <xsd:attribute name = "background" use = "optional" type = "xsd:string"/>
        <xsd:attribute name = "defaultfocus" use = "optional" type = "xsd:string"/>
        <xsd:attribute name = "bgcolor" use = "optional" type = "color"/>
        <xsd:attribute name = "name" use = "required" type = "xsd:NMTOKEN"/>
        <xsd:attribute name = "overcolor" type = "color"/>
        <xsd:attribute name = "overlay" default = "false" type = "xsd:boolean"/>
        <xsd:attribute name = "lowresbackground" type = "xsd:string"/>
    </xsd:complexType>
</xsd:element>
<xsd:element name = "font">
    <xsd:complexType>
        <xsd:attribute name = "src" use = "optional" type = "xsd:string"/>
        <xsd:attribute name = "name" use = "required" type = "xsd:NMTOKEN"/>
        <xsd:attribute name = "size" default = "16">
            <xsd:simpleType>
                <xsd:restriction base = "xsd:integer">
                    <xsd:minInclusivevalue = "0"/>
                </xsd:restriction>
            </xsd:simpleType>
        </xsd:attribute>
        <xsd:attribute name = "bold" default = "false" type = "xsd:boolean"/>
        <xsd:attribute name = "italic" default = "false" type = "xsd:boolean"/>
        <xsd:attribute name = "cache" default = "yes" type = "cache"/>
        <xsd:attribute name = "dropshadow" default = "false" type = "xsd:boolean"/>
    </xsd:complexType>
</xsd:element>
<xsd:element name = "event">
    <xsd:complexType>
        <xsd:attribute name = "onkey" use = "optional" type = "xsd:string"/>
        <xsd:attribute name = "onclick" use = "optional" type = "xsd:string"/>
        <xsd:attribute name = "onblur" use = "optional" type = "xsd:string"/>
        <xsd:attribute name = "onfocus" use = "optional" type = "xsd:string"/>
        <xsd:attribute name = "onfinish" use = "optional" type = "xsd:string"/>
        <xsd:attribute name = "ontimer" use = "optional" type = "xsd:string"/>
        <xsd:attribute name = "onload" use = "optional" type = "xsd:string"/>
```

```
            <xsd:attribute name = "onunload" use = "optional" type = "xsd:string"/>
        </xsd:complexType>
</xsd:element>
<xsd:element name = "audio">
    <xsd:complexType>
        <xsd:attribute name = "name" use = "required" type = "xsd:NMTOKEN"/>
        <xsd:attribute name = "src" use = "required" type = "xsd:string"/>
        <xsd:attribute name = "cache" default = "yes" type = "cache"/>
        <xsd:attribute name = "loop" default = "false" type = "xsd:boolean"/>
        <xsd:attribute name = "state" default = "stop">
            <xsd:simpleType>
                <xsd:restriction base = "xsd:string">
                    <xsd:enumeration value = "play"/>
                    <xsd:enumeration value = "pause"/>
                    <xsd:enumeration value = "stop"/>
                </xsd:restriction>
            </xsd:simpleType>
        </xsd:attribute>
    </xsd:complexType>
</xsd:element>
<xsd:element name = "timer">
    <xsd:complexType>
        <xsd:attribute name = "loop" default = "false" type = "xsd:boolean"/>
        <xsd:attribute name = "name" use = "required" type = "xsd:NMTOKEN"/>
        <xsd:attribute name = "state" default = "stop">
            <xsd:simpleType>
                <xsd:restriction base = "xsd:string">
                    <xsd:enumeration value = "play"/>
                    <xsd:enumeration value = "pause"/>
                    <xsd:enumeration value = "stop"/>
                </xsd:restriction>
            </xsd:simpleType>
        </xsd:attribute>
        <xsd:attribute name = "interval" use = "required" type = "xsd:integer"/>
        <xsd:attribute name = "ontimer" use = "optional" type = "xsd:string"/>
    </xsd:complexType>
</xsd:element>
<xsd:element name = "transition">
    <xsd:complexType>
        <xsd:attribute name = "clipx1" use = "optional" type = "xsd:integer"/>
        <xsd:attribute name = "clipx2" use = "optional" type = "xsd:integer"/>
        <xsd:attribute name = "clipy1" use = "optional" type = "xsd:integer"/>
        <xsd:attribute name = "clipy2" use = "optional" type = "xsd:integer"/>
        <xsd:attribute name = "duration" use = "optional" type = "xsd:integer"/>
        <xsd:attribute name = "interval" use = "required" type = "xsd:integer"/>
        <xsd:attribute name = "endx" use = "required" type = "xsd:integer"/>
```

```
<xsd:attribute name = "endy" use = "required" type = "xsd:integer"/>
<xsd:attribute name = "name" use = "required" type = "xsd:NMTOKEN"/>
<xsd:attribute name = "state" default = "stop">
    <xsd:simpleType>
        <xsd:restriction base = "xsd:string">
            <xsd:enumeration value = "play"/>
            <xsd:enumeration value = "pause"/>
            <xsd:enumeration value = "stop"/>
        </xsd:restriction>
    </xsd:simpleType>
</xsd:attribute>
<xsd:attribute name = "type" use = "optional">
    <xsd:simpleType>
        <xsd:restriction base = "xsd:string">
            <xsd:enumeration value = "in"/>
            <xsd:enumeration value = "out"/>
            <xsd:enumeration value = "both"/>
            <xsd:enumeration value = "contrast"/>
        </xsd:restriction>
    </xsd:simpleType>
</xsd:attribute>
<xsd:attribute name = "onfinish" use = "optional" type = "xsd:string"f>
<xsd:attribute name = "zorder" default = "0" type = "xsd:integer"/>
            </xsd:complcxType>
        </xsd:element>
        <xsd:element name = "group">
            <xsd:complexType>
                <xsd:choice minOccurs = "0" maxOccurs = "unbounded">
                    <xsd:element ref = "ad"/>
                    <xsd:element ref = "button"/>
                    <xsd:element ref = "checkbox"/>
                    <xsd:element ref = "group"/>
                    <xsd:element ref = "hotspot"/>
                    <xsd:element ref = "image"/>
                    <xsd:element ref = "radio"/>
                    <xsd:element ref = "select"/>
                    <xsd:element ref = "text"/>
                    <xsd:element ref = "textinput"/>
                    <xsd:element ref = "video"/>
                    <xsd:element ref = "arc"/>
                    <xsd:element ref = "ellipse"/>
                    <xsd:element ref = "line"/>
                    <xsd:element ref = "rect"/>
                </xsd:choice>
                <xsd:attribute name = "bgcolor" use = "optional" type = "color"/>
                <xsd:attribute name = "bgcolorfocus" use = "optional" type = "color"/>
```

```
<xsd:attribute name = "bgcolorselected" use = "optional" type = "color"/>
<xsd:attribute name = "border" default = "0">
    <xsd:simpleType>
        <xsd:restriction base = "xsd:integer">
            <xsd:minInclusivevalue = "0"/>
        </xsd:restriction>
    </xsd:simpleType>
</xsd:attribute>
<xsd:attribute name = "bordercolor" use = "optional" type = "color"/>
<xsd:attribute name = "bordercolorfocus" use = "optional" type = "color"/>
<xsd:attribute name = "bordercolorselected" use = "optional" type = "color"/>
<xsd:attribute name = "font" use = "optional" type = "xsd:IDREF"/>
<xsd:attribute name = "height" use = "optional">
    <xsd:simpleType>
        <xsd:restriction base = "xsd:integer">
            <xsd:minInclusive value = "0"/>
        </xsd:restriction>
    </xsd:simpleType>
</xsd:attribute>
<xsd:attribute name = "hidden" default = "false" type = "xsd:boolean"/>
<xsd:attribute name = "textcolor" use = "optional" type = "color"/>
<xsd:attribute name = "textcolorfocus" use = "optional" type = "color"/>
<xsd:attribute name = "textcolorselected" use = "optional" type = "color"/>
<xsd:attribute name = "name" use = "required" type = "xsd:NMTOKEN"/>
<xsd:attribute name = "pageback" use = "optional" type = "xsd:IDREF"/>
<xsd:attribute name = "pagenext" use = "optional" type = "xsd:IDREF"/>
<xsd:attribute name = "index" use = "optional" type = "xsd:integer"/>
<xsd:attribute name = "size" default = "0">
    <xsd:simpleType>
        <xsd:restriction base = "xsd:integer">
            <xsd:minInclusive value = "0"/>
        </xsd:restriction>
    </xsd:simpleType>
</xsd:attribute>
<xsd:attribute name = "src" use = "optional" type = "xsd:string"/>
<xsd:attribute name = "srcfocus" use = "optional" type = "xsd:string"/>
<xsd:attribute name = "srcselected" use = "optional" type = "xsd:string"/>
<xsd:attribute name = "width" use = "optional">
    <xsd:simpleType>
        <xsd:restriction base = "xsd:integer">
            <xsd:minInclusive value = "0"/>
        </xsd:restriction>
    </xsd:simpleType>
</xsd:attribute>
<xsd:attribute name = "x" use = "optional" type = "xsd:integer"/>
<xsd:attribute name = "y" use = "optional" type = "xsd:integer"/>
```

```xml
            <xsd:attribute name = "zorder" default = "0" type = "xsd:integer"/>
            <xsd:attribute name = "buffer" default = "false" type = "xsd:boolean"/>
            <xsd:attribute name = "clip" default = "false" type = "xsd:boolean"/>
            <xsd:attribute name = "clipwidth" type = "xsd:integer"/>
            <xsd:attribute name = "clipheight" type = "xsd:integer"/>
            <xsd:attribute name = "type" use = "optional">
                <xsd:simpleType>
                    <xsd:restriction base = "xsd:string">
                        <xsd:enumeration value = "radio"/>
                        <xsd:enumeration value = "checkbox"/>
                        <xsd:enumeration value = "paging"/>
                    </xsd:restriction>
                </xsd:simpleType>
            </xsd:attribute>
        </xsd:complexType>
</xsd:element>
<xsd:element name = "button">
    <xsd:complexType>
        <xsd: simpleContent>
            <xsd:extension base = "xsd:string">
                <xsd:attribute name = "bgcolor" use = "optional" type = "color"/>
                <xsd:attribute name = "bgcolorfocus" use = "optional" type = "color"/>
                <xsd:attribute name = "bgcolorselected" use = "optional" type = "color"/>
                <xsd:attribute name = "border" default = "0">
                    <xsd:simpleType>
                        <xsd:restriction base = "xsd:integer">
                            <xsd:minInclusive value = "0"/>
                        </xsd:restriction>
                    </xsd:simpleType>
                </xsd:attribute>
                <xsd:attribute name = "bordercolor" use = "optional" type = "color"/>
                <xsd:attribute name = "bordercolorfocus" use = "optional" type = "color"/>
                <xsd:attribute name = "bordercolorselected" use = "optional" type = "color"/>
                <xsd:attribute name = "disabled" default = "false" type = "xsd:boolean"/>
                <xsd:attribute name = "font" use = "optional" type = "xsd:IDREF"/>
                <xsd:attribute name = "height" use = "required">
                    <xsd:simpleType>
                        <xsd:restriction base = "xsd:integer">
                            <xsd:minInclusive value = "0"/>
                        </xsd:restriction>
                    </xsd:simpleType>
                </xsd:attribute>
                <xsd:attribute name = "hidden" default = "false" type = "xsd:boolean"/>
                <xsd:attribute name = "textx" use = "optional" type = "xsd:integer"/>
                <xsd:attribute name = "texty" use = "optional" type = "xsd:integer"/>
                <xsd:attribute name = "texteolor" use = "optional" type = "color"/>
```

```xml
<xsd:attribute name = "textcolorfocus" use = "optional" type = "color"/>
<xsd:attribute name = "textcolorselected" use = "optional" type = "color"/>
<xsd:attribute name = "name" use = "required" type = "xsd:NMTOKEN"/>
<xsd:attribute name = "navup" use = "optional" type = "xsd:IDREF"/>
<xsd:attribute name = "navdown" use = "optional" type = "xsd:IDREF"/>
<xsd:attribute name = "navleft" use = "optional" type = "xsd:IDREF"/>
<xsd:attribute name = "navright" use = "optional" type = "xsd:IDREF"/>
<xsd:attribute name = "src" use = "optional" type = "xsd:string"/>
<xsd:attribute name = "srcfocus" use = "optional" type = "xsd:string"/>
<xsd:attribute name = "srcselected" use = "optional" type = "xsd:string"/>
<xsd:attribute name = "template" use = "optional" type = "xsd:IDREF"/>
<xsd:attribute name = "width" use = "required">
    <xsd:simpleType>
        <xsd:restriction base = "xsd:integer">
            <xsd:minInclusive value = "0"/>
        </xsd:restriction>
    </xsd:simpleType>
</xsd:attribute>
<xsd:attribute name = "x" use = "required" type = "xsd:integer"/>
<xsd:attribute name = "y" use = "required" type = "xsd:integer"/>
<xsd:attribute name = "xradius" default = "0">
    <xsd:simpleType>
        <xsd:restriction base = "xsd:integer">
            <xsd:minInclusive value = "0"/>
        </xsd:restriction>
    </xsd:simpleType>
</xsd:attribute>
<xsd:attribute name = "yradius" default = "0">
    <xsd:simpleType>
        <xsd:restriction base = "xsd:integer">
            <xsd:minInclusive value = "0"/>
        </xsd:restriction>
    </xsd:simpleType>
</xsd:attribute>
<xsd:attribute name = "onfocus" use = "optional" type = "xsd:string"/>
<xsd:attribute name = "onblur" use = "optional" type = "xsd:string"/>
<xsd:attribute name = "onclick" use = "optional" type = "xsd:string"/>
<xsd:attribute name = "zorder" default = "0" type = "xsd:integer"/>
<xsd:attribute name = "srcref" use = "optional" type = "xsd:IDREF"/>
            </xsd:extension>
        </xsd:simpleContent>
    </xsd:complexType>
</xsd:element>
<xsd:element name = "ad">
    <xsd:complexType>
        <xsd:attribute name = "bgcolor" use = "optional" type = "color"/>
```

```
        <xsd:attribute name = "bgcolorfocus" use = "optional" type = "color"/>
        <xsd:attribute name = "bgcolorselected" use = "optional" type = "color"/>
        <xsd:attribute name = "border" default = "0">
            <xsd:simpleType>
                <xsd:restriction base = "xsd:integer">
                    <xsd:minInclusive value = "0"/>
                </xsd:restriction>
            </xsd:simpleType>
        </xsd:attribute>
        <xsd:attribute name = "bordercolor" use = "optional" type = "color"/>
        <xsd:attribute name = "bordercolorfocus" use = "optional" type = "color"/>
        <xsd:attribute name = "bordercolorselected" use = "optional" type = "color"/>
        <xsd:attribute name = "campaign" use = "required" type = "xsd:string"/>
        <xsd:attribute name = "font" use = "optional" type = "xsd:IDREF"/>
        <xsd:attribute name = "height" use = "required">
            <xsd:simpleType>
                <xsd:restriction base = "xsd:integer">
                    <xsd:minInclusivevalue = "0"/>
                </xsd:restriction>
            </xsd:simpleType>
        </xsd:attribute>
        <xsd:attribute name = "hidden" default = "false" type = "xsd:boolean"/>
        <xsd:attribute name = "linkelement" use = "optional" type = "xsd:string"/>
        <xsd:attribute name = "width" use = "required">
            <xsd:simpleType>
                <xsd:restriction base = "xsd:integer">
                    <xsd:minInclusive value = "0"/>
                </xsd:restriction>
            </xsd:simpleType>
        </xsd:attribute>
        <xsd:attribute name = "x'.' use = "required" type = "xsd:integer"/>
        <xsd:attribute name = "y" use = "required" type = "xsd:integer"/>
        <xsd:attribute name = "onfocus" use = "optional" type = "xsd:string"/>
        <xsd:attribute name = "onblur" use = "optional" type = "xsd:string"/>
        <xsd:attribute name = "onclick" use = "optional" type = "xsd:string"/>
        <xsd:attribute name = "navleft" use = "optional" type = 'xsd:IDREF"/>
        <xsd:attribute name = "navright" use = "optional" type = "xsd:IDREF"/>
        <xsd:attribute name = "navup" use = "optional" type = "xsd:IDREF"/>
        <xsd:attribute name = "navdown" use = "optional" type = "xsd:IDREF"/>
        <xsd:attribute name = "name" use = "optional" type = "xsd:NMTOKEN"/>
        <xsd:attribute name = "textcolor" use = "optional" type = "color"/>
        <xsd:attribute name = "textcolorfocus" use = "optional" type = "color"/>
        <xsd:attribute name = "textcolorselected" use = "optional" type = "color"/>
        <xsd:attribute name = "zorder" default = "0" type = "xsd:integer"/>
    </xsd:complexType>
</xsd:elernent>
```

```
<xsd:element name = "product">
    <xsd:complexType>
        <xsd:attribute name = "bgcolor" use = "optional" type = "color"/>
        <xsd:attribute name = "bgcolorfocus" use = "optional" type = "color"/>
        <xsd:attribute name = "bgcolorselected" use = "optional" type = "color"/>
        <xsd:attribute name = "border" default = "0">
            <xsd:simpleType>
                <xsd:restriction base = "xsd:integer">
                    <xsd:minInclusive value = "0"/>
                </xsd:restriction>
            </xsd:simpleType>
        </xsd:attribute>
        <xsd:attribute name = "bordercolor" use = "optional" type = "color"/>
        <xsd:attribute name = "bordercolorfocus" use = "optional" type = "color"/>
        <xsd:attribute name = "bordercolorselected" use = "optional" type = "color"/>
        <xsd:attribute name = "campaign" use = "required" type = "xsd:string"/>
        <xsd:attribute name = "font" use = "optional" type = "xsd:IDREF"/>
        <xsd:attribute name = "height" use = "required">
            <xsd:simpleType>
                <xsd:restriction base = "xsd:integer">
                    <xsd:minInclusive value = "0"/>
                </xsd:restriction>
            </xsd:simpleType>
        </xsd:attribute>
        <xsd:attribute name = "hidden" default = "false" type = "xsd:boolean"/>
        <xsd:attribute name = "linkelement" use = "optional" type = "xsd:string"/>
        <xsd:attribute name = "width" use = "required">
            <xsd:simpleType>
                <xsd:restriction base = "xsd:integer">
                    <xsd:minInclusive value = "0"/>
                </xsd:restriction>
            </xsd:simpleType>
        </xsd:attribute>
        <xsd:attribute name = "x" use = "required" type = "xsd:integer"/>
        <xsd:attribute name = "y" use = "required" type = "xsd:integer"/>
        <xsd:attribute name = "onfocus" use = "optional" type = "xsd:string"/>
        <xsd:attribute name = "onblur" use = "optional" type = "xsd:string"/>
        <xsd:attribute name = "onclick" use = "optional" type = "xsd:string"/>
        <xsd:attribute name = "navleft" use = "optional" type = "xsd:IDREF"/>
        <xsd:attribute name = "navright" use = "optional" type = "xsd:IDREF"/>
        <xsd:attribute name = "navup" use = "optional" type = "xsd:IDREF"/>
        <xsd:attribute name = "navdown" use = "optional" type = "xsd:IDREF"/>
        <xsd:attribute name = "name" use = "optional" type = "xsd:NMTOKEN"/>
        <xsd:attribute name = "textcolor" use = "optional" type = "color"/>
        <xsd:attribute name = "textcolorfocus" use = "optional" type = "color"/>
        <xsd:attribute name = "textcolorselected" use = "optional" type = "color"/>
```

```
                <xsd:attribute name = "zorder" default = "0" type = "xsd:integer"/>
            </xsd:complexType>
        </xsd:element>
        <xsd:element name = "text">
            <xsd:complexType>
                <xsd:simpleContent>
                    <xsd:extension base = "xsd:string">
                        <xsd:attribute name = "align" default = "left">
                            <xsd:simpleType>
                                <xsd:restriction base = "xsd:string">
                                    <xsd:enumeration value = "left"/>
                                    <xsd:enumeration value = "center"/>
                                    <xsd:enumeration value = "right"/>
                                </xsd:restriction>
                            </xsd:simpleType>
                        </xsd:attribute>
                        <xsd:attribute name = "border" default = "0">
                            <xsd:simpleType>
                                <xsd:restriction base = "xsd:integer">
                                    <xsd:minInclusivevalue = "0"/>
                                </xsd:restriction>
                            </xsd:simpleType>
                        </xsd:attribute>
                        <xsd:attribute name = "bordercolor" use = "optional" type = "color"/>
                        <xsd:attribute name = "ellipsis" default = "false" type = "xsd:boolean"/>
                        <xsd:attribute name = "font" use = "optional" type = "xsd:IDREF"/>
                        <xsd:attribute name = "height" use = "optional">
                            <xsd:simpleType>
                                <xsd:restriction base = "xsd:integer">
                                    <xsd:minInclusivevalue = "0"/>
                                </xsd:restriction>
                            </xsd:simpleType>
                        </xsd:attribute>
                        <xsd:attribute name = "hidden" default = "false" type = "xsd:boolean"/>
                        <xsd:attribute name = "textcolor" use = "optional" type = "color"/>
                        <xsd:attribute name = "multiline" default = "false" type = "xsd:boolean"/>
                        <xsd:attribute name = "name" use = "optional" type = "xsd:NMTOKEN"/>
                        <xsd:attribute name = "template" use = "optional" type = "xsd:IDREF"/>
                        <xsd:attribute name = "valign" default = "top">
                            <xsd:simpleType>
                                <xsd:restriction base = "xsd:string">
                                    <xsd:enumeration value = "top"/>
                                    <xsd:enumeration value = "middle"/>
                                    <xsd:enumeration value = "bottom"/>
                                </xsd:restriction>
                            </xsd:simpleType>
```

```
            </xsd:attribute>
            <xsd:attribute name = "width" use = "required">
                <xsd:simpleType>
                    <xsd:restriction base = "xsd:integer">
                        <xsd:minInclusive value = "0"/>
                    </xsd:restriction>
                </xsd:simpleType>
            </xsd:attribute>
            <xsd:attribute name = "x" use = "required" type = "xsd:integer"/>
            <xsd:attribute name = "y" use = "required" type = "xsd:integer"/>
            <xsd:attribute name = "zorder" default = "0" type = "xsd:integer"/>
          </xsd:extension>
        </xsd:simpleContent>
      </xsd:complexType>
</xsd:element>
<xsd:element name = "image">
    <xsd:complexType>
        <xsd:attribute name = "border" default = "0">
            <xsd:simpleType>
                <xsd:restriction base = "xsd:integer">
                    <xsd:minInclusive value = "0"/>
                </xsd:restriction>
            </xsd:simpleType>
        </xsd:attribute>
        <xsd:attribute name = "bordercolor" use = "optional" type = "color"/>
        <xsd:attribute name = "height" use = "required">
            <xsd:simpleType>
                <xsd:restriction base ="xsd:integer">
                    <xsd:minInclusive value = "0"/>
                </xsd: restriction>
            </xsd:simpleType>
        </xsd:attribute>
        <xsd:attribute name = "hidden" default = "false" type = "xsd:boolean"/>
        <xsd:attribute name = "name" use = "optional" type = xsd:NMTOKEN"/>
        <xsd:attribute name = "src" use = "required" type = "xsd:string"/>
        <xsd:attribute name = "template" use = "optional" type = "xsd:IDREF"/>
        <xsd:attribute name = "width" use = "required">
            <xsd:simpleType>
                <xsd:restriction base = "xsd:integer">
                    <xsd:minInclusive value = "0"/>
                </xsd:restriction>
            </xsd:simpleType>
        </xsd:attribute>
        <xsd:attribute name = "x" use = "required" type = "xsd:integer"/>
        <xsd:attribute name = "y" use = "required" type = "xsd:integer"/>
        <xsd:attribute name = "zorder" default = "0" type = "xsd:integer"/>
```

```xml
            <xsd:attribute name = "cache" default = "yes" type = "cache"/>
        </xsd:complexType>
</xsd:element>
<xsd:element name = "hotspot">
    <xsd:complexType>
        <xsd:attribute name = "name" use = "required" type = "xsd:NMTOKEN"/>
        <xsd:attribute name = "x" use = "required" type = "xsd:integer"/>
        <xsd:attribute name = "y" use = "required" type = "xsd:integer"/>
        <xsd:attribute name = "width" use = "required">
            <xsd:simpleType>
                <xsd:restriction base = "xsd:integer">
                    <xsd:minInclusive value = "0"/>
                </xsd:restriction>
            </xsd:simpleType>
        </xsd:attribute>
        <xsd:attribute name = "height" use = "required">
            <xsd:simpleType>
                <xsd:restriction base = "xsd:integer">
                    <xsd:minInclusive value = "0"/>
                </xsd:restriction>
            </xsd:simpleType>
        </xsd:attribute>
        <xsd:attribute name = "hidden" default = "false" type = "xsd:boolean"/>
        <xsd:attribute name = "disabled" default = "false" type = "xsd:boolean"/>
        <xsd:attribute name = "navup" use = "optional" type = "xsd:IDREF"/>
        <xsd:attribute name = "navdown" use = "optional" type = "xsd:IDREF"/>
        <xsd:attribute name = "navleft" use = "optional" type = "xsd:IDREF"/>
        <xsd:attribute name = "navright" use = "optional" type = "xsd:IDREF"/>
        <xsd:attribute name = "zorder" default = "0" type = "xsd:integer"/>
    </xsd:complexType>
</xsd:element>
<xsd:element name = "video">
    <xsd:complexType>
        <xsd:attribute name = "border" default = "0">
            <xsd:simpleType>
                <xsd:restriction base = "xsd:integer">
                    <xsd:minInclusive value = "0"/>
                </xsd:restriction>
            </xsd:simpleType>
        </xsd:attribute>
        <xsd:attribute name = "bordercolor" use = "optional" type = "color"/>
        <xsd:attribute name = "height" use = "required">
            <xsd:simpleType>
                <xsd:restriction base = "xsd:integer">
                    <xsd:minInclusive value = "0"/>
                </xsd:restriction>
```

```xml
        </xsd:simpleType>
    </xsd:attribute>
    <xsd:attribute name = "hidden" default = "false" type = "xsd:boolean"/>
    <xsd:attribute name = "loop" default = "false" type = "xsd:boolean"/>
    <xsd:attribute name = "name" use = "required" type = "xsd:NMTOKEN"/>
    <xsd:attribute name = "src" use = "required" type = "xsd:string"/>
    <xsd:attribute name = "state" default = "stop">
        <xsd:simpleType>
            <xsd:restriction base = "xsd:string">
                <xsd:enumeration value = "play"/>
                <xsd:enumeration value = "pause"/>
                <xsd:enumeration value = "stop"/>
            </xsd:restriction>
        </xsd:simpleType>
    </xsd:attribute>
    <xsd:attribute name = "width" use = "required">
        <xsd:simpleType>
            <xsd:restriction base = "xsd:integer">
                <xsd:minInclusive value = "0"/>
            </xsd:restriction>
        </xsd:simpleType>
    </xsd:attribute>
    <xsd:attribute name = "x" use = "required" type = "xsd:integer"/>
    <xsd:attribute name = "y" use = "required" type = "xsd:integer"/>
    <xsd:attribute name = "zorder" default = "0" type = "xsd:integer"/>
        </xsd:complexType>
</xsd:element>
<xsd:element name = "form">
    <xsd:complexType>
        <xsd:sequence minOccurs = "0" maxOccurs = "unbounded">
            <xsd:element ref = "param"/>
        </xsd:sequence>
        <xsd:attribute name = "name" use = "required" type = "xsd:NMTOKEN"/>
        <xsd:attribute name = "method" default = "post">
            <xsd:simpleType>
                <xsd:restriction base = "xsd:string">
                    <xsd:enumeration value = "get"/>
                    <xsd:enumeration value = "post"/>
                </xsd:restriction>
            </xsd:simpleType>
        </xsd:attribute>
        <xsd:attribute name = "target" use = "optional" type = "xsd:string"/>
    </xsd:complexType>
</xsd:element>
<xsd:element name = "param">
    <xsd:complexType>
```

```xml
            <xsd:attribute name = "idref" use = "optional" type = "xsd:string"/>
        </xsd:complexType>
    </xsd:element>
    <xsd:element name = "checkbox">
        <xsd:complexType>
            <xsd:simpleContent>
                <xsd:extension base = "xsd:string">
                    <xsd:attribute name = "bgcolor" use = "optional" type = "color"/>
                    <xsd:attribute name = "bgcolorfocus" use = "optional" type = "color"/>
                    <xsd:attribute name = "bgcolorselected" use = "optional" type =
                        "color"/>
                    <xsd:attribute name = "border" default = "0">
                        <xsd:simpleType>
                            <xsd:restriction base = "xsd:integer">
                                <xsd:minInclusivevalue = "0"/>
                            </xsd:restriction>
                        </xsd:simpleType>
                    </xsd:attribute>
                    <xsd:attribute name = "bordercolor" use = "optional" type =
                        "color"/>
                    <xsd:attribute name = "bordercolorfocus" use = "optional" type
                        = "color"/>
                    <xsd:attribute name = "bordercolorselected" use = "optional"
                        type = "color"/>
                    <xsd:attribute name = "disabled" default = "false" type =
                        "xsd:boolean"/>
                    <xsd:attribute name = "font" use = "optional" type =
                        "xsd:IDREF"/>
                    <xsd:attribute name = "hidden" default = "false" type =
                        "xsd:boolean"/>
                    <xsd:attribute name = "textx" use = "optional" type =
                        "xsd:integer"/>
                    <xsd:attribute name = "texty" use = "optional" type =
                        "xsd:integer"/>
                    <xsd:attribute name = "textcolor" use = "optional" type =
                        "color"/>
                    <xsd:attribute name = "textcolorfocus" use = "optional" type =
                        "color"/>
                    <xsd:attribute name = "textcolorselected" use = "optional" type
                        = "color"/>
                    <xsd:attribute name = "name" use = "required" type =
                        "xsd:NMTOKEN"/>
                    <xsd:attribute name = "navup" use = "optional" type =
                        "xsd:IDREF"/>
                    <xsd:attribute name = "navdown" use = "optional" type =
                        "xsd:IDREF"/>
```

```
            <xsd:attribute name = "navleft" use = "optional" type =
                "xsd:IDREF"/>
            <xsd:attribute name = "navright" use = "optional" type =
                "xsd:IDREF"/>
            <xsd:attribute name = "src" use = "optional" type =
                "xsd:string"/>
            <xsd:attribute name = "srcfocus" use = "optional" type =
                "xsd:string"/>
            <xsd:attribute name = "srcselected" use = "optional" type =
                "xsd:string"/>
            <xsd:attribute name = "template" use = "optional" type =
                "xsd:IDREF"/>
            <xsd:attribute name = "x" use = "required" type = "xsd:integer"/>
            <xsd:attribute name = "y" use = "required" type = "xsd:integer"/>
            <xsd:attribute name = "onfocus" use = "optional" type =
                "xsd:string"/>
            <xsd:attribute name = "onblur" use = "optional" type =
                "xsd:string"/>
            <xsd:attribute name = "onclick" use = "optional" type =
                "xsd:string"/>
            <xsd:attribute name = "checked" default = "false" type =
                "xsd:boolean"/>
            <xsd:attribute name = "srcfocusselected" use = "optional" type =
                "xsd:string"/>
            <xsd:attribute name = "zorder" default = "0" type = "xsd:integer"/>
            <xsd:attribute name = "value" use = "optional" type = "xsd:string"/>
        </xsd:extension>
    </xsd:simpleContent>
  </xsd:complexType>
</xsd:element>
<xsd:element name = "textinput">
  <xsd:complexType>
    <xsd:attribute name = "bgcolor" use = "optional" type = "color"/>
    <xsd:attribute name = "bgcolorfocus" use = "optional" type = "color"/>
    <xsd:attribute name = "bgcolorselected" use = "optional" type = "color"/>
    <xsd:attribute name = "border" default = "0">
        <xsd:simpleType>
            <xsd:restriction base = "xsd:integer">
                <xsd:minInclusive value = "0"/>
            </xsd:restriction>
        </xsd:simpleType>
    </xsd:attribute>
    <xsd:attribute name = "bordercolor" use = "optional" type = "color"/>
    <xsd:attribute name = "bordercolorfocus" use = "optional" type = "color"/>
    <xsd:attribute name = "bordercolorselected" use = "optional" type = "color"/>
    <xsd:attribute name = "cursorcolor" use = "optional" type = "color"/>
```

```
<xsd:attribute name = "disabled" default = "false" type = "xsd:boolean"/>
<xsd:attribute name = "font" use = "optional" type = "xsd:IDREF"/>
<xsd:attribute name = "height" use = "optional">
    <xsd:simpleType>
        <xsd:restriction base = "xsd:integer">
            <xsd:minInclusive value = "0"/>
        </xsd:restriction>
    </xsd:simpleType>
</xsd:attribute>
<xsd:attribute name = "hidden" default = "false" type = "xsd:boolean"/>
<xsd:attribute name = "textcolor" use = "optional" type = "color"/>
<xsd:attribute name = "multiline" default = "false" type = "xsd:boolean"/>
<xsd:attribute name = "name" use = "required" type = "xsd:NMTOKEN"/>
<xsd:attribute name = "navup" use = "optional" type = "xsd:IDREF"/>
<xsd:attribute name = "navdown" use = "optional" type = "xsd: "/>
<xsd:attribute name = "navleft" use = "optional" type = "xsd:IDREF"/>
<xsd:attribute name = "navright" use = "optional" type = "xsd:IDREF"/>
<xsd:attribute name = "password" default = "false" type = "xsd:boolean"/>
<xsd:attribute name = "template" use = "optional" type = "xsd:IDREF"/>
<xsd:attribute name = "width" use = "required">
    <xsd:simpleType>
        <xsd:restriction base = "xsd:integer">
            <xsd:minInclusive value = "0"/>
        </xsd:restriction>
    </xsd:simpleType>
</xsd:attribute>
<xsd:attribute name = "x" use = "required" type = "xsd:integer"/>
<xsd:attribute name = "y" use = "required" type = "xsd:integer"/>
<xsd:attribute name = "zorder" default = "0" type = "xsd:integer"/>
<xsd:attribute name = "maxlength" use = "optional" type = "xsd:integer"/>
        </xsd:complexType>
    </xsd:element>
    <xsd:element name = "radio">
        <xsd:complexType>
            <xsd:simpleContent>
                <xsd:extension base = "xsd:string">
                    <xsd:attribute name = "bgcolor" use = "optional" type = "color"/>
                    <xsd:attribute name = "bgcolorfocus" use = "optional" type = "color"/>
                    <xsd:attribute name = "bgcolorselected" use = "optional" type = "color"/>
                    <xsd:attribute name = "border" default = "0">
                        <xsd:simpleType>
                            <xsd:restriction base = "xsd:integer">
                                <xsd:minInclusive value = "0"/>
                            </xsd:restriction>
```

```
        </xsd:simpleType>
    </xsd:attribute>
    <xsd:attribute name = "bordercolor" use = "optional" type =
        "color"/>
    <xsd:attribute name = "bordercolorfocus" use = "optional" type =
        "color"/>
    <xsd:attribute name = "bordercolorselected" use = "optional" type =
        "color"/>
    <xsd:attribute name = "disabled" default = "false" type =
        "xsd:boolean"/>
    <xsd:attribute name = "font" use = "optional" type = "xsd:IDREF"/>
    <xsd:attribute name = "hidden" default = "false" type =
        "xsd:boolean"/>
    <xsd:attribute name = "textx" use = "optional" type = "xsd:integer"/>
    <xsd:attribute name = "texty" use = "optional" type =
        "xsd:integer"/>
    <xsd:attribute name = "textcolor" use = "optional" type = "color"/>
    <xsd:attribute name = "textcolorfocus" use = "optional" type =
        "color"/>
    <xsd:attribute name = "textcolorselected" use = "optional" type =
        "color"/>
    <xsd:attribute name = "name" use = "required" type =
        "xsd:NMTOKEN"/>
    <xsd:attribute name = "navup" use = "optional" type = "xsd:IDREF"/>
    <xsd:attribute name = "navdown" use = "optional" type =
        "xsd:IDREF"/>
    <xsd:attribute name = "navleft" use = "optional" type =
        "xsd:IDREF"/>
    <xsd:attribute name = "navright" use = "optional" type =
        "xsd:IDREF"/>
    <xsd:attribute name = "src" use = "optional" type = "xsd:string"/>
    <xsd:attribute name = "srcfocus" use = "optional" type =
        "xsd:string"/>
    <xsd:attribute name = "srcselected" use = "optional" type =
        "xsd:string"/>
    <xsd:attribute name = "template" use = "optional" type =
        "xsd:IDREF"/>
    <xsd:attribute name = "x" use = "required" type = "xsd:integer"/>
    <xsd:attribute name = "y" use = "required" type = "xsd:integer"/>
    <xsd:attribute name = "onfocus" use = "optional" type =
        "xsd:string"/>
    <xsd:attribute name = "onblur" use = "optional" type =
        "xsd:string"/>
    <xsd:attribute name = "onclick" use = "optional" type =
        "xsd:string"/>
```

```
            <xsd:attribute name = "checked" default = "false" type =
                "xsd:boolean"/>
            <xsd:attribute name = "srcfocusselected" use = "optional" type =
                "xsd:string"/>
            <xsd:attribute name = "zorder" default = "0" type = "xsd:integer"/>
            <xsd:attribute name = "value" use = "optional" type = "xsd:string"/>
          </xsd:extension>
        </xsd:simpleContent>
      </xsd:complexType>
    </xsd:element>
    <xsd:element name = "select">
      <xsd:complexType>
        <xsd:sequence minOccurs = "0" maxOccurs = "unbounded">
          <xsd:element ref = "option"/>
        </xsd:sequence>
        <xsd:attribute name = "bgcolor" use = "optional" type = "color"/>
        <xsd:attribute name = "border" default = "0">
          <xsd:simpleType>
            <xsd:restriction base = "xsd:integer">
              <xsd:minInclusive value = "0"/>
            </xsd:restriction>
          </xsd:simpleType>
        </xsd:attribute>
        <xsd:attribute name = "bordercolor" use = "optional" type = "color"/>
        <xsd:attribute name = "cols" use = "optional" type = "xsd:integer"/>
        <xsd:attribute name = "disabled" default = "false" type = "xsd:boolean"/>
        <xsd:attribute name = "optioncolor" use = "optional" type = "color"/>
        <xsd:attribute name = "optioncolorfocus" use = "optional" type = "color"/>
        <xsd:attribute name = "optioncolorselected" use = "optional" type = "color"/>
        <xsd:attribute name = "font" use = "optional" type = "xsd:IDREF"/>
        <xsd:attribute name = "height" use = "required">
          <xsd:simpleType>
            <xsd:restriction base = "xsd:integer">
              <xsd:minInclusive value = "0"/>
            </xsd:restriction>
          </xsd:simpleType>
        </xsd:attribute>
        <xsd:attribute name = "hidden" default = "false" type = "xsd:boolean"/>
        <xsd:attribute name = "textcolor" use = "optional" type = "color"/>
        <xsd:attribute name = "textcolorfocus" use = "optional" type = "color"/>
        <xsd:attribute name = "textcolorselected" use = "optional" type = "color"/>
        <xsd:attribute name = "name" use = "required" type = "xsd:NMTOKEN"/>
        <xsd:attribute name = "navup" use = "optional" type = "xsd:IDREF"/>
        <xsd:attribute name = "navdown" use = "optional" type = "xsd:IDREF"/>
        <xsd:attribute name = "navleft" use = "optional" type = "xsd:IDREF"/>
        <xsd:attribute name = "navright" use = "optional" type = "xsd:IDREF"/>
```

```
            <xsd:attribute name = "plane" default = "vertical">
                <xsd:simpleType>
                    <xsd:restriction base = "xsd:string">
                        <xsd:enumeration value = "horizontal"/>
                        <xsd:enumeration value = "vertical"/>
                    </xsd:restriction>
                </xsd:simpleType>
            </xsd:attribute>
            <xsd:attribute name = "rows" use = "optional" type = "xsd:integer"/>
            <xsd:attribute name = "template" use = "optional" type = "xsd:IDREF"/>
            <xsd:attribute name = "width" use = "required">
                <xsd:simpleType>
                    <xsd:restriction base = "xsd:integer">
                        <xsd:minInclusive value = "0"/>
                    </xsd:restriction>
                </xsd:simpleType>
            </xsd:attribute>
            <xsd:attribute name = "x" use = "required" type = "xsd:integer"/>
            <xsd:attribute name = "y" use = "requited" type = "xsd:integer"/>
            <xsd:attribute name = "zorder" default = "0" type = "xsd:integer"/>
            <xsd:attribute name = "overselector" use = "optional" type = "xsd:IDREF"/>
            <xsd:attribute name = "underselector" use = "optional" type = "xsd:IDREF"/>
            <xsd:attribute name = "overlay" default = "false" type = "xsd:IDREF"/>
            <xsd:attribute name = "fixed" use = "optional" type = "xsd:string"/>
            <xsd:attribute name = "optionpad" use = "optional" type = "xsd:integer"/>
            <xsd:attribute name = "xpad" use = "optional" type = "xsd:integer"/>
            <xsd:attribute name = "ypad" use = "optional" type = "xsd:integer"/>
            <xsd:attribute name = "onselectblur" use = "optional" type = "xsd:string"/>
            <xsd:attribute name = "onfocusblur" use = "optional" type = "xsd:string"/>
            <xsd:attribute name = "onselectclick" use = "optional" type = "xsd:string"/>
            <xsd:attribute name = "onselectend" use = "optional" type = "xsd:string"/>
            <xsd:attribute name = "onselectbegin" use = "optional" type = "xsd:string"/>
        </xsd:complexType>
    </xsd:element>
    <xsd:clement name = "option">
        <xsd:complexType>
            <xsd:choice minOccurs = "0" maxOccurs = "unbounded">
                <xsd:element ref = "ad"/>
                <xsd:element ref = "checkbox"/>
                <xsd:element ref = "image"/>
                <xsd:element ref = "group"/>
                <xsd:element ref = "radio"/>
                <xsd:element ref = "text"/>
            </xsd:choice>
        </xsd:complexType>
    </xsd:element>
```

```
<xsd:element name = "hidden">
    <xsd:complexType>
        <xsd:attribute name = "name" use = "required" type = "xsd:NMTOKEN"/>
        <xsd:attribute name = "value" use = "optional" type = "xsd:string"/>
    </xsd:complexType>
</xsd:element>
<xsd:element name = "arc">
    <xsd:complexType>
        <xsd:attribute name = "name" use = "optional" type = "xsd:NMTOKEN"/>
        <xsd:attribute name = "border" default = "0">
            <xsd:simpleType>
                <xsd:restriction base = "xsd:integer">
                    <xsd:minInclusive value = "0"/>
                </xsd:restriction>
            </xsd:simpleType>
        </xsd:attribute>
        <xsd:attribute name = "bordercolor" use = "optional" type = "color"/>
        <xsd:attribute name = "x1" use = "optional" type = "xsd:integer"/>
        <xsd:attribute name = "x2" use = "required" type = "xsd:integer"/>
        <xsd:attribute name = "yl" use = "required" type = "xsd:integer"/>
        <xsd:attribute name = "y2" use = "required" type = "xsd:integer"/>
        <xsd:attribute name = "hidden" default = "false" type = "xsd:boolean"/>
        <xsd:attribute name = "startangle" default = "1" type = "xsd:integer"/>
        <xsd:attribute name = "endangle" default = "1" type = "xsd:integer"/>
        <xsd:attribute name = "zorder" default = "0" type = "xsd:integer"/>
        <xsd:attribute name = "color" use = "optional" type = "color"/>
    </xsd:complexType>
</xsd:element>
<xsd:element name = "ellipse">
    <xsd:complexType>
        <xsd:attribute name = "name" use = "optional" type = "xsd:NMTOKEN"/>
        <xsd:attribute name = "border" default = "0">
            <xsd:simpleType>
                <xsd:restriction base = "xsd:integer">
                    <xsd:minInclusive value = "0"/>
                </xsd:restriction>
            </xsd:simpleType>
        </xsd:attribute>
        <xsd:attribute name = "bordercolor" use = "optional" type = "color"/>
        <xsd:attribute name = "hidden" default = "false" type = "xsd:boolean"/>
        <xsd:attribute name = "x" use = "required" type = "xsd:integer"/>
        <xsd:attribute name = "y" use = "required" type = "xsd:integer"/>
        <xsd:attribute name = "xradius" default = "0">
            <xsd:simpleType>
                <xsd:restriction base = "xsd:integer">
                    <xsd:minInclusive value = "0"/>
```

```xml
                </xsd:restriction>
            </xsd:simpleType>
        </xsd:attribute>
        <xsd:attribute name = "yradius" default = "0">
            <xsd:simpleType>
                <xsd:restriction base = "xsd:integer">
                    <xsd:minInclusive value = "0"/>
                </xsd:restriction>
            </xsd:simpleType>
        </xsd:attribute>
        <xsd:attribute name = "zorder" default = "0" type = "xsd:integer"/>
        <xsd:attribute name = "color" use = "optional" type = "color"/>
        <xsd:attribute name = "bevel" type = "bevel"/>
    </xsd:complexType>
</xsd:element>
<xsd:element name = "line">
    <xsd:complexType>
        <xsd:attribute name = "name" use = "optional" type = "xsd:NMTOKEN"/>
        <xsd:attribute name = "x1" use = "required" type = "xsd:integer"/>
        <xsd:attribute name = "yl" use = "required" type = "xsd:integer"/>
        <xsd:attribute name = "x2" use = "required" type = "xsd:integer"/>
        <xsd:attribute name = "y2" use = "required" type = "xsd:integer"/>
        <xsd:attribute name = "color" use = "optional" type = "color"/>
        <xsd:attribute name = "hidden" default = "false" type = "xsd:boolean"/>
        <xsd:attribute name = "width" use = "required">
            <xsd:simpleType>
                <xsd:restriction base = "xsd:integer">
                    <xsd:minInclusive value = "0"/>
                </xsd:restriction>
            </xsd:simpleType>
        </xsd:attribute>
        <xsd:attribute name = "zorder" default = "0" type = "xsd:integer"/>
    </xsd:complexType>
</xsd:element>
<xsd:element name = "rect">
    <xsd:complexType>
        <xsd:attribute name = "name" use = "optional" type = "xsd:NMTOKEN"/>
        <xsd:attribute name = "border" default = "0">
            <xsd:simpleType>
                <xsd:restriction base = "xsd:integer">
                    <xsd:minInclusive value = "0"/>
                </xsd:restriction>
            </xsd:simpleType>
        </xsd:attribute>
        <xsd:attribute name = "bordercolor" use = "optional" type = "color"/>
        <xsd:attribute name = "color" use = "optional" type = "color"/>
```

```xml
            <xsd:attribute name = "x" use = "required" type = "xsd:integer"/>
            <xsd:attribute name = "y" use = "required" type = "xsd:integer"/>
            <xsd:attribute name = "xradius" default = "0">
                <xsd:simpleType>
                    <xsd:restriction base = "xsd:integer">
                        <xsd:minInclusive value = "0"/>
                    </xsd:restriction>
                </xsd:simpleType>
            </xsd:attribute>
            <xsd:attribute name = "yradius" default = "0">
                <xsd:simpleType>
                    <xsd:restriction base = "xsd:integer">
                        <xsd:minInclusive value = "0"/>
                    </xsd:restriction>
                </xsd:simpleType>
            </xsd:attribute>
            <xsd:attribute name = "height" use = "required">
                <xsd:simpleType>
                    <xsd:restriction base = "xsd:integer">
                        <xsd:minInclusive value = "0"/>
                    </xsd:restriction>
                </xsd:simpleType>
            </xsd:attribute>
            <xsd:attribute name = "width" use = "required">
                <xsd:simpleType>
                    <xsd:restriction base = "xsd:integer">
                        <xsd:minInclusive value = "0"/>
                    </xsd:restriction>
                </xsd:simpleType>
            </xsd:attribute>
            <xsd:attribute name = "round" default = "false" type = "xsd:boolean"/>
            <xsd:attribute name = "hidden" default = "false" type = "xsd:boolean"/>
            <xsd:attribute name = "zorder" default = "0" type = "xsd:integer"/>
            <xsd:attribute name = "bevel" type = "bevel"/>
        </xsd:complexType>
    </xsd:element>
        <xsd:simpleType name = "color">
            <xsd:restriction base = "xsd:string">
                <xsd:maxLength value = "9"/>
                <xsd:pattern value = "#[0-9a-fA-F]{6,8}"/>
            </xsd:restriction>
        </xsd:simpleType>
        <xsd:simpleType name = "cache">
            <xsd:restriction base = "xsd:string">
                <xsd:pattern value = "yes|no|protect|[0-9]{1,}"/>
            </xsd:restriction>
```

```
</xsd:simpleType>
<xsd:simpleType name = "bevel">
    <xsd:restriction  base = "xsd:string">
        <xsd:cnurneration value = "up"/>
        <xsd:enurneration  value = "down"/>
        <xsd:enurneration  value = "none"/>
    </xsd:restriction>
</xsd:simpleType>
</xsd:schema>
```

Part 2: User's Guide

The following provides one embodiment of an instantiation of the above XML schema for application definition. It is written in the form of a User's Guide to be illustrative of an example implementation of an AC authoring environment. As used herein the acronym MAX is used to represent the XML authoring language for building applications targeted at the AC 14. In addition, the application client is sometimes referred to as a MAC (MetaTV Application Client).

1. MAX Authoring Guidelines: The following section outlines basic guidelines for well-formed MAX markup.

A. Authoring syntax conventions: Authoring in MAX requires that the following syntax guidelines be followed:

All MAX documents (templates and data files) must conform to well-formed XML.

All MAX elements and properties are case sensitive. All element names, property names, event handlers and methods must be all lowercase.

All property values and event handler values must be enclosed in double quotes: name="value", eventhandler="string"

All MAX comments should be formatted like XML comments:<!—MY COMMENT HERE→

All MAX documents must include only one <mac> and one  tag.

The top-level MAX template for an application must be named index.xml

The top-level data file that is used by the applications top most page must be called vc.dat.

Arguments defined in methods may be wrapped in single quotes, but it is not necessary. It is necessary to use single quotes around arguments when the argument is a text string.
set(@myText.text, 'My New Text String')

All references to a property value of an element should be preceded with the '@' symbol and appear in dot notation format: @objectName.property
<var id="start" type="int">@txt_story. startindex </var>

All references to an object located in another page should be preceded with the '@' symbol and appear in dot notation format: @pageName.objectName.property Data references should take the following format:
$$dataTableName[rowNumber].columnName.
<text name="weather_city">$$weather[$index].city </text>-.

The exception to this rule is for the datasrc property of a <select> which takes the format: $$dataTableName.columnName.

Multiple methods can be executed from a single event handler. Methods should be separated by a semicolon.
onclick="set(@my Text.text, 'Hello');set(@myText. textcolor, 'grey')"

B. Character Entities: Some embodiments of the application client require that certain characters be displayed by their HTML named entity in order to display properly. This is required for MAX markup, but not required for MAX data files. For example, to display an ampersand (&) in a text string that might appear on a button, the following would be valid:
<button name="myBtn" x="10" y="10" width="100" height="25">INFO & amp; HELP</button>

Table B.2.1 below outlines the special characters and their named entity string to be used.

TABLE B.2.1

Special Characters

| Named Entity | Symbol | Description |
| --- | --- | --- |
| " | " | Double quote, may be needed to escape the ( " ) in string literals |
| ' | ' | Single quote, may be needed to escape the ( • ) in string literals |
| & | & | Ampersand, always used to escape the ( & ) character literal |
| < | < | Less than, always used to escape the ( < ) character |
| > | > | Greater than, may be needed to escape the ( > ) character |

C. Referencing Data: Referencing data contained in separate .dat files is accomplished through the following syntax:
$$dataTableName[rowNumber].columnName.

For example, to display a city name from a weather data table, an $index variable could be defined and used to access that particular row in the data table:
<text name="weather_city">$$weather[ $index] city </text>

One exception to this format is the datasrc property of a <select>, which uses the following syntax:
$$dataTableName.columnName.

For example, to display the entire list of all the weather regions in the datatable, one would refer to the column called region, and the value for region in each row of the datatable would populate the <select>:
<select name="weather regions">$$weather.region</select>-;

It is important to note that only a selected few object properties are capable of obtaining their value from a data table. The following table B.2.2 outlines these objects and their properties:

TABLE B.2.2

Objects and Properties

| Object | Property |
| --- | --- |
| Text | text |
| Image | src |
| Page | background |
| Select | datasrc |
| Vod( ) | assetID |
| Load( ) | filename |
| Var | value |

D. MAX Validation: MAX templates can be validated using the MAX XSD schema that is available at:
http://www.metatv.com/xml/ns/mac/macjc.sub_1_0.xsd If you are author MAX applications with an XML editor that provides validation capabilities, all that is necessary is to include the following schema reference in your <mac> tag at the beginning of each MAX document:
<mac xmlns:xsi=http://www.w3.org/2001/XML Schema-instance"
xsi:no-NamespaceSchemaLocation="http://www.metatv.com/xml/ns/mac/macjc_1_b.0.xsd">

2. Authoring Tips: The following section provides suggested approaches for authoring specific types of functionality or interfaces. It also covers some general concepts that are available to an application author for simplifying the authoring process and allowing for easier modifications in the future. Details on the specific tags and their attributes referenced in the examples below are set forth in the section entitled MAC XML Tag Library.

As a general principle, MAC XML authoring provides the author with the ability to maintain a considerable amount of application layout information in the form of element templates in a MAC config file. It is very similar to the concept of a cascading style sheet used in web applications.

A. Displaying text strings as an attribute of an element: MAC-XML primarily relies upon defining the properties for an element as attributes of the element tag in the standard name=value format. Most element tags are EMPTY and do not allow any information to appear between opening and closing tags. However, there are a few tags that typically have a text string or label associated with the element, like <button>, <text>, <checkbox> and <radio>. This text string attribute is specified in between the opening and closing tags.

Example: <button name="myButton" textcolor="#000000">This is my button</button>

B. Using the mac config file: A MAC application can have its own configuration file for establishing application wide attributes, templates, global variables and methods. The config file serves as a sort of style sheet, which lets the author specify things such as fonts, transition types, and events like onKey, which might be used by any or all pages in an application.

ELEMENT TEMPLATES: An element template is basically a single element definition that has specific attribute settings and is hidden from the application rendering. Any element in the markup that wishes to use some or all of the templates behaviors and attributes can point to the template through the template attribute. Detailed examples on how this can be accomplished can be found below in the section entitled Using Element Templates.

FONTS: Fonts should be defined within the config file and then referred to by individual elements in the application through the FONT attribute. For example, a typical font declaration in a config file might look like:

<font name="myBoldFont" size="20" bold="true"/>

An element in the application markup that desires a 20-point, bold font would simply refer to this font through the FONT attribute of the element:

<button name="myButton" font="myBoldFont"/>

TRANSITIONS: Transitions are typically used to define an animation type for an element or group of elements. The transitions can be conveniently listed in the MAC config file for an application through the <transition> tag described below. For example, a transition declaration in the config file might look like:

<transition name="movemenu" endx="0" endy="320" type="out" interval="20"/>

In the XML markup for the application, a group of buttons comprising a menu panel is created:

<group name="menu" x="0" y="480">
<button name="button1"/>
<button name="button2"/>
<button name="button3"/></group>

Elsewhere in the XML markup, a button click fires an event to execute the movemenu transition upon the menu group by setting the value of the state attribute to play:

<button name="showmenu" onClick="setProperty (movemenu, state, 'play')">Animate the menu</button>

GLOBAL VARIABLES: Global variables that might be used by the entire application should be defined in the MAC config file.

GLOBAL METHODS: Global methods that might be used by the entire application should be defined in the MAC config file.

C. Using element templates: Oftentimes an application will have multiple elements in an interface sharing many of the same properties such as font color or the number of pixels to offset. Each element that is authored in the XML markup can have all of its properties defined within its XML tag, but it may be simpler for the application author to define a template for a certain element type, typically in the MAC config file.

A template could be for any kind of visual element and should have its hidden attribute set to true so that the template itself is not visible. An example button template might look like this:

<button name="templateButton" hidden="true" font="bold20" src="button_off" srcfocus="button_over" srcselected="button_on" textcolor="black" textcolorfocus="white" textcolorselected="yellow"/>

The above example defines a graphical asset to be used for the three states, the text color for the three states, and the font template to be used by the button, 'bold20'. This <font> might also be defined in the MAC config file as:

<font name="bold20" size="20" bold="true"/>

Now, anywhere in the application markup, a <button> can be defined and inherit all or some of the properties of the button template, simply by specifying the template attribute of this button:

<button name="button_1" template="templateButton"> My button using a template</button>

The application author could also only choose to use some of the attributes of the button template, and easily override others. The following example utilizes the same button template, but overrides the textcolor settings:

<button name="button_1" template="templateButton" textcolor="magenta" textcolorfocus="pink" textcolorselected="chartreuse">My button using part of a template</button>

Essentially, element templates are a very handy way of defining the appearance and properties of an object that is going to be reused numerous times in an application, similar to a style sheet. Ultimately it can save the application author time in editing markup during the development phase of an application, and enable application wide changes to be made in one place.

D. Creating text strings associated with elements: Most elements can have text strings displayed in association with them. These associated text strings can only be defined by specifying the string in between an element's opening and closing tags. This is the only valid attribute that can appear inside opening and closing element tags.

<button name="myButton" font="1">My Button Text</button>

This label attribute could also be modified through a setText( ) method such as:

<button name="myButton2" font="1" onClick="setText (myButton, 'My new button text')">Change Label</button>

The positioning of a text label with respect to its element can be pixel positioned using the textx and texty attributes of the element. These values are relative to the x:y coordinates of the actual element. For instance to position a button's text label 2 pixels from the top, left edge of the button you might do something like this:

```
<button name="myButton" font="1" x="10" y="10"
    textx="2" texty="2">My Button Text</button>
```

E. Z-ORDERING: MAC clients support Z-ordering of rendered elements on screen. It is advisable to control the Bordering of elements by their physical location in the MAC-XML document. Those elements or groups that need to be rendered on top of other elements should appear later in the document. For example, a dialog type popup box can be created using the <group> tag and setting that group's visibility to be hidden. Upon a user action, the dialog can be made visible in a higher Z layer than the other elements on the screen such as some story text. In order to do so, it is important to declare the dialog <group> later in the document than other elements so that it can be presented above them when rendered. For example:

d Hiding and showing the paging controls when the content is at the first or last page.

e Executing a setText( ) on the pagestatus indicator if one exists after each paging event.

The following example highlights the following requirements for creating a paging control:

a The content to be paged must be wrapped in a <group> tag.

b The <group> tag must have its paging attribute set to true: paging "true".

c The <group> tag must have three attributes (pagenext, pageback, pagestatus) set to the name of the actual element which will be displayed as the paging control element. (pagestatus is optional).

```
<mac version="1.0">

<text name="story" width="400" height="240"/>
    <image name="story_image" width="40" height="40" x="100" y="100/">
<!--This group must appear after other elements in order to be rendered over them in a higher z-layer
-->
    <group name="dialog" x="200" y="200" size="2"/>
    <button src="myButton" x="10" y="20"/>
    <text name="dialog_text" x="5" y="5" >This dialog appears on top of the story text and
    image</text>
    </group>

</mac>
```

F. OVERRIDING DEFAULT NAVIGATION: MAC clients support the ability to override the navigation logic that is generated by the client for a given screen. If the application author wishes to assign specific navigation results to one of the four directional arrows on the remote, he/she can do so by using the (navleft, navright, navup, navdown) attributes. For example if a menu had 4 buttons and the fourth button is at the bottom of the screen, pressing the down arrow button on the remote will typically not move the focus anywhere because there are no focusable elements below it. However, if you wanted the user to be able to hit the down arrow and loop back up to the top of the button stack, this could be done. For example:

```
<button name="button_1" x="100" y="100"
    src="button_off.bmp"/>
<button name="button_2" x="100" y="150"
    src="button_off.bmp"/>
<button name="button_3" x="100" y="200"
    src="button_off.bmp"/>
<button name="button_4" x="100" y="250"
    src="button_off.bmp" navdown="button_1"/>
```

G. Creating a dynamic paging control for multiple screens of content: Dynamic paging can be accomplished through the use of <button> elements associated with a content area which displays the text/images for which paging is desired. A paging control typically consists of a 'page back' and 'page forward' button, with some sort of text indicator of the current page the user is on, e.g., "page 2 of 5".

The client is responsible for the following, which is transparent to the application author a Maintaining the state of the pageable content, what page it is on.

b Determining how much text can fit per screen in the allocated content space.

c Determining the number of screens required to display all of the content.

d The <button> used for paging back is initially set to be hidden (hidden="true") so that it is not displayed when the screen first renders at the beginning of the paged content (i.e. 1 of x).

e The onClick event handler for both paging buttons calls the setIndex( ) method on the <group> desired for paging.

```
<group name="pagingGroup" paging="true"
    pagenext="buttonNext" pageback="buttonBack"
    pagestatus="pagingText">
    <text name="storyText" x="100" y="20" width="300"
        height="400">%storyTextVar%</text>
    <!—Paging Controls
    <button name="buttonBack" x="100" y="440"
        hidden="true" onClick="setIndex(-1)">Back</button>
    <text name="pagingText" x="230"
        y="440">%pageNum% of %pageTotal%</text>
    <button name="buttonNext" x="400" y="440"
        onClick="setIndex(+1)">Next</button>
</group>
```

H. Making an image based ad selectable on AC: Some embodiments of the application client do not have a standard highlight selection box that wraps around selectable elements. Rather, the ability to focus to an element is created by either replacing the image source, or replacing any/all of the following attributes for the element: bgcolor, bordercolor, and/or textcolor. This works well for standard focusable elements like buttons and text that has a background area. An image based ad is a bit different in that you typically would not create a separate asset for its focused and selected state because of excessive use of bandwidth and custom design required for 3 variations on the same asset ad. However, the appearance of a highlight box around the ad image can be created using the border properties of the <ad> tag. By specifying a border thickness, bordercolor, and bordercolorfocus, you can create the appearance of a colored selection box wrapped around the ad. This is the suggested method for creating a selectable ad in the AC environment. For example:

<ad cannpaign="42" x="250" y="300" width="200" height="160" border="3" bordercolor="#000000" bordercolorfocus="#FCC00" bordercolorselected="#Fc093F"/>

I. Making a text based ad selectable by clicking on a separate button: Text strings or text-based ads may often have a separate button or element that is responsible for handling the actions associated with the ad. For example, a text based ad may have a "GO" button next to it which executes the action that is actually associated with the ad campaign as it is referenced in the <ad> tag. What this means is that there needs to be a connection drawn between the <ad> itself and the <button> which exectutes.the ad's action. This is accomplished through the linkelement attribute specified in the <ad> tag. Using this, the author can specify what element is responsible for executing the action associated with the ad. For example:

<button name="adButton" x="200" y="300">GO</button>
<ad cannpaign="42" x="250" y="300" width="200" height="16" linkelement="adButton"/>

J. Setting attribute values through the setproperty( ) method: MAC clients have a very basic subset of standard event handlers often found in scripting languages like JavaScript. Since the TV environment has a more limited set of behaviors, only a few event handlers are really needed. The available event handlers are defined with examples in a later section entitled Object Event Handlers. Through the use of event handlers such as onClick or onFocus, an application author can set the value for any property associated with any element. This is performed through the setProperty action which accepts 3 values for each property to set: element name, property, property value Example 1 Changing the text color for a text region upon a button click:

<button name="myButton" x="5" y="5" onClick="setProperty ('myText', textcolor, '#FFCC00')"/>
<text name="myText" x="50" y="50" textcolor="#000000">Hello World</text>

Example 2 Event handlers also allow you to specify multiple setProperty events from a single action by separating them with a semicolon. Here we change the text color and the text label from one button click. Multiple actions from a single event handler occur in order, so in the example below, the text label will not change until the change of textcolor action has completed.

<button name="myButton" x="5" y="5" onClick="setProperty('myText', textcolor, '#FFCC00')";setProperty('-myText', 'label', 'This is my new text')"/>
<text name="myText" x="50" y="50" textcolor="#000000"/>

3. MAX Client Tags: The following element tags can be used in MAX markup for use by the MAC client.

TABLE B.2.3

| MAX Client Tags | | |
|---|---|---|
| <ad> | <image> | <palette> |
| <button> | <include> | <select> |
| <color> | <mac> | <text> |
| <datatable> | <navmap> | <navtemplate> |

TABLE B.2.3-continued

| MAX Client Tags | | |
|---|---|---|
| <event> | <navitem> | <timer> |
| <group> | <page> | <var> |

<ad> The <ad> tag is used to indicate any image or text based advertisement. All scheduling information for ads is maintained in a separate location-list.xml file that is referenced via the required location property. All ad campaign information is maintained in a separate campaign-list.xml file, which is referenced via the location-list.xml file. Both files are generated by an Advertising Manager.

a Required properties: adtype, height, key, name, width, x, y,
b Optional properties: link, style, textcolor
c Used by: <page>
d Example: <ad name="myAd" location="4" x="250" y="300" width="200" height="160" adtype="image"/>

<button> The <button> tag is used to create selectable elements: text, image, image with text, or a hotspot selection box. <button> is the only element besides <text> that can have a text string or var reference in between its opening and closing tags. This is used to display the actual 'text' that is displayed for the button.

a BUTTON STATES: Buttons can be displayed in four different states: idle, focused, selected, and disabled. The following describes the various states and their usage.

TABLE B.2.4

Button States Button

| State | Usage |
|---|---|
| Idle | The button when it is in an unselected, unfocused, idle state |
| Focus | The button when it has focus and can be clicked |
| Selected | The button immediately after it is clicked. This is also the state used to reflect the users current location in a menu of buttons. That is, the selected state indicates that a user is "in that section". |
| Disabled | The button as it appears when disabled = "true". When disabled, the button can not be navigated to. | b DISPLAYING BUTTONS AS COLORED RECTANGLES: Buttons are typically displayed as colored rectangles with text inside of them. A button can be any size and any color that is specified in palette.xml. Additionally, the four edges of the button can also be customized. The edge colors and center color of a <button> are defined inside of the <navtemplate> that is referenced by the <button>.

<navtemplate name="tt_idle" textcolor="white" style="4" color="charcoal" topcolor="grey" leftcolor="grey" bottomcolor="black" rightcolor="black"/>
<navtemplate name="tt_foc" textcolor="black" style="3" color="gold" topcolor="grey" leftcolor="grey" bottomcolor="black" rightcolor="black"/>
<navtemplate name="tt_sel" textcolor="white" style="3" color="red" topcolor="grey" leftcolor="grey" bottomcolor="black" rightcolor="black"/>
<button name="tv" x="556" y="33" width="48" height="28" align="center" valign="nniddle"

navtemplate="tt_idle" navtemplatefocus="tt_foc" navtemplateselected="tt_sel" onclick="loadapp(menu,index.xml)">TV</button>
c DISPLAYING BUTTONS AS HOTSPOTS: A button can also be displayed as a simple, rectangular hotspot around the outside edge of the defined button width and height. For example, your application could have an image burned background I-Frame, and you may want your navigation item to be a yellow box that wraps around that region of the I-Frame. To accomplish this, define a pixel value for the hotspot property of your <button> tag. Then define colors from your available colors in palette.xml, for both hospotfocus and hotspotselected to change colors for the different button states.
<button name="ad_btn" x="59" y="364" width="176" height="80" hotspot="4" hotspotfocus="gold" hotspotselected="aqua"/>
d Required properties: height, name, width, x, y
e Optional properties: align, bgcolor, disabled, hidden, hotspot, hotspotfocus, hotspotselected, offsetx, offsety, navtemplate, navtemplatedisabled, navtemplatefocus, navtemplateselected, valign
f Event handler properties: onfocus, onblur, onclick
g Used by: 
h Example: The following <text> templates are defined at the beginning of the document:
<text name="btn_focus" textcolor="000000" style="3"/>
<text name="btn_idle" textcolor="FFFFFF" style="5"/>
<text name="btn_select" textcolor="CCCCCC" style="3"/>
The following is an example button using three different images to represent the three button states, and references to the above text templates for changing the color and style of the text in those states.
<button name="myButton" x="100" y="100" width="136" height="28" navtemplate="btn_idle" navtemplatefocus="btn_focus" navtemplateselected="btn_select">HELLO WORLD</button>
i Notes:
1 When using the built-in button assets, the suggested text offset for left aligned text with a medium font is: offsetx="10", offsety="4". This will neatly left-align your text within the button.
2 When using the built-in button assets, do not use different sizes across the different states for the button. That is, if you use a large button for the idle state, you must also use large buttons for focus and selected. The button size can not change across states for a single button.
<color> The <color> tag is used to define an individual color to be used within palette.xml. Each <color> tag must have a value defined, a 6-digit hexadecimal value for the color. An optional name attribute can also be used to more easily identify the color when maintaining the XML markup. A <palette> tag MUST contain exactly 16 <color> tags. Details on the format and requirements for the <palette> can be found in the <palette> section.
a Required properties: name, value
b Optional properties:
c Used by: <palette>
d Example: See example under <palette>
<datatable> The <datatable> tag is used to specify a data file and the data table within that file that is to be used by the MAX template. A single MAX template can contain multiple <datatable> tags, but all of those tags must refer to the same data src file. Therefore, a single MAX template may access multiple data tables, but all of those data tables must be contained in a single .dat file.
a Required properties: name, src
b Optional properties: table
c Used by: <mac>
d Example:
<datatable name "categories" src="package://movies.dat"/>
<event> The <event> tag is used to declare a global event for a given . It is positioned outside of the  tag. It only supports one property, the onkey event handler which is used to define a behavior for a particular button on the remote for a given . Refer to the onkey event handler and iskey( ) method for more details and examples.
a Optional properties: onkey
b Used by: <mac>
c Example:
<event onkey="iskey(7);load(newPage.xml)"/>
<group> The <group> tag is a used to contain one or more objects. It is used for the following behaviors:
a Relative positioning of all elements in the group to the x:y of the group. Makes for easier editing of templates when building layouts of complex structures
b Animations: Grouping of one <image> tag whose src comes from a data array of P-frame images so that a <timer> can be performed against them, creating the appearance of an animated image
c Tickers: Grouping of non-focusable objects so that the pagegroup( ) method can be performed against them, which updates the contents of the objects from a datatable. This is typically used for looping content tickers.
d Visibility toggling: Grouping of focusable and/or non-focusable objects so that the entire group can be made hidden or visible through a single set( ) method to modify the hidden property of the group.
e Paging: Grouping of objects, where the pagegroup( ) method is used and paging buttons are displayed to allow paging through the datatable array by a defined amount.
f Required properties: height, name, width, x, y
g Optional properties: hidden, nextbutton, paging, prevbutton, startindex
h Used by: 
i Example: See pagegroup( ) method for an example of <group>
j NOTE: Groups should be used only when necessary and minimally. Excessive groups increase page drawing time and page complexity.
<image> The <image> object defines an image asset for rendering on screen. An <image> object is not focusable, so the <button> object should be used to create a selectable image component. An <image> can be either a foreground image (.bmp) or an MPEG image (.jpg or .bmp).
a Foreground Images:
1 Must be 4-bit .bmp files saved at 50% of their normal width
2 Must have layer="foreground" specified in the <image> tag
3 Must use only the colors defined in the palette.xml file
4 Can not be resized on the client, the width/height properties should reflect the actual width/height of the bitmap asset
5 Support the border and bordercolor properties 6 Can be included in a <group> and have a transition performed against them
7 All built-in bitmaps are outlined in Appendix A: MAC-J Built-In Bitmap Images
b MPEG Images:
1 Must have layer="middle" specified if a resulting P-Frame is desired.
2 Must have layer="background" (which is the default if not specified) if it is desired to have the image merged into the background I-Frame and a new I-Frame created
3 Can be either .jpg and .gif format
4 Can include thousands of colors
5 Cannot be resized on the client. MAX markup should have the desired display width and height specified so that the image is sized accordingly before being merged into the I-Frame or converted to P-Frame
6 No support for border and bordercolor properties
c Required properties: height, name, src, width, x, y
d Optional properties: bgcolor, hidden, layer
e Used by:, <group>
f Example: The following image will be converted to a unique P-Frame by a Liberate Server:
    <image name="headerImage" src="mpegs/topheader.jpg" layer="middle" x="20" y="100" width="200" height="20"/>
The following image will be converted to a foreground bitmap by a Liberate Server:
    <image name="headerImage" src="mpegs/topheader.bmp" layer="foreground" x="20" y="100" width="200" height="20"/>
<include> The <include> tag references a separate MAX document to be included within the current document. This allows an application author to create a reusable module one time, and have it included in multiple templates that need the module. Effective use of included files helps to build an application that uses only the necessary run-time memory.
    a Required properties: src
    b Used by: 
    c Example:
        <include src="navbar.xml"/>
<mac> The <mac> tag is a required, outermost container tag used to define the document type as being a MAC page.
    a Example:
        1 <mac>
        2 <pagebackground="my_bg.jpg"
            defaultfocus="button_1">
        3 
        4 </mac>
    b Note:
        1 If you author AC applications with an XML editor that provides validation capabilities, you may import the MAX XSD schema to enable validation. Simply reference the schema in your <mac> tag at the beginning of each MAX document:
            <mac xmlns:xsi="http://www.w3.org/2001/XMLSchema-inst-ance" xsi:noNamespaceSchema-Location="http://www.metatv.conn/xml/ns/mac/macjc_1_0.xsd"
<navitem> The <navitem> tag is used on MAC-J to define the specific objects that can be navigated to from a defined object. It is typically used to override the auto generated navigation. The author defines a <navitem> and specifies the particular item through the object property using dot notation. The objects that can be navigated to from this object are defined using the navup, navdown, navleft, navright properties. The object property and the nav properties must be specified in the following format:
    object="@pageName.objectName
    navup="@pageName.objectName
    a Optional properties: navup, navdown, navleft, navright, object
    b Used by: <navmap>
    c Example:
        <navmap>
            <navitem name="myNav" object="@myPage.button-1" navup="@myPage.homeButton" navdown="@myPage.button2"/>
        </navmap>
<navmap> The <navmap> tag is a wrapper tag that can contain any number of <navitem> tags.
    a Used by: <mac>
    b Example:
        <navmap>
            <navitem name="myNav" object="@myPage.button-1" navup="@myPage.homeButton" navdown="@myPage.button2"/>
        </navmap>
<navtemplate> A <navtemplate> tag is used to define the colors and text styles for navigation components including <button> and <select>. Since <button> and <select> have various states: idle, focused, selected; a <navtemplate> is typically defined for each state and referenced via the appropriate <button> or <select> properties.
    a Required properties: name
    b Optional properties: color, bottomcolor, topcolor, leftcolor, rightcolor, style, textcolor
    c Used by: 
    d Example:
        <navtemplate name="tt_idle" textcolor="white" style="4" color="charcoal" topcolor="grey" leftcolor="grey" bottomcolor="black" rightcolor="black"/>
        <navtemplate name="tt_foc" textcolor="black" style="3" color="gold" topcolor="grey" leftcolor="grey" bottomcolor="black" rightcolor="black"/>
        <navtemplate name="tt_sel" textcolor="white" style="3" color="red" topcolor="grey" leftcolor="grey" bottomcolor="black" rightcolor="black"/>

TABLE B.2.5

| | Font Styles | |
|---|---|---|
| Font Type Value | Style | Size |
| 1 | small | 12 |
| 2 | small, dropshadow | 12 |
| 3 (DEFAULT) | medium | 16 |
| 4 | medium, dropshadow | 16 |
| 5 | large | 18 |
| 6 | large, dropshadow | 18 | e Notes: Avoid using any of the dropshadow styles when using black or dark text. The dropshadow color is always black, and dark text with a black dropshadow displays poorly on TV.
 The  tag is a required container object used to define all of the elements and layout for a single screen template. A <mac> document may only contain one set of  tags.

a Optional properties: background, bgcolor, defaultfocus, main, selectedbutton
b Event handler properties: onload
c Used by: <mac>
d Example:
```
<page main="true" background="my_bgjpg"
    defaultfocus="@myinclud-e.button_1">
```
e Notes:
1. The main property is a REQUIRED property for the outermost shell page in a template or any page that is referred to via a load( ) method from another page. That is, the included files used by a file should not have the main property specified, but the outermost page containing these includes MUST have the main property set to 'true'. This is required for the creation of a logical navigation map where multiple include files are being used in a template.
2. The defaultfocus property is a REQUIRED property for any outermost shell page that is referred to via a load( ) method from another page. Defaultfocus is not required in MAX documents that are included files as they never get called directly via a load( ) method.

<palette> The <palette> tag is used to define a 16-color palette that can be used by any object that appears in the foreground graphics layer including: bitmap/vq images, textcolors, background colors, button colors, and rects. Each application must have one defined palette containing exactly 16 color tags and this must reside in a file called palette.xml. The primary users of palette-defined colors are buttons and text colors, and application specific foreground .bmp files. As such, there are dedicated positions in the 16-color palette file that are reserved for specific objects, default colors.
  a Positions 0-4 cannot be edited—they are reserved for default colors, transparency, and are suggested colors for text, focus buttons
  b Positions 5-7 are reserved for weather icon backgrounds and netop logos which are built into the client. These can be edited to modify the colors of these assets to fit your application. If you are not using weather icons or netop logos in your application, these values can be used for other purposes if so desired.
  c Positions 8-15 are available for application specific needs (other bitmaps, text colors, painting <rect> objects. They are defaulted to the colors specified below. If you have a VQ image or want to paint a certain color to the screen, these positions would be a good place to specify.

TABLE B.2.6

Palette Values and Uses

| Palette Position | Name | Assigned Color | Usage |
|---|---|---|---|
| 0 | transparent | #000000 | Transparency |
| 1 | black | #121212 | Text dropshadow, default bottom and right button edge, suggested dark text color |
| 2 | grey | #999999 | Defult top and left button edge, also used in weather icons |
| 3 | white | #CCCCCC | Suggested light text color, also used in weather icons |
| 4 | gold | #B5971D | Suggested focus button color, also used in weather icons |
| 5 | darkgreen | #062F2D | Weather icon bkg |
| 6 | logo_1 | #BA252A | Color 1 used in netop logo |
| 7 | logo_2 | #8F2B2B | Color 2 used in netop logo |
| 8 | orange | #BF7639 | |
| 9 | light_red | #97545B | |
| 10 | blue | #5755A2 | |
| 11 | light_blue | #9DA6DF | |
| 12 | turquoise | #7CB0BD | |
| 13 | medium_green | #237746 | |
| 14 | light_green | #7F9E4A | |
| 15 | purple | #5637AE | | d Used by: <mac>
e Example: The following is the default palette that should be used when starting to build any application. The following piece of code could be copied into a file and named palette.xml. All applications should start with this palette, and the author should make edits to the colors as appropriate. For example, if your application does not require a weather icons or the MSO logo, then those palette positions can be edited and used for other reasons.

```
<mac>
<palette>
<!-- DO NOT EDIT THESE FIVE COLOR VALUES -->
    <color name="transparent" value="000000"/>
    <color name="black" value="121212"/>
    <color name="grey" value="999999"/>
    <color name="white" value="CCCCCC"/>
    <color name="gold" value="B5971D"/>
<!--- THESE COLORS ARE RESERVED FOR WEATHER AND LOGO ICONS, THEY MAY BE MODIFIED -->
    <color name="darkgreen" value="062F2D"/>
    <color name="logo_1" value="BA252A"/>
    <color name="logo_2" value="8F2B2B"/>
<!--- THESE ARE DEFAULT PALETTE COLORS AND MAY BE MODIFIED -->
    <color name="orange" value="BF7639"/>
    <color name="light_red" value="97545B"/>
    <color name="blue" value="5755A2"/>
    <color name="light_blue" value="9DA6DF"/>
    <color name="turquoise" value="7CB0BD"/>
    <color name="medium_green" value="237746"/>
    <color name="light_green" value="7F9E4A"/>
    <color name="purple" value="5637AE"/>
</palette>
</mac>
```

<rect> The <rect> tag renders a rectangular shape on screen. It is often used to draw a rectangular region in a certain color for object backgrounds, or to create vertical/horizontal lines. The color property of a <rect> must be specified in palette.xml as a rect shares the same 16-color palette as bitmap images and text.
- a Required properties: height, width, x, y
- b Optional properties: border, bordercolor, color, hidden, name, round, xradius, yradius
- c Used by: , <group>
- d Example:
  <rect name="myRect" width="30" height="15" x="20" y="200" color="000000" round="true" xradius="10" yradius="10"/>
- e Notes: The <rect> tag can be effectively used to draw a horizontal line, similar to the <HR> tag in html. It is advised to use a 2 pixel minimum height for a horizontal line <rect> due to TV interlacing.

<select> The <select> object is a complex navigation structure that can be used to display an array of items in a confined space. The behavior of a select is to display as many options as will visibly fit in the allocated space, and provide a scrolling mechanism to navigate through the remainder of the list. A select can only display a list of text items which must be defined in a separate datatable and referred to via the required datasrc property of the select. A few of the major advantages of using the <select> control are:
1 Allows the user to easily scroll through a long list of items without requiring multiple screens of content
2 Allows for creation of navigation menus where there are more items than can fit in a given space.
- a Required properties: datasrc, height, hlheight, hlwidth, name, width, x, y
- b Optional properties: align, bgcolor, disabled, displayindex, hidden, index, maxcount, morenext, moreprev, optionpad, plane, startindex, navtemplate, navtemplatefocus, navtemplateselected, valign
- c Event handler properties: onfocus, onblur, onclick, onfocusoption
- d Used by: 
- e EXAMPLE: The following select list is used to display weather cities. It will display three options at any one time because the height of the entire select is 100 pixels and medium text size is about 25 pixels high. The select is dynamically populated by whatever the values are defined in the $$weather data tables list of cities.
  <select name="weathercity" plane="vertical" x="100" y="20" height="75" width="200" hlheight="25" hlwidth="200" maxcount="3" navtemplate="txt_idle" navtemplatefocus="txt_focus" navtemplateselected="txt_selected datasrc="$$weather.city"/>

<text> A <text> tag specifies a location and region on screen for displaying text. The appearance of text is determined by the style and textcolor properties. Text supports multiline display, which is determined by the amount of text populating the object and the height specified for the object. If the height supports multiple lines of text, then the populating text will wrap at the specified width. Typically, a single line of medium sized text requires a minimum height of 20 pixels. The <text> object also supports paging across multiple screens.
- a Required properties: height, name, width, x, y
- b Optional properties: align, avoid, bgcolor, border, bordercolor, ellipsis, hidden, nextbutton, offsetx, offsety, paging, padding, prevbutton, prevpage, textcolor, startindex, style, valign
- c Inline formatting tags: The <text> tag supports two specific empty tags that can be used for formatting text with explicit line breaks. These can be included directly in MAX markup or within .dat files that are referenced by <text> objects.
  1 <br/>:Inserts a single line break
  2 <p/>: Inserts a two-line, line break
    i NOTE: Avoid using carriage returns when authoring a text value for a text object. Use the <br/> tag if you desire an explicit line break.
- d Used by: , <group>
- e Example:
  <text name="myText" x="10" y="10" width="100" height="100" style="3">Thank you for your order.<br/>You will receive it in 2 weeks.</text>
- f NOTES:
  1 Avoid using any of the dropshadow styles when using black text. The dropshadow color is always black, and black text with a black dropshadow displays poorly on TV.
  2 If there is more content than can fit within the defined area for the <text>, the text content will be truncated so that it does not exceed the defined area. In order to display more text than may be appearing, it would be necessary to increase the height and/or width of your text object to allow more lines of text to fit in the allocated space.

<timer> The <timer> object allows the application to run a series of specified actions at a specified rate or period. A <timer> can only be started using the start( ) method, and stopped using the stop( ) method.
- a Required properties: name, period
- b Optional properties: loop
- c Event handler properties: ontimer
- d Used by: <mac>
- e Example: The following example uses a <timer> to create the functionality of a headlines ticker which shows a new headline every 5 seconds. Each time the ontimer event is fired it makes uses the page( ) method to increment the counter.
  <var id="counter" type="int">0</Var>
  <timer name="tickerTimer" period="5000" ontimer="pagegroup(headline,$counter, headlineData)"/>

<group name="headline" x="100" y="100">
  <text name="myHeadline" x="32" y="44" width="100" height="50" font="myFont" style="4"></text>
  </group>

<var> A <var> tag declares a variable to be used across the entire application, as all variables are global to an application. Variables are often used to store property values so that they may be passed from one template to another when properties need to be set on the target page by the referring page. <var> tags must be defined outside of the  tag.
- a Required properties: id, type
- b Used by: <mac>
- c Example 1: Simple variable declaration
  <var id="myVar" type "int"></var>
- d Example 2: Variable declaration with optional initialization for vars of type 'int'
  <var id="myVar" type="int">0</var> e Example 3: Variable declaration with separate initialization via set( ) for vars of type 'string'. In order to initialize a var of type 'string' the set( ) method must be used in addition to the <var> declaration to set the var to an initial value.
  <var id="myVar" type="string"></var> f Example 4: Variable declaration with separate initialization via set( ) for vars specified in a datatable. In order to initialize a var of type 'string' the set( ) method must be used in addition to the <var> declaration to set the var to an initial value.
  <var id="myVar" type="string"></var>
g Example 5: Variable Referencing. Vars are referenced with a $[varName] format.
  <text name="header" x="20" y="20" width="200" height="20">$myVar</text>
h NOTE: The use of vars should be kept at a minimum to reduce variable object creation in client memory. It is advisable to reuse vars throughout the application if possible. For example, a variable used as a counter on various screens could be shared, since the counter will only be used for one screen at a given time.

<video> The <video> tag defines a region on the screen to display a scaled video feed of the broadcast channel. It is advised that the <video> object be sized at a width:height aspect ratio of 4:3. This feature is NOT supported on MAC-J Moto because the DCT set-top does not support video scaling. Only one <video> object per page is allowed.
  a Required properties: height, width, x, y
  b Optional properties: channel
  c Used by: 
  d Example:
    <video x="0" y="0" width="320" height="240" channel="2"/>

4. Additional Client Tags

<arc> The <arc> tag renders an arc on screen. The (x1,y1)-(x2,y2) rectangle created defines the boundaries of the arc.
  a Properties: bevel, border, bordercolor, color, hidden, name, startangle, endangle, x1, x2, y1, y2, zorder
  b Used by: , <group>
  c Example:
    <arc name="myArc" startangle="10" endangle="10" x1="20" y1="20" x2="100" y2="100"/>

<audio> The <audio> object activates an audio file for playing. It can be autoloaded via the onLoad method for a given  object or by setting the state attribute to "play". It can also be activated upon request (e.g. button onClick event), and looped or played only once.
  a Properties: cache, loop, name, src, state
  b methods: onKey
  c Used by: <mac>
  d EXAMPLE:
    <audio name="audio_1" src="audio1.mpg" loop="true"/>
  e EVENT ACTIONS:
    1 If any audio asset on the current  has its STATE attribute set to "play" then the following will work:
    2 onKey(volumeUp)=setProperty(audio, volume, "up"): Increases the volume of the audio asset
    3 onKey(volumeDown)=setProperty(audio, volume, "down"): Decreases the volume of the audio asset
    4 Otherwise the same onKey events will control the volume of the TV object if it is included in the application.

<Ellipse> The <ellipse> tag renders an elliptical primitive on screen.
  a Properties: bevel, border, bordercolor, color, height, hidden, name, width, x, y, xradius, yradius, zorder
  b Used by: , <group>
  c Example:
    <ellipse name="myEllipse" width="30" height="15" x="20" y="200" xradius="10" yradius="1"/>

<Font> The <font> tag is used to declare a particular font and its appearance for use by any element in the application. <font> templates are typically defined in a MAC application config file and referred to by the FONT attribute for a particular element. If a config file is not used, the <font> should be defined outside of the  declaration.
  a Properties: bold, cache, dropshadow, italic, name, size, src
  b Used by: <mac>
  c EXAMPLE:
    1 Fonts should be defined within the config file and then referred to by individual elements in the application through the FONT attribute. For example, a typical font declaration in a config file might look like:
      <font name="myBoldFont" size="20" style="bold"/>
    2 An element in the application markup that desires a 20 point, bold font would simply refer to this font through the FONT attribute of the element:
      <button name="myButton" font="myBoldFont"/>
  d PLATFORM DETAILS: Some embodiments of the application client support only a limited number of font options, therefore those fonts are built into the client and can simply be referred to by their name. As a result, there is no need to declare a particular <font> for your application, simply have the element requiring a certain font type refer to its predefined name from the table below.

TABLE B.2.7

Font Types

| Font Name | Style | Size | Notes |
| --- | --- | --- | --- |
| small | regular | 12 | Difficult to read on TV |
| medium | regular | 16 | Default font |
| large | regular | 18 | Good for large text/ headlines |
| small_bold | bold | 12 | Not advisable on some set-tops, text runs together. |
| medium_bold | bold | 16 | Default font |
| large_bold | bold | 18 | Appears very strong on some set-tops |
| small_dropshadow | dropshadow | 12 | Too difficult to read on some set-tops |
| medium_dropshadow | dropshadow | 16 | Most practical font for dropshadow text on many platforms |
| large_dropsbadow | dropshadow | 18 | |

<form> The <form> tag is used to collect the values of a selected number of form elements so that their values can be submitted to a form target. A <form> can only contain <param> tags that are references to the desired elements in the markup whose values you wish to collect for the form submission. By separating the form from the elements that the form wishes to reference, it is possible to have multiple forms referencing a single element if so desired.

a Properties: name, method, target
b Methods: submit( )
c Used by: 
d EXAMPLE:
    <form name="entryForm" target="processForm" method="POST">
      <param idref="checkbox1"/>
      <param idref="checkbox2"/>
      <param idref="zipcode"/>
    </form>

<Hidden> The <hidden> tag is a form element that has no visible features. It is used to handle extra data required by a form POST or GET.
a Properties: name, value
b Used by: 
c EXAMPLE:
    <form name="entryForm" target="processForm">
      <textinput name="zipcode"/>
      <hidden name="region" value="West">
      <button name="button1" src="button.bmp" onClick="send(entryForm)"/>
    </form>

<hotspot> The <hotspot> tag is used to create a rectangular selection box on screen. This tag is not supported by some embodiments of the application client.
a Properties: disabled, height, hidden, name, navup, navdown, navleft, navright, width, x, y, zorder
b Methods: onFocus, onBlur, onClick
c Used by: 
d EXAMPLE:
    <hotspot x="5" y="5" width="100" height="20"/>

<line> The <line> tag renders a line primitive on screen.
a Properties: color, hidden, name, width, x1, x2, y1, y2, zorder
b Used by: , <group>
c Example:
    <arc name="myArc" startangle="10" endangle="10" x1="20" y1="20" x2="100" y2="100"/>

<option> The <option> tag is used to declare an individual option for a <select>, which can contain unlimited options. If the option is text, then the text string (label) should be wrapped within the <option> tag as in example 1 above. If the option includes additional elements or other elements entirely, then those tags must be specified within the opening and closing <option> tags.
a Properties: None
b Used by: <form>
c EXAMPLE: The following example illustrates a vertical select list that includes checkboxes and text strings in each option, allowing the author the select type navigation for making multiple selections using checkboxes. The x:y positions for the nested <checkbox> and <text> tags are relative positions to the top, left pixel of the option rectangle which is determined by the <select> layout.

```
<select name="myChecklist" focustype"movable"
plane="vertical" x="100" y="20" rows="3">
  <option>
    <checkbox name="check1" x="2" y="2"/>
    <text name="option1" x="20" y="2"/>
  </option>
  <option>
    <checkbox name="check2" x="2" y="2"/>
    <text name="option2" x="20" y="2"/>
  </option>
```

-continued

```
  <option>
    <checkbox name="check2" x="2" y="2"/>
    <text name="option2" x="20" y="2"/>
  </option>
</select>
```

<param> The <param> tag is used to reference or point to another element in the markup for a single , in order to collect the element's value for submission to a form target.
a Properties: idref
b Methods: submit( )
Used by: <form>
a EXAMPLE:
    <form name="entryForm" target="processForm" method="POST">
      <param idref="checkbox1"/>
      <param idref="checkbox2"/>
      <param idref="zipcode"/>
    </form>

<select> The <select> object is a complex navigation structure that can be used to display a list of <option> objects (text or images) within a confined space. The advantage of the <select> is that there can be an unlimited number of <option> objects available, but the interface only displays a few of them at any one time, allowing the user to scroll through them.
Behavior:
1 Plane: A <select> can take three forms in its plane representation: vertical, horizontal, or both. The vertical form of the <select> is similar to a typical HTML select object. Once the <select> receives focus, the user can navigate up and down to view all of the options within the array. The horizontal form behaves the same way except the options are presented horizontally and the user navigates left to right to see more options in the list.
2 Focustype: A <select> can take two forms in navigation behavior (moveable or fixed) through the fixed property. By default, a <select> uses movable focus allowing the user to actually move the focus up/down, or left/right over the viewable options. If the user gets to the last viewable option at either end of the <select> (e.g., sub item number seven), but there are still additional options that are not currently viewable (e.g., sub item number eight, etc. . . . ), then the options behind the focus and in the entire list continue to change until the user reaches the last option in the array. This behavior is akin to a typical HTML select control.
3 In order to create a <select> with a fixed area of focus, the author must set the fixed attribute to true (e.g., <select fixed="true">. This automatically positions the focus area to the middle option in the list, when the user navigates to the <select>. Navigating up/down, left/right does not move the focus box as it is anchored, but rather rewrites the options in the viewable array so that the user may move the options in and out of the single, fixed focus window. By design, fixed focus select lists will loop through the available options, therefore never revealing any empty options as the user continues to navigate in one single direction through the <select>.
a Properties: bgcolor, border, bordercolor, cols, disabled, optioncolor, optioncolorfocus, optioncolorselected, optionpad, overlay, overselector, fixed, font, height, hidden, textcolor, textcolorfocus, textcolorselected, name, navup, navdown, navleft, navright, plane, rows, template, underselector, width, x, y, xpad, ypad, zorder
b Methods: onSelectFocus, onSelectBlur, onSelectClick, onSelectEnd, onEnd, onBegin
c Used by: , <group>
d EXAMPLE: The following is an example of defining a horizontal <select> using a fixed focustype that displays 3 items in its interface. There are a total of 5 text items (options) that can be viewed in the select list by navigating left and right with the remote.

<select       name="mainmenu"       fixed="true" plane="horizontal"   x="100"   y="20"   cols="3" optioncolorfocus="#FFCC00"       textcolorfocus= "FFFFFF"       optioncolorselected="#000000" textcolorselected="#CCCCCC">

```
<option>
    <text name="option1">Item 1</text>
</option>
<option>
    <text name="option2">Item 2</text>
</option>
<option>
    <text name="option3">Item 3</text>
</option>
<option>
    <text name="option4">Item 4</text>
</option>
<option>
    <text name="option5">Item 5</text>
</option>
</select>
```

The following is an example of defining a vertical <select> using a movable focustype that displays 3 items in its interface. There are a total of 5 items (options) that can be viewed in the select list by navigating up and down with the remote.

```
<select name="mainmenu" plane="vertical" x="100" y="20" rows= "3">
    <option>
        <image src="icon_a.bmp"/>
    </option>
    <option>
        <image src="icon_b.bmp"/>
    </option>
    <option>
        <image src="icon_c.bmp"/>
    </option>
    <option>
        <image src="icon_d.bmp"/>
    </option>
    <option>
        <image src="icon_e.bmp"/>
    </option>
</select>
```

<textInput> A <textinput> object is a single-line region that accepts user text input via remote or keyboard. A <textinput> can support multiple lines of text input by specifying the multiline attribute. The <textinput> can have three states: idle, focused, and selected (once it is clicked). To indicate the different states, the application author can set bordercolor and bgcolor values for the states.
  a Properties: bgcolor, bgcolorfocus, bgcolorselected, border, bordercolor, bordercolorfocus, bordercolorselected, cursorcolor, disabled, font, height, hidden, textcolor, maxlength, multiline, name, navup, navdown, navleft, navright, password, template, width, x, y, zorder
  b Methods: onFocus, onBlur, onClick
  c Used by: , <group>
  d EXAMPLE:
    <text name="ziptext" x="10" y="44">Enter your zip: </text>
    <textinput name="zipcode" x="32" y="44" maxlength="5" border="1" bgcolor="#000000" border="#FFFFFF" bgcolorfocus="#CCCCCC" bordercolorfocus="#FFCC00"/>

<transition> A transition is a process that is triggered by an action on a specified target object or group of objects. It moves the target object from its starting position to the new position specified by the <transition> tag.
  a Properties: clipx1, clipx2, clipy1, clipy2, duration, interval, endx, endy, name, state, type
  b Methods: onFinish
  c Used by: 
  d EXAMPLE: The following transition would be defined, ideally in the MAC.config file, for use by an element or group of elements.
    <transition name="movemenu" endx="0" endy="320" type="out" interval="20"/>
  In the XML markup for the application, a group of buttons comprising a menu panel is created:
    <group name="menu" x="0" y="480">
        <button name="button1"/>
        <button name="button2"/>
    </group>
  Elsewhere in the XML markup, a button click fires an event to execute the movemenu transition upon the menu group by setting the value of the state attribute to play:
    <button name="showmenu" onClick="setProperty (movemenu, state, 'play')">Animate the menu</button>

5. Object Properties
Adtype: Indicates the type of ad to be displayed by the ad object: text, image or bitmap.
  1 EXAMPLE: adtype="text"
  2 VALUE: String: text|image|bitmap
  3 DEFAULT: None
Align: Sets the horizontal alignment of text for a <text> object, <button> object, and within the options of a <select>.
  1 EXAMPLE: align="center"
  2 VALUE: String: left|center|right
  3 DEFAULT: left
Avoid: The name of the object that should be avoided when displaying <text> that may overlap or run into that object. It is often used to control text wrapping around an image.
  1 EXAMPLE: avoid="storyImage"
  2 VALUE: String
  3 DEFAULT: None
Background: The asset or video channel to display as the page background. A background can either be a graphic asset (.gif or jpg) or a TV video channel.
  1 To display an image (.gif or jpg) located in a directory within the same MAC channel as the referring template:
  2 background="my bkg.jpg"
  3 To display an image (.gif or .jpg) located in a directory within a different MAC channel as the referring template:
  4 background=" . . . /otherChannelName/my bkg.jpg"
  5 To display an image (.gif or .jpg) located in a datatable within the same MAC channel as the referring template:

6 `<datatable name="newsdata" src="package://news.dat"/>`
7 ``
8 To display the previously tuned video channel as the background, use the tv: protocol:
background="tv:"
9 To display a specific channel as the background video channel, include a channel parameter with the tv: protocol:
background="tv:36"
10 NOTE: When using a background image or tv video for a page, do not also specify a bgcolor for the page. Bgcolor should only be used if no background image or tv video is desired, as bgcolor will be displayed and the background image/video will not.
11 EXAMPLE: background="bg_home.jpg"
12 VALUE: String
13 DEFAULT: None Bgcolor
1 Background color of the element.
2 EXAMPLE: bgcolor="black"
3 VALUE: The name value corresponding to its hex color as specified in palette.xml
4 DEFAULT: transparent (000000)

Border
1 Pixel thickness of a border drawn around the element.
2 EXAMPLE: border="1"
3 VALUE: Integer
4 DEFAULT: 0

Bordercolor
1 Color of the element's border.
2 EXAMPLE: bordercolor="black"
3 VALUE: The name value corresponding to its hex color as specified in palette.xml
4 DEFAULT: black (121212)

Bottomcolor
1 The color used for the bottom edge of a button object.
2 EXAMPLE: bottomcolor="grey"
3 VALUE: The name value corresponding to its hex color as specified in palette.xml
4 DEFAULT: transparent (000000)

Hotspot
1 Pixel thickness of a border drawn along the inside edge of a `<button>` to indicate focus and selection when a hotspot type of selection box is desired. By default, hotpsots will not be rendered since the default size is 0. If a hotpsot is desired, the suggested size is 4 pixels.
2 EXAMPLE: hotspot="4"
3 VALUE: Integer
4 DEFAULT: 0

Hotspotfocus
1 Color of the hotspot to be drawn around the defined area of a `<button>` when the button receives focus.
2 EXAMPLE: hotspotfocus="gold"
3 VALUE: The name value corresponding to its hex color as specified in palette.xml
4 DEFAULT: gold (B5971D)

Hotspotselected
1 Color of the hotspot to be drawn around the defined area of a `<button>` when the button is selected.
2 EXAMPLE: hotspotselected="grey"
3 VALUE: The name value corresponding to its hex color as specified in palette.xml
4 DEFAULT: grey (999999)

Channel
1 The number of the channel to display in the scaled `<video>` window.
2 EXAMPLE: channel="4"
3 VALUE: Integer
4 DEFAULT: None Color
1 When used with `<rect>` or `<button>` it is the fill color to use.
2 EXAMPLE: color="black"
3 VALUE: The name value corresponding to its hex color as specified in palette.xml
4 DEFAULT: black (121212)

Datasrc
1 The name of the datatable and data column within that table that should be used to dynamically populate the options in a select list. This must be formatted using the same syntax used to refer to data pieces elsewhere. The format follows:
$$tableName[rowNumber].columnName.
2 When using datasrc, the rowNumber is omitted and the format is simply:
$$tableName.columnName
3 EXAMPLE: datasrc="$$weather.city"
4 VALUE: String
5 DEFAULT: None Defaultfocus
1 The name of the `<button>` or other focusable element that receives default focus when the page loads. This is only required in the outermost, main page and should not be specified in pages that are includes, unless those includes are called directly from a load( ) method.
2 To reference an object within the current page document, only the object name needs to be specified.
3 EXAMPLE: ``
4 To reference an object within an included file, the included page name followed by the object name must be specified.
5 EXAMPLE: ``
6 VALUE: String
7 DEFAULT: None Disabled
1 Determines whether the element can be navigated to or not. An element may be disabled if other parameters need to be met in order to access the element. It is often used to make the downstate of a button in a navigation menu unselectable since it is the current location.
2 EXAMPLE: disabled="true"
3 VALUE: Boolean
4 DEFAULT: False Displayindex
1 Defines which position in a `<select>` should receive initial focus when the user navigates to the select list.
2 EXAMPLE: displayindex="2"
3 VALUE: Integer
4 DEFAULT: 0

Ellipsis
1 Appends an ellipsis ' . . . ' to the end of the text string displayed in a `<text>`, when the text string exceeds the available space allocated in the `<text>`
2 EXAMPLE: ellipsis="true"
3 VALUE: Boolean
4 DEFAULT: false Height
1 Height (in pixels) of the element.
2 EXAMPLE: height="22"

3 VALUE: Integer
4 DEFAULT: None
Hidden
1 Sets the visibility property of the element. All elements are visible by default.
2 EXAMPLE: hidden="true"
3 VALUE: Boolean
4 DEFAULT: False
Hlheight
1 The height of the highlight bar that is used in a <select> on MAC-J.
2 EXAMPLE: hlheight="25"
3 VALUE: Integer
4 DEFAULT: 0
Hlwidth
1 The width of the highlight bar that is used in a <select> on MAC-J.
2 EXAMPLE: hlwidth="200"
3 VALUE: Integer
4 DEFAULT: 0
Id
1 The name of the declared <var>
2 EXAMPLE: <var id="myVar">
3 VALUE: String
4 DEFAULT: None
Index
1 When used with <select>:
2 The index value of the option in the array of options for a <select>. It is used to store the index value of the option which currently has focus. This value is automatically updated as the user navigates through the select.
3 EXAMPLE: index="4"
4 VALUE: Integer
5 DEFAULT: None
Key
1 The reference to the ad schedule entry in the location-list.xml file generated by Ad Server.
2 EXAMPLE: key="42"
3 VALUE: Integer
4 DEFAULT: None
Layer
1 The layer property indicates how the <image> should be rendered on the client. All images are defaulted to be merged into their background I-Frame. When layer="middle" the image will be rendered as a P-Frame by the Liberate Server. When layer="foreground" the .bmp image will be converted to a VQ bitmap for display in the 16 color foreground layer with <button> assets and text objects.
2 EXAMPLE: layer="middle"
3 VALUE: String: background|middle|foreground
4 DEFAULT: background
Leftcolor
1 The color used for the left edge of a button object.
2 EXAMPLE: leftcolor="grey"
3 VALUE: The name value corresponding to its hex color as specified in palette.xml
4 DEFAULT: transparent (000000)
Link
1 The element that is responsible for executing the action defined for an <ad>. An example of this would be having a separate <button> responsible for executing the action related to a text based <ad> which is not itself selectable.
2 EXAMPLE: link="gobutton"
3 VALUE: String
4 DEFAULT: None Loop
1 Executes the ontimer events for a <timer> the specified number of times. By default, the loop property is set to 0, which means it will loop indefinitely.
2 EXAMPLE: loop="3"
3 VALUE: Integer
4 DEFAULT: 0
Main
1 Indicates whether a  is a wrapper template and has the ability to refer to included files via the <include> tag.
2 EXAMPLE: main="true"
3 VALUE: Boolean
4 DEFAULT: False
Maxcount
1 The maximum number of options to display in a <select>.
2 EXAMPLE: maxcount="3"
3 VALUE: Integer
4 DEFAULT: None
Morenext
1 The name of the object to hide if there are no more options off of the visible bottom or right-hand side of the <select> list. This object is visible as long as there are more options available that are not currently appearing on screen in the <select>. On some AC platforms, it may be more efficient to use of one of the built-in DCT special characters to display a text character solid arrow to indicate scroll direction. Using a vq image will require more memory and load latency.
2 EXAMPLE: morenext="forward arrow"
3 VALUE: String
4 DEFAULT: None
Moreprev
1 The name of the object to hide if there are no more options off of the visible top or left-hand side of the <select> list. This object is visible as long as there are more options available that are not currently appearing on screen in the <select>. On some AC platforms, it may be more efficient to use of one of the built-in DCT special characters to display a text character solid arrow to indicate scroll direction. Using a vq image will require more memory and load latency.
2 EXAMPLE: moreprev="back arrow"
3 VALUE: String
4 DEFAULT: None
Name
1 The identifier associated with the element. Each object within a single page must have a unique name.
2 When used with the <datatable> tag, it is the name of the datatable that is being referenced with the specified .dat file.
3 EXAMPLE: name="head txt"
4 VALUE: String
5 DEFAULT: None
Navleft
1 The identifier of the page and element on that page that should be given focus when the user selects the LEFT directional arrow on either the remote or keyboard. This is an optional attribute that is only used when the application author needs to specifically override the focus management for a given screen as generated by the auto navigator in the client. The format for this attribute is in dot notation: @pageName.objectName
2 EXAMPLE: navleft="@myPage.button1"
3 VALUE: string
4 DEFAULT: None Navright
1 The identifier of the element that should be given focus when the user selects the RIGHT directional arrow on either the remote or keyboard. This is an optional attribute that is only used when the application author needs to specifically override the focus management for a given screen as generated by the auto navigator in the client. The format for this attribute is in dot notation: @pageName.objectName
2 EXAMPLE: navright="@myPage.button1"
3 VALUE: string
4 DEFAULT: None Navup
1 The identifier of the element that should be given focus when the user selects the UP directional arrow on either the remote or keyboard. This is an optional attribute that is only used when the application author needs to specifically override the focus management for a given screen as generated by the auto navigator in the client. The format for this attribute is in dot notation: @pageName.objectName
2 EXAMPLE: navup="@myPage.button1"
3 VALUE: string
4 DEFAULT: None Navdown
1 The identifier of the element that should be given focus when the user selects the DOWN directional arrow on either the remote or keyboard. This is an optional attribute that is only used when the application author needs to specifically override the focus management for a given screen as generated by the auto navigator in the client. The format for this attribute is in dot notation: @pageName.objectName
2 EXAMPLE: navdown="@myPage.button1"
3 VALUE: string
4 DEFAULT: None Navtemplate
1 The template that defines the color and text styles to be used by the <button> or <select> that is referring to it when in its idle state.
2 EXAMPLE: navtemplate="myTextTempate"
3 VALUE: String
4 DEFAULT: None Navtemplatedisabled
1 The template that defines the color and text styles to be used by the <button> or <select> that is referring to it when the disabled property is set to "true".
2 EXAMPLE: navtemplatedisabled="myTextTempate"
3 VALUE: String
4 DEFAULT: None Navtemplatefocus
1 The template that defines the color and text styles to be used by the <button> or <select> that is referring to it when in its focused state.
2 EXAMPLE: navtemplatefocus="myTextTempate"
3 VALUE: String
4 DEFAULT: None Navtemplateselected
1 The template that defines the color and text styles to be used by the <button> or <select> that is referring to it when in its selected state.
2 EXAMPLE: navtemplateselected="myTextTempate"
3 VALUE: String
4 DEFAULT: None Nextbutton
1 The identifier of the <button> element that is responsible for paging forward or incrementing through a pageable <text>. When specified within a text, it is implied that the text is a pageable text. It is also implied that this button will be hidden when the user is at the last page of text. This button must be used in combination with the page( ) method to execute the paging function. It is advised to not specify a bgcolor for a button being used as a nextbutton as it causes odd rendering when its visibility is toggled.
2 EXAMPLE: nextbutton="btn_next"
3 VALUE: string
4 DEFAULT: None Object
1 The dot notation representation of the object on a page that is being defined for a <navitem>. The format must follow the defined syntax for all object references. It must be preceded with the '@' symbol. It must also include the page name followed by the object name.
2 EXAMPLE: object="@myPage.myButton
3 VALUE: String
4 DEFAULT: None Offsetx
1 The relative X position for rendering text associated with a <button>. It is relative to the top, left coordinate of the button when align="left" (default). It is relative to the top, right coordinate of the <button> when align="right". It provides the author with pixel precise positioning of the text string as it appears on a <button>.
2 EXAMPLE: offsetx="5"
3 VALUE: Integer
4 DEFAULT: 0

Offsety
1 The relative Y position for rendering text associated with a <button>. It is relative to the top, left coordinate of the <button> when valign="top" (default).>. It is relative to the bottom, left coordinate of the <button> when valign "bottom". It provides the author with pixel precise positioning of the text string as it appears on a <button>.
2 EXAMPLE: offsety=.cent.5"
3 VALUE: Integer
4 DEFAULT: 0

Optionpad
1 The number of pixels for spacing between options in a <select>
2 EXAMPLE: optionpad="3"
3 VALUE: Integer
4 DEFAULT: 0

Padding
1 The number of pixels for spacing between the text and the object it is avoiding, when avoid=true.
2 EXAMPLE: padding="4"
3 VALUE: Integer
4 DEFAULT: 0

Paging
1 Indicates whether the text> is pageable. This is used when the contents of the <text> exceed the defined area and multiple screens are needed to 'page' through the text using the page( ) method.
2 When used with <group> it defines the group as pageable so that the page( ) method can be used to increment through the array of objects defined within the <group>. Only one object within the group can be displayed at a time. This is handy for creating animations that are comprised of multiple image objects representing the frames of the animation.
3 EXAMPLE: paging="true"
4 VALUE: Boolean
5 DEFAULT: False Plane
1 The plane or graphical representation of the <select> list, either vertical or horizontal
2 EXAMPLE: plane="horizontal"
3 VALUE: String: vertical|horizontal
4 DEFAULT: vertical Period
1 Period of time in milliseconds before the next action is to be executed.
2 When used with <transition> it is the period of time before the next frame in the transition.
3 When used with <timer> it is the period of time before the next ontimer event is executed.
4 EXAMPLE: period "20"
5 VALUE: Integer
6 DEFAULT: 40

Prevbutton
1 The identifier of the <button> element that is responsible for paging backwards or decrementing through a pageable <text>. When specified within a text, it is implied that the text is a pageable text. It is also implied that this button will be hidden when the user is at the last page of text. This button must be used in combination with the page( ) method to execute the paging function. It is advised to not specify a bgcolor for a button being used as a prevbutton as it causes odd rendering when its visibility is toggled.
2 EXAMPLE: prevbutton="btn back"
3 VALUE: String
4 DEFAULT: None Prevpage
1 The name of the template that is used as the page 1 layout in a two-template paging system. This is typically used where page 1 has a different layout than all the other pages: 2 through [N]. It allows the template for page 2 through [N] to know which template to use when paging back to page 1. The startindex property must be used in conjunction with prevpage.
2 EXAMPLE: prevpage="pageOneTemplate"
3 VALUE: String
4 DEFAULT: None Rightcolor
1 The color used for the right edge of a button object.
2 EXAMPLE: rightcolor="grey"
3 VALUE: The name value corresponding to its hex color as specified in palette.xml
4 DEFAULT: transparent (000000)

Round
1 Creates a rounded corner on all 4 corners of a <rect>.
2 EXAMPLE: round="true"
3 VALUE: Boolean
4 DEFAULT: FALSE Selectedbutton
1 The current button in a menu of buttons that should automatically have its src set to the 'select' state asset when clicked. The selectedbutton property must be set to a defined variable, and the value stored in the variable will reflect which button in the menu should have its src in the 'select' state.
2 EXAMPLE: selectedbutton="$sportsButton"
3 VALUE: String
4 DEFAULT: None Src
1 When used with <image> it is the source graphic asset file to be used and must be either a .jpg or .bmp file.
2 When used with <datatable> it is the .dat file containing the data table being used.
3 EXAMPLE: src="myImage.bmp"
4 VALUE: String
5 DEFAULT: None Startindex
1 When used with <select>:
2 Defines which data element to display in the first visible row/column of the select. The displayindex property should be used to define which element in the select should receive default focus when navigating to the select.
3 When used with a paging <group>: The initial value to assign to the counter variable that is being used for paging through the group.
  i EXAMPLE: startindex="3"3
  ii VALUE: Integer
  iii DEFAULT: NONE
4 When used with <text>: The startindex is used on page 2 of a 2 template paging system where page 1 has a different layout than all the other pages 2 through n. Startindex should be used on the page 2 through n template and refer to a variable which gets passed in by the referring template. It is used in conjunction with the prevpage property.
  i EXAMPLE: <text startindex="$myStartIndexVar" prevpage="template-PageOne"/>
  ii VALUE: Integer
  iii DEFAULT: 0

Style
1 The style of text to display for a <text> or <navtemplate> that is referenced by a <button>. See Table 5 for font styles.
2 EXAMPLE: style="5"
3 VALUE: Integer: 1|2|3|4|5.ver-tline.6
4 DEFAULT: 3

Table
1 The name of the table within a data file that is referenced via the <datatable> tag.
2 EXAMPLE: table="sports articles"
3 VALUE: String
4 DEFAULT: None Textcolor
1 The color of the text string that is displayed as part of the element
2 EXAMPLE: textcolor="white"
3 VALUE: The name value corresponding to its hex color as specified in palette.xml
4 DEFAULT: black (121212)

Topcolor
1 The color used for the top edge of a button object.
2 EXAMPLE: topcolor="grey"
3 VALUE: The name value corresponding to its hex color as specified in palette.xml
4 DEFAULT: transparent (000000)

Type
1 The type of variable being declared. Accepted values include: int string
2 EXAMPLE: type "int"
3 VALUE: int|string
4 DEFAULT: None Valign
1 Sets the vertical alignment of text for a <text> object, <button> object, or within the options of a <select>.

2 EXAMPLE: align="top"
3 VALUE: String: top|middle|bottom
4 DEFAULT: middle
Value
1 Stores the hex value for a color defined in the <palette>
2 EXAMPLE: value="121212"
3 VALUE: The name value corresponding to its hex color as specified in palette.xml
4 DEFAULT: None
Width
1 Width (in pixels) of the element.
2 EXAMPLE: width="90"
3 VALUE: Integer
4 DEFAULT: None
X
1 The X coordinate pixel indicating the absolute horizontal location of the element. In conjunction with y, x specifies the top-left pixel for the display of the element. When X is used with an element that is contained within a <group> then the X value is a relative position from the X position of the group. See <group> for an example.
2 EXAMPLE: x="320"
3 VALUE: Integer
4 DEFAULT: None
Xradius
1 Number of pixels from the left and right edges of a <rect> to paint a curved edge
2 EXAMPLE: xradius="3"
3 VALUE: Integer
4 DEFAULT: 5
Y
1 The Y coordinate pixel indicating the absolute vertical location of the element. In conjunction with x, y specifies the top-left pixel for the display of the element. When Y is used with an element that is contained within a <group> then the Y value is a relative position from the Y position of the group. See <group> for an example.
2 EXAMPLE: y="100"
3 VALUE: Integer
4 DEFAULT: None
Yradius
1 Number of pixels from the top and bottom edges of a <rect> to paint a curved edge
2 EXAMPLE: yradius="3"
3 VALUE: Integer
4 DEFAULT: 5
6. More Object Properties
A. bevel
1 Specified the appearance of a bevel on a primitive object
2 EXAMPLE: myEllipse.bevel="up"
3 VALUE: String—any of the following values: up|down-|none
4 DEFAULT: None
B. bold
1 Boolean condition for declaring a font to be bold or not.
2 EXAMPLE: button3.font.bold=true
3 VALUE: Boolean
4 DEFAULT: False
C. bordercolorfocus
1 Color of the element's border when it receives focus. If this attribute is not specified, then it receives the same value as is specified for the bordercolor attribute.
2 EXAMPLE: button3.bordercolorfocus=#000000
3 VALUE: A hexadecimal triplet color name. #F0F0F0
4 DEFAULT: #000000
D. bordercolorselected
1 Color of the element's border after it has been selected. If this attribute is not specified, then it receives the same value as what is specified for the bordercolor attribute.
2 EXAMPLE: button3.bordercolorselected=#000000
3 VALUE: A hexadecimal triplet color name. #F0F0F0
4 DEFAULT: #000000 (black)
E. cache
1 Boolean value specifying whether the object should be cached or not. This attribute is not supported by some embodiments of the AC.
2 EXAMPLE: myImage.cache=true
3 VALUE: Boolean
4 DEFAULT: False
F. campaign
1 The ID for the ad campaign to be used by the <ad> tag.
2 EXAMPLE: myAd.campaign="42"
3 VALUE: String
4 DEFAULT: None
G. checked
1 The true/false state of whether a checkbox is checked or not. A Checkbox can be checked by default on page load by setting it to true.
2 EXAMPLE: checkbox1.checked=true
3 VALUE: Boolean
4 DEFAULT: false
H. cols
1 Number of columns in the <select>. This can only be set to a value greater than 1 when the PLANE property is set to HORIZONTAL.
2 EXAMPLE: mySelect.cols=5
3 VALUE: Integer
4 DEFAULT: 1
I. config
1 The name of the config file to be used by the MAC application.
2 EXAMPLE: <mac config="virtualchannel.cfg"
3 VALUE: String
4 DEFAULT: 1
J. cursorcolor
1 The color of the cursor used in a <textinput>
2 EXAMPLE: myTextInput.cursorcolor="#FFFFFF"
3 VALUE: A hexadecimal triplet color name. #F0F0F0
4 DEFAULT: #000000
K. Dropshadow
1 Boolean condition for declaring a font to be dropshadow or not.
2 EXAMPLE: button3.font.dropshadow=true
3 VALUE: Boolean
4 DEFAULT: False
L. Duration
1 Total number of frames allowed in the execution of a <transition>.
2 EXAMPLE: myTransition.duration="500"
3 VALUE: Integer
4 DEFAULT: None
M. endangle
1 The angle (in degrees) to end the arc at. Must be greater than 0.
2 EXAMPLE: myArc.endangle=20
3 VALUE: Integer
4 DEFAULT: NONE
N. EndX
1 The absolute position of the destination X position for a <transition>.
2 EXAMPLE: myTransition.endX="420"

3 VALUE: String
4 DEFAULT: None

O. EndY
1 The absolute position of the destination Y position for a <transition>.
2 EXAMPLE: myTransition.endY="420"
3 VALUE: String
4 DEFAULT: None P. fixed
1 Boolean indicating whether the <select> contains a fixed focus box or not. By definition, if a <select> has a fixed focus, then the options will loop in their display.
2 EXAMPLE: mySelect.fixed="true
3 VALUE: Boolean
4 DEFAULT: false Q. focustype
1 The type of navigation allowed by the <select>, either movable or fixed.
2 EXAMPLE: myselect.focustype='fixed'
3 VALUE: string: possible values include 'movable' or 'fixed'
4 DEFAULT: movable R. FONT
1 The font template to be used by the element.
2 EXAMPLE: button3.font='font5'
3 VALUE: String
4 DEFAULT: None S. idref
1 The name of the element to which a <param> tag is referring to in order to obtain its value.
2 EXAMPLE: myForm.param[0]="checbox1"
2 VALUE: String
3 DEFAULT: None T. Interval
1 Period of time in milliseconds before the next action is to be executed. When used with <transition> it is the period of time before the next frame in the transition. When used with <timer> it is the period of time before the next onTimer event is executed.
2 EXAMPLE: myTransition.interval="20"
3 VALUE: Integer
default: None U. Italic
1 Boolean condition for declaring a font to be italic or not.
2 EXAMPLE: button3.font.italic=true
3 VALUE: Boolean
4 DEFAULT: False V. maxlength
1 Number of characters that the text input can accept when accepting keyboard/remote input from the user.
2 EXAMPLE: myTextInput.maxlength=5.
3 VALUE: Integer
4 DEFAULT: none W. Method
1 Specifies the method, either POST or GET, for submitting a form.
2 EXAMPLE:
3 VALUE: String
4 DEFAULT: POST X. multiline
1 Boolean condition indicating whether the <text> or <textinput> supports multiple lines of text.
2 EXAMPLE: myTextInput.multiline=true.
3 VALUE: Boolean
4 DEFAULT: False Y. Optioncolor
1 The background color of the <option> in a <select> when it is in its idle, non-focused state. If optioncolor is not defined, then the bgcolor of the <select> is used.
2 EXAMPLE: mySelect.optioncolor='#F0F0F0'
3 VALUE: A hexadecimal triplet color name. #F0F0F0
4 DEFAULT: #FFCC00 (yellow)

Z. Optioncolorfocus
1 The background color of the <option> in a <select> when it receives focus. This property is used in tandem with the textcolorfocus property so that the item receiving focus can have a different background color and text color. When focustype=fixed, the optioncolorfocus attribute is permanently set on the middle option in its display since focus within the select list does not change.
2 EXAMPLE: mySelect.optioncolorfocus='#FFCC00'
3 VALUE: A hexadecimal triplet color name. #F0F0F0
4 DEFAULT: #FFCC00 (yellow)

AA. Optioncolorselected
1 The background color of the <option> in a <select> when it is selected. This property is used in tandem with the textcolorfocus property so that the item receiving focus can have a different background color and text color. Oftentimes, when a selection in a <select> is made, focus will be applied to another element on the screen or the  will change.
2 EXAMPLE: mySelect.optioncolorselected '#F0F0F0'
3 VALUE: A hexadecimal triplet color name. #F0F0F0
4 DEFAULT: #FFCC00 (yellow)

BB. overlay
1 The name of the object that will obscure the active drawing area for a <select>. A <select> using scrolling transitions needs this to properly overlay while animating. This attribute is not supported by some embodiments of the AC.
2 EXAMPLE: my Select.overlay=myOverlay
3 VALUE: String
4 DEFAULT: None CC. overselector
1 The name of the object that the <select> will draw centered OVER the top of the selected item. This attribute is not supported by some embodiments of the AC.
2 EXAMPLE: my Select.overselector="select cover"
3 VALUE: String
4 DEFAULT: None DD. Pageback
1 The name of the element which executes a getPrevious( ) method upon a paging <group>.
2 EXAMPLE:
3 VALUE: String
4 DEFAULT: None EE. Pagenext
1 The name of the element which executes a getNext( ) method upon a paging <group>.
2 EXAMPLE:
3 VALUE: String
4 DEFAULT: None FF. password
1 When set to true, all input is presented as asterisks (*).
2 EXAMPLE: myTextInput.password=true
3 VALUE: boolean
4 DEFAULT: false GG. rows
1 Number of rows in a <select> list object. This value can only be set to a value greater than 1 when the PLANE property is set to VERTICAL.

2 EXAMPLE: mySelect.rows=3
3 VALUE: Integer
4 DEFAULT: 1
HH. size
1 Used with <group>, it indicates the number of elements that are contained within the specific group.
2 EXAMPLE: myGroup.size=5
3 VALUE: Integer
4 DEFAULT: None
5 Used with <font>, it indicates the point size of the font to be rendered:
6 EXAMPLE: myFont.size=18
7 VALUE: Integer
8 DEFAULT: None
II. srcfocus
1 The source asset file to be used by the element when it receives focus.
2 EXAMPLE: button3.srcfocus=mybutton_over.bmp
3 VALUE: String
4 DEFAULT: NONE
JJ. srcselected
1 The source asset file to be used by the element after it has been selected
2 EXAMPLE: button3.srcselected=mybutton_on.bmp
3 VALUE: String
4 DEFAULT: NONE
KK. srcfocusselected
1 Used with <checkbox> and <radio> it is the source asset file to be used by the element when it receives focus and has already been checked
2 EXAMPLE: button3.srcfocusselected=mycheckbox_checkedfocus.bmp
3 VALUE: String
4 DEFAULT: NONE
LL. srcref
1 The name or ID of the element that should be used to display the particular <button>
2 EXAMPLE: button3.srcref=button template
3 VALUE: String
4 DEFAULT: NONE
MM. startangle
1 The angle (in degrees) to start the arc at. Must be greater than 0.
2 EXAMPLE: myArc.startangle=20
3 VALUE: Integer
4 DEFAULT: NONE
NN. state
1 Can be used with <audio>, <video>, <transition, or <timer> to indicate the current state of the action. The three accepted values are: stop, play, pause. The state attribute is always set to STOP by default.
2 EXAMPLE: myAudio.state="play"
3 VALUE: String (stop|play|pause)
4 DEFAULT: "STOP"
OO. target
1 The filename of the target page to post form data to
2 EXAMPLE:
3 VALUE: String
4 DEFAULT: None
PP. template
1 The element template to be used by the current template for behaviors such as x,y text offsets, font formats, colors, etc.
2 EXAMPLE: button3.template="myTextTempate"
3 VALUE: String
4 DEFAULT: None QQ. textx
1 The X position of the text label associated with its element. This X value is a relative position to the elements X value. This is typically only used to override the position as defined by the element's align attribute or the position defined by the element template being used.
2 EXAMPLE: button3.textx="5"
3 VALUE: Integer
4 DEFAULT: 0
RR. texty
1 The Y position of the text label associated with its element. This Y value is a relative position to the elements Y value. This is typically only used to override the position as defined by the element's valign attribute or the position defined by the element template being used.
2 EXAMPLE: button3.texty="5"
3 VALUE: Integer
4 DEFAULT: 0
SS. textcolorfocus
1 The color of the text string that is displayed when the element receives focus. If the attribute is not specified, it inherits its value from the TEXTCOLOR attribute.
2 EXAMPLE: mySelect.textcolorfocus=#FFFFFF
3 VALUE: A hexadecimal triplet color name. #F0F0F0
4 DEFAULT: #000000 or inherits value from TEXTCOLOR
TT. textcolorselected
1 The color of the text string that is displayed when the element has been selected. If the attribute is not specified, it inherits its value from the TEXTCOLOR attribute.
2 EXAMPLE: mySelect.textcolorselected=#CCCCCC
3 VALUE: A hexadecimal triplet color name. #F0F0F0
4 DEFAULT: #000000 or inherits value from TEXTCOLOR
UU. underselector
1 The name of the object that the <select> will draw centered UNDER the top of the selected item. This attribute is not supported by some embodiments of the AC.
2 EXAMPLE: mySelect.underselector="select_ backdrop"
3 VALUE: String
4 DEFAULT: None
VV. value
1 The value of the element that is passed to the form target when a form referencing the element is submitted.
2 EXAMPLE: myForm.hidden_1.value="Secret Code 5"
3 VALUE: String
4 DEFAULT: None
WW. Version
1 The version number of the MAC XML being used.
2 EXAMPLE: <mac version="1.0"
3 VALUE: String
4 DEFAULT: 1
XX. volume
1 Determines the volume of the audio or video asset.
2 EXAMPLE: mySoundclip.volume=60
3 VALUE: integer, range 1 to 100
4 DEFAULT: 50
YY. x1
1 The relative X screen position of the top left corner for a primitive.
2 EXAMPLE: myArc.x1=320
3 VALUE: Integer b DEFAULT: None
ZZ. x2
1 The relative X screen position of the bottom right corner for a primitive.
2 EXAMPLE: myArc.x2=320
3 VALUE: Integer
4 DEFAULT: None
AAA. Y1
1 The relative Y screen position of the top left corner for a primitive.
2 EXAMPLE: myArc.y1=320
3 VALUE: Integer
4 DEFAULT: None
BBB. Y2
1 The relative Y screen position of the bottom rightcorner for a primitive.
2 EXAMPLE: myArc.y1=320
3 VALUE: Integer
4 DEFAULT: None
CCC. Xpad
1 The horizontal distance that options are drawn from the left edge of the <select>.
2 EXAMPLE: mySelect.xpad=3
3 VALUE: Integer
4 DEFAULT: None
DDD. ypad
1 The vertical distance that options are drawn from the bottom edge of the <select>.
2 EXAMPLE: mySelect.ypad=3
3 VALUE: Integer
4 DEFAULT: None
EEE. zorder
1 The stacking order relative to other elements within the same parent  container. Higher numbers are drawn first, and lower numbers last. This attribute is not supported by some embodiments of the AC.
2 EXAMPLE: myButton.zorder=3
3 VALUE: Integer
4 DEFAULT: 0

7. Object Methods back( ). The back( ) method is used to return the user to the last page visited in the plication. It cannot be used to return to the previous page within the current It is typically used with ad minisite pages, which are typically contained in a separate so they can be accessible to all other applications. Upon visiting an ad minisite, a called to launch the minisite. To return back to the previous screen, the back( ) method is used to return back to the previous app and restore the specific page and state of that application.
 a FORMAT: back( )
 b EXAMPLE:
  <button name="backBtn" x="5" y="5"onclick="back( )">Return to Portal</button> iskey( ). The iskey( ) method is used to detect the remote control key that was pressed and execute a certain event based upon that selection. It accepts one parameter, the name of the key. The following are accepted string values: 0|1|2|3|4|5|6|7|8|9
 a FORMAT: iskey(keyName)
 b EXAMPLE:
  <event onkey="iskey(3);load(sports.xml)"/> load( ). The load( ) method is used to display a new page within the current application. It accepts one required parameter: the filename for the  to be loaded.
 a FORMAT: load(target)
 b EXAMPLE:
  <button name="myButton" x="5"y="5" onclick="load(newshome.xml)">NEWS</button> loadapp( ). The loadapp( ) method is used to launch an entirely different AC application from the current AC application. Upon doing so, the current application is completely dumped from memory and will need to be reloaded again if desired. It accepts two required parameters: the name of the application to load and the filename within that application that should be loaded. A single application can easily be broken up into several smaller applications. This would require using the loadappo method to switch between apps, rather than the load( ) method which only switches pages within a single app.
 a FORMAT: loadapp(appName, fileName)
 b EXAMPLE:
  <button name="myButton" x="5" y="5" onclick="loadapp(golf, standings.xml)">Launch the Golf Channel</button> page( ). The page( ) method is used to navigate through multiple screens of text content, one screen worth at a time. The method accepts two parameters, the name of the text object to perform the action upon, and the +1/-1 value for incrementing/decrementing. Typically page( ) is used with a single <text> to page forward and back. When used with <text>, the page( ) method only supports incrementing or decrementing by the value of 1. This is specified by indicating +1, or −1 as the value to page( ). Since a pageable <text> is usually populated by a dynamic data source, the client does not know in advance how many screens worth of content will be displayed. Therefore incrementing/decrementing by more than 1 is not supported, nor is jumping to a specific page number.
 a FORMAT: page(target, +1), page(target, −1)
 EXAMPLE: Paging text
  <text name="txt_story" x="250" y="113" width="640" height="270" textcolor="e6e6e6" paging="true" prevbutton="btn_back" nextbutton="btn_next">$$news[$index].story </text>
  <!—PAGING BUTTONS—MUST APPEAR AFTER THE PAGING TEXT IN THE MAX MARKUP
  <button name="btn_back" x="100" y="440" width="100" height="100" onclick="page(txt_story, −1)">BACK</button>
  <button name="btn_next" x="400" y="440" width="100" height="100" onclick="page(txt_story, +1)">NEXT</button>

Pagegroup( ). The pagegroup( ) method is used for incrementing through an array of data for one or more objects in a <group>. It is typically used for three types of behaviors:
 1 Looping forward through an array of data rows, one row at a time
 2 Paging, non-looping, using paging buttons, through an array, one row at a time—either forward or back to the beginning or end of the array.
 3 Paging, non-looping, using paging buttons, through an array by N number of rows at a time—either forward or back to the beginning or end of the array.
The method accepts 3 required parameters, and one optional parameter which is only used when a non-looping paging group with buttons is desired.
 a FORMAT: pagegroup(groupName, $counterVar, datatableName, incr/decr value[optional])
 b EXAMPLE 1—LOOPING TICKER: The following example illustrates using a timer and the pagegroup( ) method to populate a looping sports scores ticker, where sports data is coming from a datatable called 'scores'. The pagegroupo method increments by one each time it is called, iterating and looping through all of the rows in the datatable.

```

<timer name="tickTmr" period="4000" ontimer="pagegroup(tickGrp, $counter,scores);"/>
  <group name="tickGrp" x="200" y="100" width="180" height="50">
    <text name="team1" x="0" y="0" width="180" height="20">$$scores[$counter].t1
    </text&-gt; <text name="team2" x="0" y="25" width="180" height="20">$$scores[$counter].t2</text>
    <text name="team3" x="200" y="0" width="180" height="20">$$scores[$counter].t3</text>
    <text name="team4" x="200" y="25" width="180" height="20">$$scores[$counter].t4</text>
  </group>
``` c EXAMPLE 2—NON-LOOPING PAGING GROUP WITH PAGING BUTTONS: The following example illustrates using the pagegroup( ) method to populate a group of text objects for a display that contains two sports scores per screen. Paging buttons are needed so that the user can page through the total array of scores, two at a time. This requires that the group be defined as a 'paging' group and prevbutton/nextbutton properties are defined. It is similar to a paging text where the prevbutton does not appear at the beginning of the array, and the nextbutton does not appear at the end of the array.

1 Two <vars> for the counters must be defined and initialized to the 0,1 positions of the data array:

```
<var id="ctr1" type="int">0</var>
<var id="ctr2" type="int">1</var>
```

2 Elsewhere in the page, a single group is defined, containing the layouts for two scores blocks. This group will be paged through by the buttons below. NOTE: It is important to only use a single group here to keep page drawing fast.

```
<group name="tickGrp_1" x="200" y="100" width="180" height="50" paging="true" prevbutton="btn_back" nextbutton="btn_next">
  <text name="tm1" x="0" y="0" width="180" height="20">$$scores[$ctr1].t1</text>
  <text name="tm2" x="0" y="25" width="180" height="20">$$scores[$ctr1].t2</text>
  <text name="sc1" x="200" y="0" width="180" height="20">$$scores[$ctr1].s1</text>
  <text name="sc2" x="200" y="25" width="180" height="20">$$scores[$ctr1].s2</text>
  <text name="tm3" x="0" y="50" width="180" height="20">$$scores[$ctr2].t1</text>
  <text name="tm4" x="0" y="75" width="180" height="20">$$scores[$ctr2].t2</text>
  <text name="sc3" x="200" y="50" width="180" height="20">$$scores[$ctr2].s1</text>
  <text name="sc4" x="200" y="75" width="180" height="20">$$scores[$ctr2].s2</text>
</group>
``` d Using paging buttons, each click calls two pagegroup( ) methods, one for each counter variable that needs to be updated. Notice that the value to increment is +/−2 since we want each group to increment by 2 items in the data array, because there are two scores displayed per screen. Also notice that a redraw( ) is explicitly called after the pagegroup( ) to force a redraw of the group and all its child elements.

```
<!—PAGING BUTTONS—MUST APPEAR AFTER THE PAGING GROUP IN THE MAX MARKUP
<button name="btn_back" x="100" y="440" width="100" height="100" onclick=" pagegroup (tickGr-p_1, $ctr1, scores_data, +2); pagegroup (tickGrp_1, $ctr2, scores_data, +2); redraw (tickGrp_1)">BACK</button>
<button name="btn_next" x="400" y="440" width="100" height="100" onclick=" pagegroup (tickGrp_1, $ctr1, scores_data, −2); pagegroup (tickGrp_1, $ctr2 scores_data, −2); redraw (tickGrp_1)">NEXT</button>
``` redraw( ). The redraw( )method is used to specifically define an object that must be re-rendered on screen in order to reflect an action or change that may have been performed upon it. It accepts one required parameter: the name of the object you wish to redraw. The redraw behavior is implicit in the set( ) method, but sometimes it is necessary to explicitly call the redraw( ) method for the change to render on screen. The redraw( ) method is typically used following a set( ) method, for example when an image src is set to a new value and that new image needs to be drawn to the screen.

a FORMAT: redraw(target)
b EXAMPLE:

```
<button name="myButton" x="5" y="5" src="button_off.bmp" textcolor="000000" onclick="set(@myimage.src, 'newImage.bmp');redraw(myImage)">Change image</button>
``` set( ). The set( ) method is used to change the value of a variable and/or assign a new value to an object property. The set( ) method also performs a redraw( ) on the screen after it is executed. The set( ) method accepts three parameters:

1 The object property or variable that is being modified
2 The value being assigned to the object property or variable
3 The type (string or int) of the value.

The set( ) method can be used to set an object property within the current MAX page using the following syntax:
a Format: set(@objectName.objectProperty, newPropertyValue)
b Example: set(@myButton.text, 'Hello World')

The set( ) method can also be used to set an object property on another MAX page using the following syntax:
a Format: set(@pageName.@objectName.objectProperty, newPropertyValue)
b Example: set(@index.myButton.text, 'Hello World')

The following defines the various combinations that can be authored using the set( ) method:

1 Set an object property on the current page to a string (type value is not needed)
set(@myButton.text, 'Hello World')
2 Set an object property on another page to a string
set(@newsHome.myButton.text, 'Hello World')
3 Set an object property to an integer
set(@myTimer.period, 500, int)
4 Set a var to a string or integer
set($myVar, 'Hello World', string)
set($myVar, 420, int)
5 Set a var to the hold the value of an object property.
set($myVar, @myText.text, string)
set($backURL, @weatherPage.name, int)
6 Set a var to a datatable reference
set($my, Story, $$news[$counter].article)

7 Set the a var back to its original value as defined in the <var> tag (only first param is needed)
set($myVar)
a FORMAT: set(objProp or var, value, type)
b EXAMPLE:
   <button name="myButton" x="5" y="5" width="100" height="100" onclick="set(@myText.textcolor, 'grey');redraw(myText)">Change text color</button>

TABLE B.2.8

Object Properties that can be modifed via set( ):

| Object | Property | Example |
|---|---|---|
| <button> | disabled | set(@myButton.disabled, true) |
| | hidden | set(@myButton.hidden, true) |
| | text | set(@myButton.text, 'New Button Text') |
| | offsetx | set(@button_object.offsetx, '15') |
| | offsety | set(@button_object.offsety, '15') |
| <group> | hidden | set(@myGroup.hidden, true) |
|  | background | set(@myPage.background, $$newsdata[$counter].bkg) |
| <rect> | border | set(@myRect.border, 4) |
| | bordercolor | set(@myRect.bordercolor, 'green') |
| | color | set(@myRect.color, 'black') |
| | hidden | set(@myRect.hidden, true) |
| | round | set(@rect_object.round, true) |
| | xradius | set(@rect_object.xradius, 15) |
| | yradius | set(@rect_object.yradius, 15) |
| <select> | index | set(@mySelect.index, 0) |
| <text> | bgcolor | set(@myText.bgcolor, 'green') |
| | border | set(@my Text.border, 4) |
| | bordercolor | set(@my Text.bordercolor, 'white') |
| | hidden | set(@myText.hidden, true) |
| | text | set(@myText.text, 'This is new text') |
| | textcolor | set(@myText.textcolor, 'black') |
| | style | set(@myText.style, 4) | setfocus( ). The setfocus( ) method allows you to specify the name of a <button> or other focusable object that the focus should be applied. It accepts one parameter: the name of the object to apply focus. Setfocus( ) should not be used to apply default focus when loading a page. Rather, the defaultfocus property of the  should be defined for this behavior.
  a FORMAT: setfocus(target)
  b EXAMPLE:
   <button name="myButton" x="5" y="5" width="100" height="100" onclick="setfocus(home_button)">Apply focus to Home button</button> settimedate( ). The settimedate( ) method is used to query the set-top for the current time/date and set the retrieved string value to a defined text string in the application representing the time/date in one of many available formats. The method accepts two parameters, the type of format for display, and the text object property to set.
  a FORMAT: settimedate(format, @textObjectName.text)
  b ACCEPTED VALUES:

TABLE B.2.9

Accepted values for setimmediate( )

| FORMAT | DESCRIPTION | EXAMPLE |
|---|---|---|
| full | Full date and time | Apr 11, 2002 10:25 pm |
| date1 | Full date | Apr 11, 2002 |
| date2 | Numeric format of date | 4/11/2002 |
| date_s | Abbreviated month, day | Apr 11 |
| time1 | Regular time | 10:25 pm |
| time2 | Military time | 22:25 |

TABLE B.2.9-continued

Accepted values for setimmediate( )

| FORMAT | DESCRIPTION | EXAMPLE |
|---|---|---|
| year | Year | 2002 |
| month | Numeric value of month | 5 |
| month_s | Abbreviated string of month name | Apr |
| month_1 | Full string of month name | April |
| mday | Numeric day of the month | 11 |
| wday | Abbreviated string of day of the week | Thur |
| hour | Numeric value of hour | 22 |
| min | Numeric value of minute | 25 |
| sec | Numeric value of second | 30 |
| ampm | Indicates am or pm | pm | c EXAMPLE: The following example, on page load, sets the text property of myDateText to the string that is obtained through the settimedateo call and displays it in the 'full' format. A separate <timer> object would need to be defined to continually update the text string on screen as the time changes.

start( ). The start( ) method is used to begin running a <timer> or <transition>. It accepts two parameters: the name of the object to 'start' and an optional target attribute. The optional target attribute is used only with <transition>, where the target is the name of the object that the timer should be performed upon.
  a FORMAT: start(timer name, target object)
  b EXAMPLE:
   <button name="myButton" x="5" width="100" height="100" onclick="start(animTimer)">Start the timer</button> stop( ). The stop( ) method is used to stop running a <timer>. It accepts one parameters: the name of the <timer> to 'stop'.
  a FORMAT: stop(timer name)
  b EXAMPLE:
   <button name="myButton" x="5" y="5" width="100" height="100" onclick="stop(animTimer)">Stop the timer</button> submit( ). The submit( ) method is used to submit form data via the protocol specified by the form's method property, either Post or Get.
  a EXAMPLE:
   <form name="myForm" method="POST">
   </form>
   <button name="myButton" x="5" y="5" src="button_off.bmp" onClick="submit(myForm)">Submit</button> vod( ). The vod( ) method is used to establish a session with a Seachange VOD server through the Liberate VOD Gateway. This method accepts three parameters:
  1 Asset_ID—The 10 digit asset ID provided by the Liberate VOD Gateway
  2 Title—The text string title to be displayed in the VOD Trick Mode bar
  3 Duration—The text string for the length of the video asset to be displayed in the VOD Trick Mode bar
  All parameters passed through the vod( ) method must be obtained form a datatable residing in a separate .dat file.
  b EXAMPLE:
   <button name="video" x="20" y="20" width="100" height="25" onclick="vod($$video[0].id, $$video[0].title, $$video[0].duration)">Watch a video</button>

1 NOTE: All vod related data must be contained in a defined datatable format, with defined tag names. The following table structure, tag names, and tag order must be used:

```
<video>
    <row nunnber="n">
    <title>string </title>
    <id>10 digit VOD Gateway ID</id>
    <summary>string </summary>
    <duration>string </duration></row>
</video>
``` watchtv( ). The watchtv( ) method is used to exit the application and return to fullscreen broadcast television. It replicates the same behavior as pressing the EXIT button on the remote control, completely exiting the current application.

a FORMAT: watchtv( )
b EXAMPLE: The following example would return the user to the previously viewed broadcast channel at fullscreen via a button click
broadcast channel at fullscreen via a button click
```
<button name="exit" x="20" y="20" width="100" height="25" onclick="watchtv( )">TV</button>
```
8. Object Event Handlers Onblur. The onblur handler fires an event when focus is removed from the current element.
a example:
```
<button name="myButton" x="10" y="10" width="100" height="20" onblur="set(@myText.text, 'Default text string again')"/>
```
Onclick. The onclick handler fires an event when the current element is selected.
a example:
```
<button name="myButton" x="10" y="10" width="100" height="20" onclick="load(newPage.xml)"/>
```
Onfocus. The onfocus handler fires an event when focus is given to the current element.
a example:
```
<button name="myButton" x="10" y="10" width="100" height="20" onfocus="set(@myText.text, 'A new text string')"/>
```
Onfocusoption. The onfocusoption handler fires an each time any option in a <select> receives focus.
a example:
```
<select name="mod_select" hlwidth="330" hlheight="25" x="65" y="155" width="330" height="175" plane="vertical" align="left" valign="nniddle" navtemplate="tt_idle" navtemplatefocus="tt_foc" navtemplateselected="tt_sel" startindex="0" maxcount="7" datasrc="$$mod_newreleases.title" moreprev="uparrow" morenext="downarrow" onfocusoption="set($counter, @ mod_select.index, int);redraw (jacket)" onclick="load(newreleases_detail.xml)"/>
```
Onkey. The onkey handler fires an event when a specified button is pressed on the remote control.
a example: The onkey handler can only be used within a  tag. The first method the onkey event handler MUST have is iskey(KEY_ID); If the key pressed by the user matches the specified KEY_ID, then every action following iskey( ) is executed; otherwise, nothing happens. Onkey events allow the application author to create shortcuts for desired functionality. For instance, rather than navigating to the eighth button in a navigation menu, the interface could have an "8" next to the button, indicating to the user that pressing the "8" button on the remote will achieve the same functionality as navigating to the "8" button in the interface and pressing 'Select' on the remote. The following example checks to see if the user pressed the '8' key on the remote. If so, then it performs the specified page load.
```
<event onkey="iskey(8);load(sports.xml)"/>
```
Onload. The onload handler fires an event when a page is loaded.
a example:
```

```
Ontimer. An ontimer event is used to fire one or more events after the specified period of the timer has expired.
a example:
```
<timer name="myTimer" loop="false" period="1000" ontimer="set(@myText.text, 'The timer is complete!')"/>
```
Part 3: A Further Example.

Figure 4B:
FIGS. 4A-4OO illustrate an example of an XML schema, executing on a network terminal or set-top box, which enables application definitions to conform to a common application framework deployable over multiple network configurations.
Figure 4C:
Figure 4D:
Figures 1, 4E:
Figure 4F:
Figure 4G:
Figure 4J:
Figure 4K:
Figure 4M:
Figure 4N:
Figure 4O:
Figure 4P:
Figure 4Q:
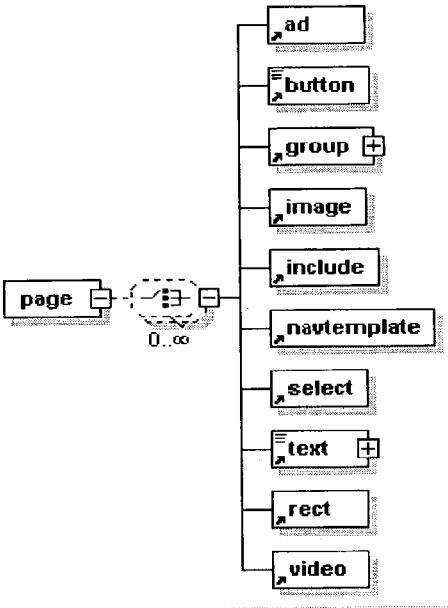
Figure 4R:
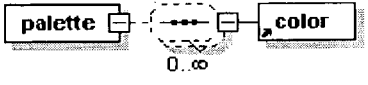
Figure 4S:
Figure 4T:
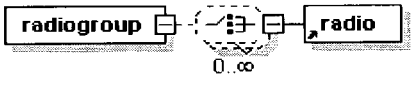
Figure 4U:
Figures 1, 4W:
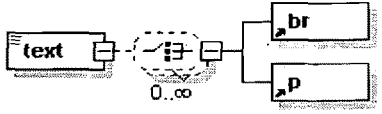
Figure 4X:
Figure 4Y:

FIGS. 4A-4OO illustrate an example of an XML, schema that is supported by the application client, executing on a network terminal or set-top box, which enables application definitions to conform to a common application framework deployable over multiple network configurations such as that described herein. The embodiment depicted in these illustrations demonstrates the unification of ad campaigns and commerce products across networks and applications. In another embodiment, the XML schema elements can also refer to business rules objects managed by the client system.

What is claimed is:

1. A method comprising:
causing, by a computing device, output of a user interface;
receiving, by the computing device, a first indication, via the user interface, of a selection of a first layout customization to a first layout for a first interactive content user interface associated with a first content application;
causing, by the computing device, output of the first interactive content user interface, wherein the first interactive content user interface is based on the first layout and the first layout customization;
receiving, by the computing device, a second indication of a selection of a second content application;
based on the selection of the second content application, receiving, by the computing device via a network, an application data package comprising:
a layout file indicating a second layout for a second interactive content user interface associated with the second content application, and
content, separate from the layout file, configured to populate the second interactive content user interface;
determining, by the computing device, and based on the first layout customization, the layout file indicating the second layout for the second interactive content use interface, and the content configured to populate the second interactive content user interface, the second interactive content user interface; and
causing, by the computing device, output of the second interactive content user interface.

2. The method of claim 1, wherein the first content application comprises an interactive content listing application, and wherein the second content application comprises a video-on-demand application.

3. The method of claim 1, wherein the first content application comprises an interactive content listing application, and wherein the second content application comprises an application for interactive sports content.

4. The method of claim 1, wherein the first content application is a first of one or more interactive content applications supported by the computing device, and wherein the method further comprises:
configuring the computing device to support the second content application as a second of the one or more interactive content applications.

5. The method of claim 1, wherein the layout file indicates one or more queries for populating, based on the content, the second layout, and wherein the one or more queries are associated with one or more locations within the second layout.

6. The method of claim 5, wherein the layout file is in a binary format.

7. The method of claim 1, wherein the content comprises video data.

8. The method of claim 7, wherein the video data is associated with one or more dynamic data feeds.

9. The method of claim 1, wherein the first layout customization comprises a first location for one or more menu items.

10. The method of claim 1, wherein the first layout customization comprises a first location for video content and a second location for text content.

11. A method comprising:
receiving, by a computing device, a first application data package associated with a first application, the first application data package comprising:
a first layout file indicating a first layout for a first interactive content user interface, and
first content configured to populate the first interactive content user interface;
receiving a first indication, by the computing device via a different user interface, of a selection of a first layout customization;
causing, by the computing device, output of the first interactive content user interface comprising the first content, wherein the first interactive content user interface is based on the first layout and the first layout customization;
based on an indication of a selection of a second application, receiving, by the computing device via a network, a second application data package associated with the second application, the second application data package comprising:
a second layout file indicating a second layout for a second interactive content user interface, and
second content, separate from the second layout file, configured to populate the second interactive content user interface; and
determining, by the computing device, and based on the first layout customization, the second layout file indicating the second layout for the second interactive content user interface and the second content configured to populate the second interactive content user interface, the second interactive content user interface; and
causing, by the computing device and based on the second application data package, output of the second interactive content user interface comprising the second content.

12. The method of claim 11, wherein the first application is a first of one or more interactive content applications supported by the computing device, and wherein the method further comprises:
configuring the computing device to support the second application, associated with the second interactive content user interface, as a second of the one or more interactive content applications.

13. The method of claim 11, wherein the second layout file indicates one or more queries for populating, based on the second content, the second layout, and wherein the one or more queries are associated with one or more locations within the second layout.

14. The method of claim 13, wherein the second layout file is in a binary format.

15. The method of claim 11, wherein the second content comprises video data.

16. The method of claim 15, wherein the video data is associated with one or more dynamic data feeds.

17. The method of claim 11, wherein the first layout customization comprises a first location for one or more menu items.

18. The method of claim 11, wherein the first layout customization comprises a first location for video content and a second location for text content.

19. A method comprising:
causing, by a computing device, output of a user interface;
receiving a first indication, by the computing device via the user interface, of a selection of a first layout customization to a first layout for a first interactive content user interface associated with a first content application;
causing, by the computing device, output of the first interactive content user interface based on the first layout and the first layout customization;
receiving a second indication, by the computing device, of a selection of a second content application;
based on the selection of the second content application, receiving, by the computing device via a network, a package of files for a second interactive content user interface associated with the second content application, wherein the package of files comprises:
a first file that indicates a second layout for the second interactive content user interface, and
a second file that indicates content configured to populate the second interactive content user interface; and
determining, by the computing device, and based on the first layout customization, the first file indicating the second layout for the second interactive content user interface and the second file indicating the content configured to populate the second interactive content user interface, the second interactive content user interface; and
causing, by the computing device, output of the second interactive content user interface.

20. The method of claim 19, wherein the first content application is a first of one or more interactive content applications supported by the computing device, and wherein the method further comprises:
configuring the computing device to support the second content application as a second of the one or more interactive content applications.

21. The method of claim 19, wherein the content is associated with one or more dynamic data feeds.

22. The method of claim 19, wherein the first layout customization comprises a first location for one or more menu items.

23. The method of claim 19, wherein the first layout customization comprises a first location for video content and a second location for text content.

\* \* \* \* \*

UNITED STATES PATENT AND TRADEMARK OFFICE
CERTIFICATE OF CORRECTION

| | |
|---|---|
| PATENT NO. | : 11,070,890 B2 |
| APPLICATION NO. | : 10/635799 |
| DATED | : July 20, 2021 |
| INVENTOR(S) | : Carney et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2156 days.

Signed and Sealed this
Sixth Day of December, 2022

Katherine Kelly Vidal
*Director of the United States Patent and Trademark Office*